United States Patent
Horigome

(10) Patent No.: US 8,699,309 B2
(45) Date of Patent: *Apr. 15, 2014

(54) RECORDING APPARATUS

(75) Inventor: Junichi Horigome, Tokyo (JP)

(73) Assignee: Sony Corporation, Tokyo (JP)

( * ) Notice: Subject to any disclaimer, the term of this patent is extended or adjusted under 35 U.S.C. 154(b) by 216 days.

This patent is subject to a terminal disclaimer.

(21) Appl. No.: 13/288,473

(22) Filed: Nov. 3, 2011

(65) Prior Publication Data

US 2012/0113775 A1 May 10, 2012

(30) Foreign Application Priority Data

Nov. 10, 2010 (JP) ................................. 2010-251573

(51) Int. Cl.
*G11B 5/55* (2006.01)

(52) U.S. Cl.
USPC .......................................... 369/53.28; 369/94

(58) Field of Classification Search
None
See application file for complete search history.

(56) References Cited

U.S. PATENT DOCUMENTS

| 8,363,522 B2* | 1/2013 | Ishimoto et al. ........... 369/47.15 |
| 2002/0131360 A1* | 9/2002 | Takemura et al. ......... 369/275.3 |
| 2008/0186840 A1 | 8/2008 | Uchiyama et al. |
| 2008/0205257 A1 | 8/2008 | Yamatsu et al. |
| 2012/0113775 A1* | 5/2012 | Horigome .................. 369/44.14 |
| 2012/0113777 A1* | 5/2012 | Horigome .................. 369/44.26 |

FOREIGN PATENT DOCUMENTS

| JP | 2008-135144 A | 6/2008 |
| JP | 2008-176902 A | 7/2008 |

* cited by examiner

*Primary Examiner* — Srilakshmi K Kumar
*Assistant Examiner* — Carl Adams
(74) *Attorney, Agent, or Firm* — Wolf, Greenfield & Sacks, P.C.

(57) ABSTRACT

A recording apparatus includes: a light-emitting/receiving unit which emits a recording beam, an ATS beam, and a position control beam toward an optical disc recording medium via a common object lens; a tracking mechanism which drives the object lens in a tracking direction parallel to a radial direction of the optical disc recording medium; a reference plane-side tracking error signal generation unit which generates a reference plane-side tracking error signal; a reference plane-side tracking servo signal generation unit which generates a reference plane-side tracking servo signal to cancel out a tracking error; a tracking driving unit which drives the tracking mechanism; an ATS-side tracking error signal generation unit which generates an ATS-side tracking error signal; an ATS control signal generation unit which generates an ATS control signal to cancel out a tracking error; and a signal providing unit which provides the ATS control signal to a tracking servo loop.

7 Claims, 33 Drawing Sheets

FIG. 7A

| PIT LINE A | * |   |   |   |   |   |   |   |   |   |   |
| PIT LINE B |   | * |   |   |   |   |   |   |   |   |   |
| PIT LINE C |   |   | * |   |   |   |   |   |   |   |   |
| PIT LINE D |   |   |   | * |   |   |   |   |   |   |   |
| PIT LINE E |   |   |   |   |   | * |   |   | * |   |   |
| PIT LINE F |   |   |   |   |   |   | * |   |   | * | * |

* IN EACH PIT LINE IS 1ch bit

FIG. 7B
4ch bit = 1011 = Data bit "0"
4ch bit = 1101 = Data bit "1"

FIG. 7C
12ch bit = 1111 | 1111 | 1011 = Sync1
12ch bit = 1111 | 1111 | 1101 = Sync2

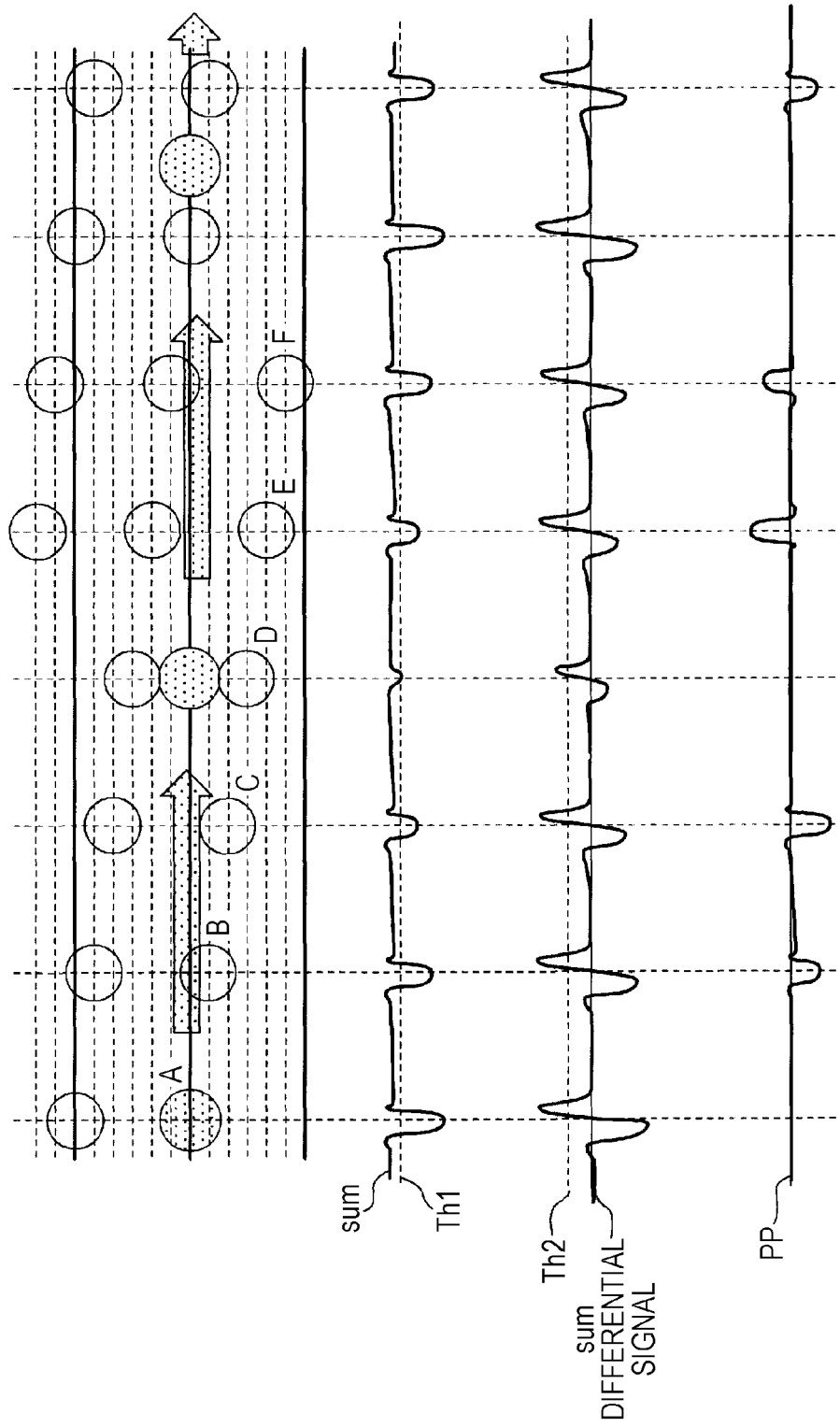

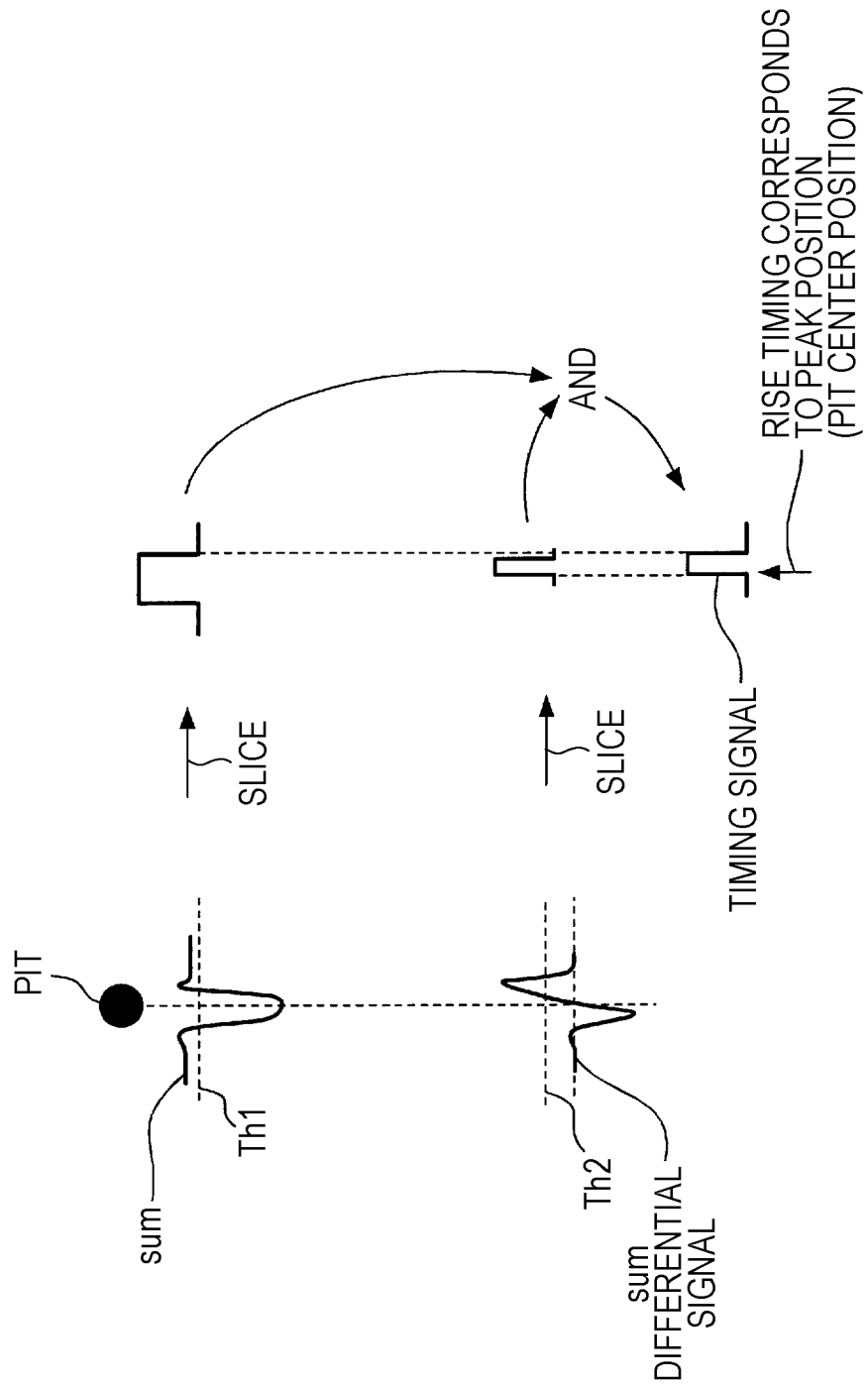

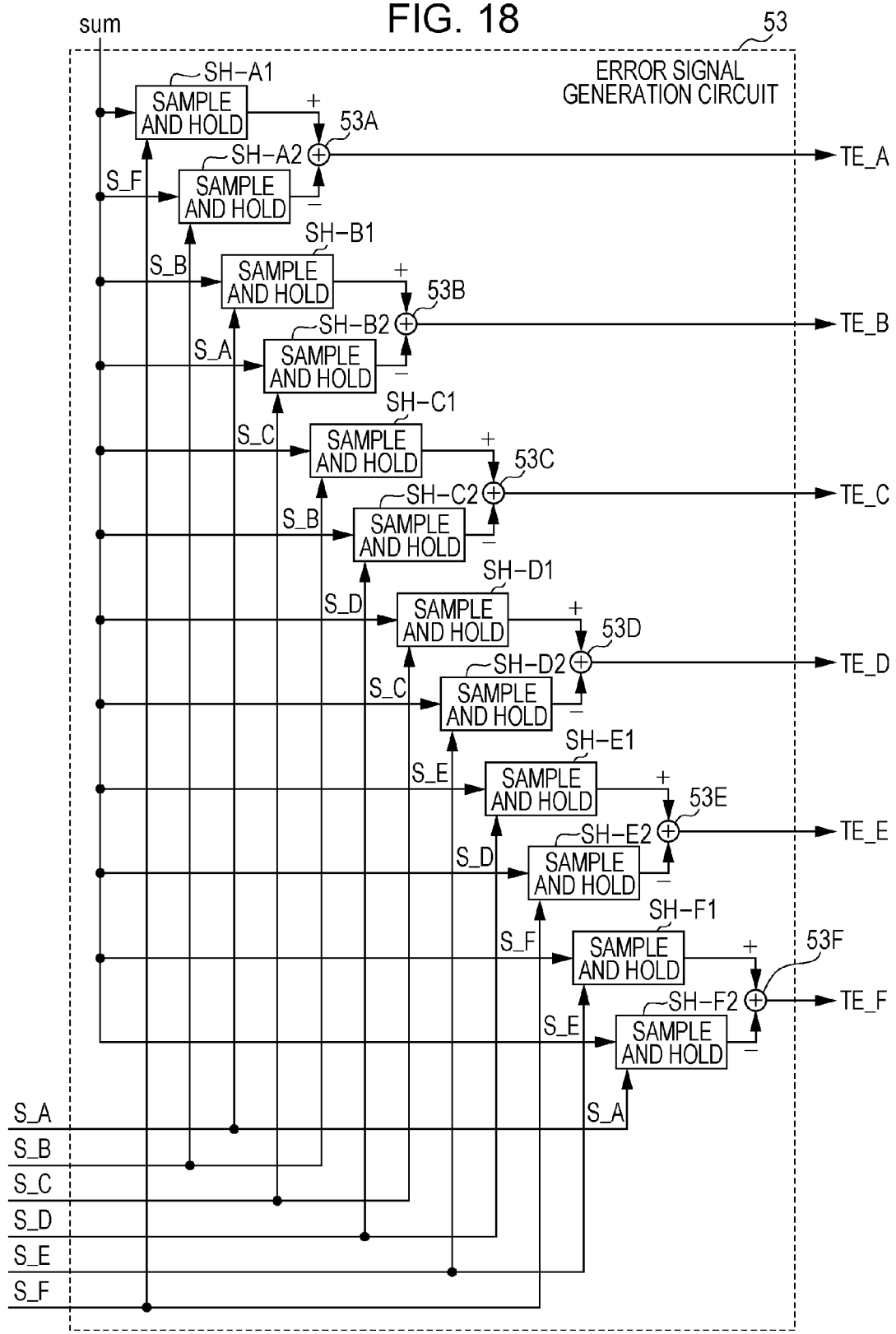

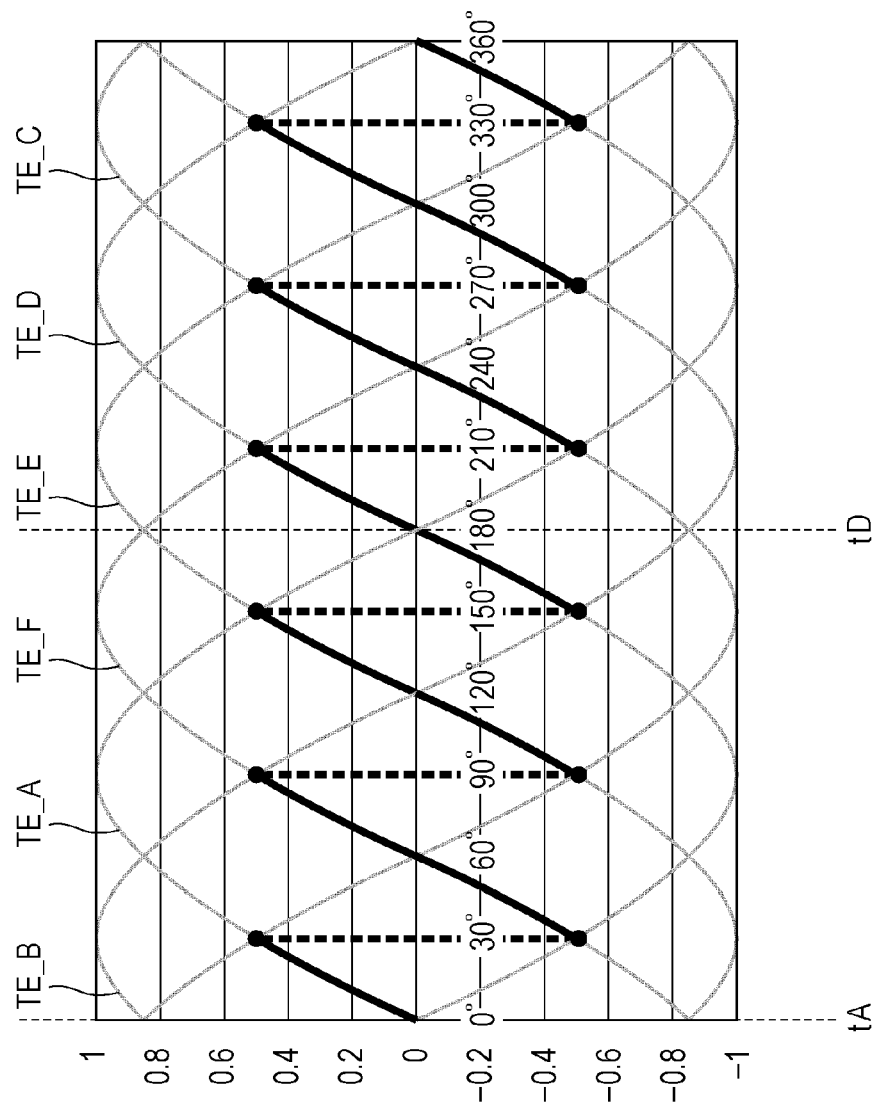

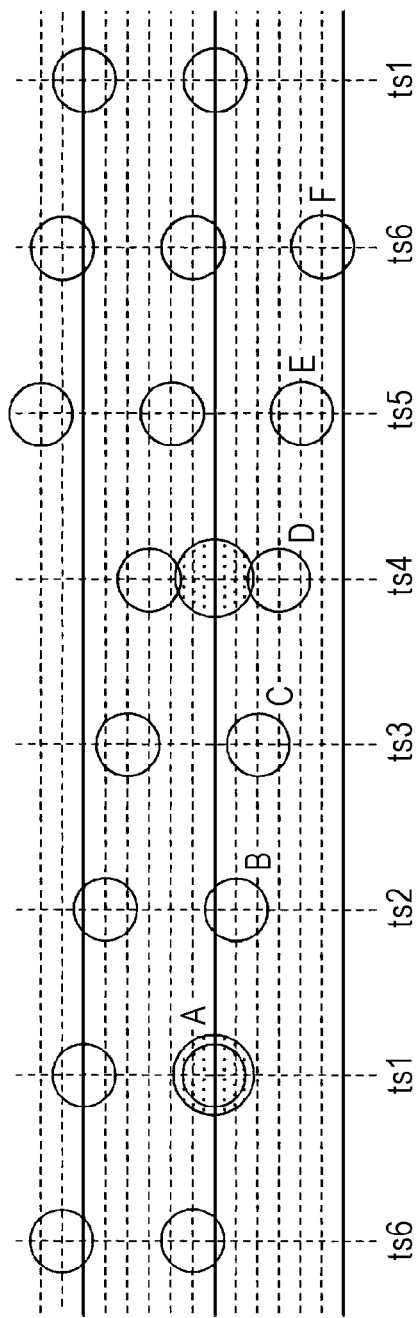
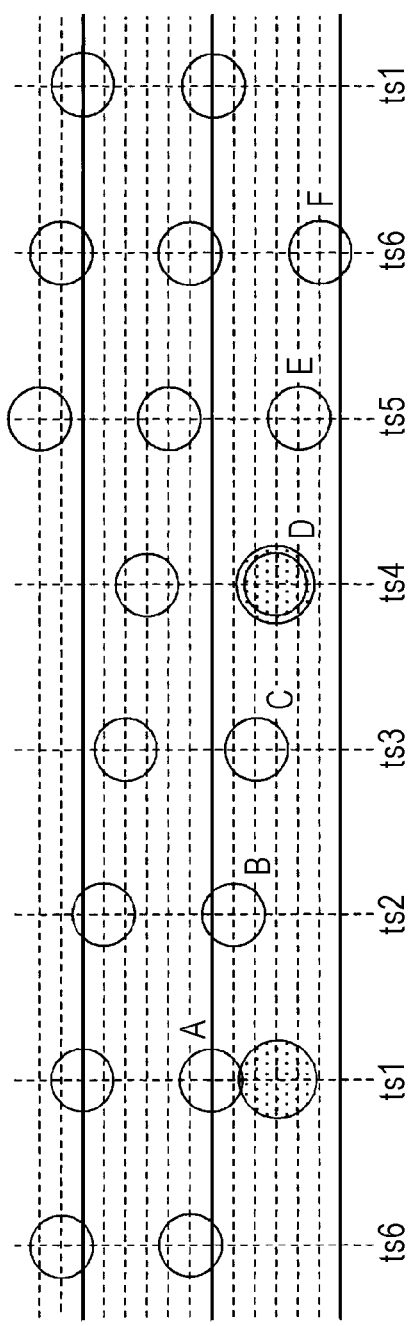
FIG. 20A
FIG. 20B

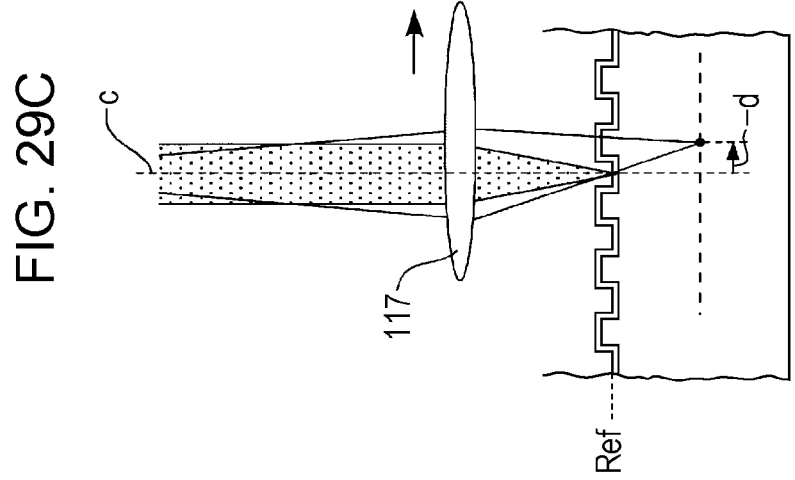
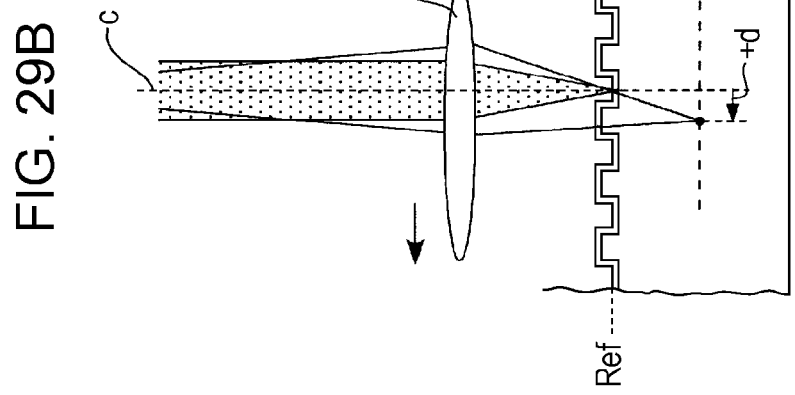
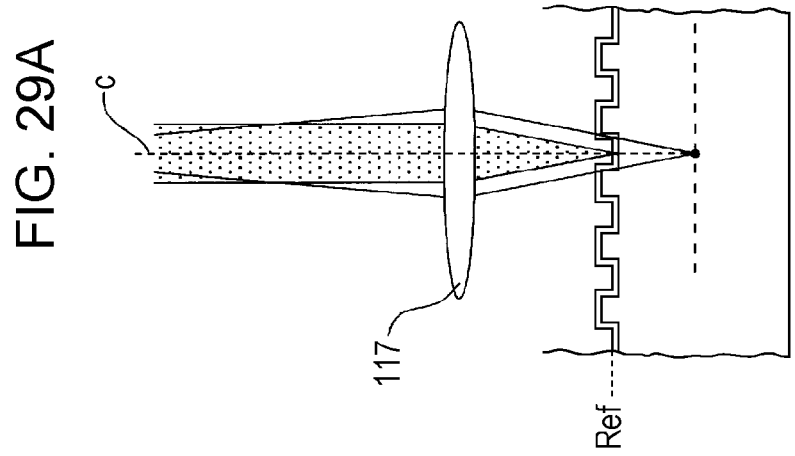

RECORDING APPARATUS

BACKGROUND

The present disclosure relates to a recording apparatus which performs recording on an optical disc recording medium which has a reference plane with a position guider and a recording layer formed at a depth position different from that of the reference plane.

As an optical disc recording medium (optical disc) recording/reproducing a signal by light emission, for example, a CD (Compact Disc), a DVD (Digital Versatile Disc), and a BD (Blu-ray Disc: registered trademark) have come into wide use.

As an optical disc which is the next generation of optical discs such as a CD, a DVD, or a BD which have come into wide use, the applicant has earlier suggested a so-called bulk recording optical disc disclosed in Japanese Unexamined Patent Application Publication No. 2008-135144 and Japanese Unexamined Patent Application Publication No. 2008-176902.

Here, the bulk recording is a technique for achieving large-capacity recording by emitting a laser beam to an optical recording medium (bulk recording medium 100), which has at least a cover layer 101 and a bulk layer (recording layer) 102, while sequentially changing a focal position and performing multi-layer recording in the bulk layer 102, as shown in FIG. 25.

As for the bulk recording, Japanese Unexamined Patent recording technique called a so-called micro-hologram method.

In the micro-hologram method, a so-called hologram recording material is used as a recording material of the bulk layer 102. For example, a photo-polymerizing photopolymer is widely used as the hologram recording material.

The micro-hologram method is broadly classified into a positive type micro-hologram method and a negative type micro-hologram method.

The positive type micro-hologram method is a method of condensing two light fluxes (light fluxes A and B) facing each other to the same position and forming fine interference fringes (hologram) so that the interference fringes are configured as recording marks.

The negative type micro-hologram method is a method of erasing interference fringes formed in advance by emitting a laser beam so that the erased portions are configured as recording marks, as an opposite idea to the positive type micro-hologram method. Specifically, in the negative type micro-hologram method, an initialization process is performed to form the interference fringes in advance in the bulk layer 102 before a recording process is performed. That is, light fluxes C and D are radiated with parallel light to form the interference fringes in the entire bulk layer 102. Then, after the interference fringes are formed through the initialization process in this way, information recording is performed by forming erasure marks. Specifically, the information recording is performed with the erasure marks by emitting a laser beam in accordance with information to be recorded in a state where a focus is made at an arbitrary layer position.

The applicant has also suggested a recording method of forming voids (holes or blanks) as recording marks as a bulk recording method different from the micro-hologram method, as disclosed in Japanese Unexamined Patent Application Publication No. 2008-176902.

The void recording method is a method of emitting a laser beam with relatively high power to the bulk layer 102 made of a recording material such as a photo-polymerizing photopolymer to record holes in the bulk layer 102. As disclosed in Japanese Unexamined Patent Application Publication No. 2008-176902, the holes formed in this way become portions with a refractive index different from that of other portions in the bulk layer 102, and thus the reflectance of light can be increased in the boundary portion therebetween. Accordingly, the holes serve as the recording marks, and thus the information recording is realized by forming the hole marks.

Since the hologram is not formed by the void recording method, the recording is achieved by emitting light from one side. That is, it is not necessary to form the recording marks by condensing two light fluxes to the same position as in the positive type micro-hologram method.

In comparison to the negative type micro-hologram method, there is an advantage that the initialization process is not necessary.

Japanese Unexamined Patent Application Publication No. 2008-176902 discloses an example in which precuring light is emitted before the recording when the void recording is performed. However, the void recording can be performed even when the irradiation of the precuring light is omitted.

The bulk recording type (simply referred to as a bulk type) optical recording medium suggested in the various recording methods described above has been used. However, the recording layer (bulk layer) of the bulk optical recording medium does not have an explicit multi-layer configuration in which a plurality of reflection films is formed. That is, in the bulk layer 102, reflection films and guiding grooves of each recording layer that a general multi-layer disc has are not formed.

In the configuration of the bulk recording medium 100 shown in FIG. 25 described above, focus servo or tracking servo is not performed during the recording time at which no mark is formed.

Thus, in effect, a reflection surface (reference plane Ref) serving as a reference with guiding grooves shown in FIG. 26 is formed in the bulk recording medium 100.

Specifically, guiding grooves (position guiders) configured by pits or grooves are formed on the lower surface of the cover layer 101 and a selection reflection film 103 is formed on the guiding grooves. The bulk layer 102 is laminated on the lower layer side of the cover layer 101, where the selection reflection film 103 is formed, with an adhesive material such as UV-cured resin, which is an intermediate layer 104, interposed therebetween, as shown in the drawing.

When the medium has the above-described configuration, the bulk recording medium 100 is radiated with a servo laser beam as a position control laser beam apart from a mark recording laser beam (recording laser beam), as shown in FIG. 27.

As shown in the drawing, the bulk recording medium 100 is radiated with the recording laser beam and the servo laser beam via a common object lens.

At this time, when the servo laser beam reaches the bulk layer 102, there is a concern that the servo laser beam may have a bad influence on the mark recording in the bulk layer 102. For this reason, in a bulk recording method according to the related art, a laser beam with a wavelength range different from that of the recording laser beam is used as the servo laser beam, and the servo laser beam is reflected from the reflection film formed on a guiding groove formation surface (reference plane Ref). The selection reflection film 103 is formed which has a wavelength selection property of reflecting the servo laser beam and transmitting the recording laser beam.

Next, a process of recording marks in the bulk recording medium 100 under the above-described hypothesis will be described with reference to FIG. 27.

First, when multi-layer recording is performed on the bulk layer 102 with no guiding groove or no reflection film, the position of a layer in which marks are recorded in the depth direction of the bulk layer 102 is set in advance. FIG. 27 shows an example in which a total of five information recording layer positions L, a first information recording layer position L1 to a fifth information recording layer position L5, are set as layer positions (also referred to as mark formation layer position: information recording layer positions) at which marks are formed in the bulk layer 102. As shown in the drawing, the first information recording layer position L1 is set at a position distant by a first offset of-L1 in a focus direction (depth direction) from the selection reflection film 103 (reference plane Ref) in which the guiding grooves are formed. Further, the second information recording layer position L2, the third information recording layer position L3, the fourth information recording layer position L4, and the fifth information recording layer position L5 are set at positions distant from the reference plane Ref by a second offset of-L2, a third offset of-L3, a fourth offset of-L4, and a fifth offset of-L5, respectively.

At the recording time at which no mark is formed, the focus servo or the tracking servo may not be performed at each layer position L in the bulk layer 102 based on the reflected beam of the recording laser beam. Accordingly, focus servo control or tracking servo control of the object lens during the recording time is performed so that the spot position of the servo laser beam tracks the guiding grooves on the reference plane Ref based on the reflection light of the servo laser beam serving as a position control beam.

However, it is necessary for the recording laser beam to be allowed to reach the bulk layer 102 formed below the selection reflection film 103 to record the marks. In this case, accordingly an optical system includes a focus mechanism adjusting a focusing position of the recording laser beam apart from a focus mechanism for the object lens.

FIG. 28 is a diagram illustrating an example of the inner configuration of a recording apparatus, which includes a mechanism independently adjusting the focusing position of the recording laser beam, for the bulk recording medium 100.

In FIG. 28, a first laser diode 111 indicated by LD1 is a light source of the recording laser beam and a second laser diode 119 indicated by LD2 is a light source for the servo laser beam. As described above, the first laser diode 111 and the second laser diode 119 are configured to emit laser beams with different wavelength ranges, respectively.

As shown in the drawing, the recording laser beam emitted from the first laser diode 111 is incident, via a collimation lens 112, on a focus mechanism which includes a fixed lens 113, a movable lens 114, and a lens driving unit 115. When the lens driving unit 115 drives the movable lens 114 in a direction parallel to the optical axis of the recording laser beam, a collimation state (converged/parallel/diverged state) of the recording laser beam incident on the object lens 117 in the drawing can be changed and the focusing position of the recording laser beam can be adjusted independently from a change in the focusing position by the driving of the object lens 117.

In terms of this meaning, the focus mechanism is also referred to as a recording light focus mechanism.

The recording laser beam passing via the recording light focus mechanism is incident on a dichroic mirror 116 which is configured to transmit light with the same wavelength range as that of the recording laser beam and reflect light with other wavelength ranges.

As shown in the drawing, the bulk recording medium 100 is radiated with the recording laser beam transmitted through the dichroic mirror 116 via an object lens 117. The object lens 117 is held so as to be displaceable in the focus direction and the tracking direction by a biaxial actuator 118.

The servo laser beam emitted from the second laser diode 119 passes through a beam divider 121 via a collimation lens 120 and is incident on the above-described dichroic mirror 116. The servo laser beam is reflected from the dichroic mirror 117 and is incident on the object lens 117 so that the optical axis of the servo laser beam is identical to the optical axis of the recording laser beam passing through the dichroic mirror 116.

The servo laser beam incident on the object lens 117 is focused on the selection reflection film 103 (reference plane Ref) of the bulk recording medium 100 when the biaxial actuator 118 is driven under the focus servo control of the servo circuit 125 described below. Simultaneously, the position of the servo laser beam in the tracking direction is configured to track the guiding grooves formed in the selection reflection film 103 when the biaxial actuator 118 is driven under the tracking servo control of the servo circuit 125.

The reflected beam of the servo laser beam from the selection reflection film 103 is reflected from the dichroic mirror 116 via the object lens 117, and then is reflected from the beam divider 121. The reflection light of the servo laser beam reflected from the beam divider 121 is condensed to a detection surface of a photo detector 123 via a condensing lens 122.

A matrix circuit 124 generates each error signal of focus and tracking based on a light signal received by the photo detector 123 and supplies each error signal to the servo circuit 125.

The servo circuit 125 generates a focus servo signal and a tracking servo signal from the respective error signals. When the above-described biaxial actuator 118 is driven based on the focus servo signal and the tracking error signal, the focus servo control and the tracking servo control are realized by the object lens 117.

Here, when the marks are recorded at a necessary information recording layer position L among the information recording layer positions L set in advance in the bulk recording medium 100, the driving of the lens driving unit 115 is controlled to change the focusing position of the recording laser beam by an offset of corresponding to the selected information recording layer position L.

Specifically, the setting control of the information recording position is performed by, for example, a controller 126 which performs control of the entire recording apparatus. That is, when the controller 126 controls the driving of the lens driving unit 115 based on an offset amount of-Lx set in advance in correspondence with a target information recording layer position Lx, the information recording position (focusing position) of the recording laser beam matches the target information recording layer position Lx.

The tracking servo of the recording laser beam during the recording time is automatically performed by performing the tracking servo control of the object lens 117 based on the reflected beam of the servo laser beam by the servo circuit 125, as described above. Specifically, the spot position of the recording laser beam in the tracking direction is controlled so as to be located directly below the guiding grooves formed on the reference plane Ref.

When the bulk recording medium 100 subjected to the mark recording is reproduced, it is not necessary to control the position of the object lens 117 based on the reflected beam of the servo laser beam from the reference plane Ref, as in the recording time. That is, at the reproduction time, the focus servo control and the tracking servo control of the object lens 117 can be performed based on the reflected beam of a reproduction laser beam by emitting the reproduction laser beam to the mark lines formed at the information recording layer position L to be reproduced.

In the bulk recording method, as described above, the bulk recording medium 100 is configured to be radiated with the recording laser beam serving as the mark recording beam and the servo laser beam serving as the position control beam (which are synthesized on the same optical axis) via the common object lens 117. Further, the focus servo and the tracking servo of the recording laser beam can be performed by performing the focus servo control and the tracking servo control of the object lens 117 based on the reflected beam of the server laser beam, even when the guiding grooves or the reflection surface with the guiding grooves is not formed in the bulk layer 102.

When the above-described servo control method is adopted, there is a problem in that the information recording position is deviated in the tracking direction due to the lens shift of the object lens 117 caused by the eccentricity of the bulk recording medium 100 or the backlash of a slide mechanism or the like of an optical pickup.

Here, the lens shift caused by the backlash of the slide mechanism means that the position of the object lens 117 being subjected to the tracking servo control is shifted to absorb the displacement of the position as the position of the optical pickup is displaced abruptly (instantly) due to the occurrence of the mechanical backlash of the slide mechanism during slide servo control.

FIGS. 29A to 29C are diagrams for explaining a principle in which deviation of an information recording position is caused due to the above-described lens shift.

FIG. 29A shows an ideal state where no eccentricity of the bulk recording medium 100 or no backlash of the slide mechanism occurs and no lens shift of the object lens 117 occurs. FIG. 29B shows the lens shift (referred to as eccentricity of a + direction) occurring toward the left side of the drawing (referred to as an outer circumference direction). FIG. 29C shows the lens shift (referred to as eccentricity of a − direction) occurring toward the right side of the drawing (referred to as an inner circumference direction).

A central axis C in the drawing is a central axis set in design of the optical system. In the ideal state shown in FIG. 29A, the center of the object lens 117 is identical to the central axis c.

When the lens shift occurs in the + direction, as shown in FIG. 29B, the center of the object lens 117 is shifted in the + direction with reference to the central axis c of the optical system.

At this time, since the servo laser beam (patterned beam in the drawing) is incident as the parallel light on the object lens 117, the position of the focal position is not changed in the tracking direction in spite of the fact that the shift occurs from the central axis c of the object lens 117. On the other hand, since the recording laser beam (white beam in the drawing) is focused at the necessary information recording layer position L in the bulk layer 102 below the reference plane Ref, as described above, the recording laser beam is incident as non-parallel light on the object lens 117. Therefore, the recording laser beam is shifted with respect to the object lens 117 in the + direction, and as shown in the drawing, the focal position (information recording position) of the recording laser beam is changed by a distance corresponding to the lens shift amount in the + direction (in the drawing, by a deviation amount +d).

When the lens shift occurs in the − direction shown in FIG. 29C, the information recording position of the recording laser beam is changed by a distance corresponding to the lens shift amount in the − direction (in the drawing, by a deviation amount −d).

The problem occurs in that the information recording position of the recording laser beam 100 is deviated in the tracking direction due to the eccentricity of the disc or the backlash of the slide mechanism in the configuration of the bulk recording apparatus medium described above with reference to FIG. 28, that is, in the configuration in which the focus servo control of the object lens 117 is performed in such a manner that the recording laser beam and the servo laser beam are emitted via the common object lens 117 so that the servo laser beam is focused on the reference plane Ref of the bulk recording medium 100, in which the focal position (information recording position) of the recording laser beam is adjusted by changing the collimation state of the recording laser beam incident on the object lens 117, and in which the tracking servo control of the object lens 117 is performed so that the focal position of the servo laser beam tracks the guiding grooves formed on the reference plane Ref.

At this time, the information recording positions may overlap between the adjacent guiding grooves depending on the magnitude or the like of the eccentricity or a track pitch (formation interval of the guiding grooves). Then, a recording signal may not be reproduced appropriately.

As described above, the main cause of the deviation of the information recording position is the lens shift of the object lens 117. However, the deviation of the information recording position is likewise caused due to disc tilt.

As one countermeasure for resolving the deviation of the information recording position, there can be used a method of making the track pitch larger than a variation in the information recording position.

However, this method has a problem in that it is difficult to determine the size of the track pitch since the maximum amount of lens shift or the like is uncertain. Above all, there is a problem in that a recording capacity may be reduced due to the expansion of the track pitch.

As another countermeasure for resolving the deviation of the information recording position, there can be used a method of not making a disc detachable in a system.

Here, for example, an error between the inner diameter of the disc and the clamp diameter of a spindle motor is the cause of the eccentricity. Since it is difficult to completely eliminate the error therebetween during processing, the eccentricity is unavoidable. Further, even when the error therebetween can be completely eliminated, the center of a recording signal in the reference plane of the disc may not be identical to the center of a spindle axis of the recording apparatus. Therefore, the eccentricity also occurs in this case. Accordingly, in the system in which the disc is not detachable, it is possible to avoid the problem that the recording positions overlap with each other since the influences of the eccentricity become the same as each other. Thus, since the track pitch can close up, the recording capacity can be increased by that amount.

However, the disc may not be, of course, substituted in this method. Therefore, the disc may not be substituted, for example, when the disc becomes faulty. Further, data recorded by a recording apparatus may not be read by another recording apparatus. Thus, convenience may therefore deteriorate.

A so-called ATS (Adjacent Track Servo) method can be taken into consideration as an effective method of resolving this problem. The ATS has originally been studied as a self servo track writer (SSTW) in a hard disc drive.

FIG. 30 is a diagram illustrating the ATS.

In the ATS, as shown in the drawing, a recording spot Srec and an adjacent track servo spot Sats are formed on a recording medium. The recording spot Srec and the adjacent track servo spot Sats are formed by radiating the recording medium with a beam drawing a circle via a common object lens. At this time, the distance between these spots is configured to be fixed.

In the ATS, when the recording spot Srec serves as a preceding spot (that is, the outer circumference side when a traveling direction of recording is the inner circumference to the outer circumference) and the adjacent track servo spot Sats serves as a following spot, the tracking servo is applied on a mark line formed by the recording spot Srec serving as the preceding spot. Eventually, the tracking servo control of the object lens is performed so that the adjacent track servo spot Sats tracks an immediately previous track in which the recording spot Srec is formed.

According to the ATS, the problem of the tracks overlap each other (the information recording positions overlapping each other) due to the influence of the eccentricity or the like since the track pitch is constant as the distance between the spots S does not occur. That is, it is not necessary to enlarge the extra track pitch or to configure the disc so as not be detachable in the system in consideration of the deviation of the information recording position caused due to the eccentricity or the like, as described above.

SUMMARY

In the ATS, however, when the tracking servo method is performed such that the tracking servo is performed using the adjacent track servo spot Sats according to the related art, it has been proved that a tracking error component is gradually increased and may be diverged whenever rotation is repeated.

This point will be described.

FIG. 31 is a diagram illustrating an ATS control system by a transfer function block.

In FIG. 31, the transfer function block denoted by K(z) indicates a discrete-based transfer function of a servo calculator (servo filter) as a controller of the tracking servo system. The transfer function block denoted by P(z) indicates a discrete-based transfer function of an actuator driving the object lens.

In the drawing, r denotes a control target position and e denotes a tracking error signal. Further, u denotes an output (corresponding to a tracking drive signal) of the controller and $y_s$ denotes the position of the adjacent track servo spot Sats.

Furthermore, $d_{r-a}$ is the distance between the recording spot Srec and the adjacent track servo spot Sats.

As shown in the drawing, a difference between a position $y_s$ of the adjacent track servo spot Sats and a target position r is an error signal e. As in a general tracking servo control system, the control system (K(z)) is operated in this servo system so that the error signal e is eliminated.

As apparent from the above description made with reference to FIG. 30, in the ATS, the position of the recording spot Srec at the time of recording the immediately previous track is the target position r at the time of recording the current track to be recorded. In FIG. 31, the target position r is shown using a delay time component $z^{-k}$ corresponding to a rotation time of one disc rotation and the distance $d_{r-a}$ under the hypothesis. Specifically, the target position r is expressed through the delay time component $z^{-k}$ by the position $y_r$ of the recording spot Srec expressed by adding the distance $d_{r-a}$ to the position $y_s$ of the adjacent track servo spot Sats. In other words, the position of the recording spot Srec before only the time of the one disc rotation is the target position r.

The transfer characteristics from the target position r to the position $y_s$ in the control system shown in FIG. 31 are generally the characteristics shown in FIGS. 32A and 32B.

FIG. 32A is a diagram illustrating a frequency-amplitude characteristics and FIG. 32B is a diagram illustrating a frequency-phase characteristic. As understood from FIGS. 32A and 32B, a transfer characteristic gain is larger than 0 dB in a band near a servo band in regard to the transfer characteristic (that is, the transfer characteristic of the ATS controls system) from the target position r to the position $y_s$. Further, in regard to the phase, a delay tends to occur near the servo band.

The component of the servo band is amplified every rotation of the disc, as understood from the characteristic in which the gain is larger than 0 dB near the servo band. As a consequence, the position $y_s$ of the adjacent track servo spot Sats is diverged over time, as shown in FIG. 33.

In consideration of this fact, it is difficult to stably perform the tracking servo control in the ATS according to the related art.

It is desirable to provide a recording apparatus with the following configuration.

That is, the recording apparatus includes a light-emitting/receiving unit which emits, toward an optical disc recording medium having a reference plane with a position guider and a recording layer formed at a depth position different from that of the reference plane, a recording beam for performing mark recording in the recording layer, an ATS beam for adjacent track servo, and a position control beam for performing position control based on the position guider formed in the reference surface via a common object lens and which individually receives a reflected beam of the ATS beam from the recording layer and a reflected beam of the position control beam from the reference plane.

The recording apparatus further includes a tracking mechanism which drives the object lens in a tracking direction parallel to a radial direction of the optical disc recording medium.

The recording apparatus further includes a reference plane-side tracking error signal generation unit which generates a reference plane-side tracking error signal indicating an error of a radiation spot position of the position control beam with respect to the position guider formed on the reference plane based on a light reception signal for the position control beam obtained by the light-emitting/receiving unit.

The recording apparatus further includes a reference plane-side tracking servo signal generation unit which generates a reference plane-side tracking servo signal to cancel out a tracking error indicated by the reference plane-side tracking error signal by performing filter processing for tracking servo on the reference plane-side tracking error signal.

The recording apparatus further includes a tracking driving unit which drives the tracking mechanism based on the reference plane-side tracking servo signal.

The recording apparatus further includes an ATS-side tracking error signal generation unit which generates an ATS-side tracking error signal indicating an error of a radiation spot position of the ATS beam with respect to a mark line recorded in the recording layer based on a light reception signal for the ATS beam obtained by the light-emitting/receiving unit.

The recording apparatus further includes an ATS control signal generation unit which generates an ATS control signal to cancel out a tracking error indicated by the ATS-side tracking error signal by performing the filter processing for tracking servo on the ATS-side tracking error signal.

The recording apparatus further includes a signal providing unit which provides the ATS control signal to a tracking servo loop including the reference plane-side tracking servo signal generation unit.

According to the embodiment of the disclosure, a reference plane-side tracking servo control system is configured to include the reference plane-side tracking error signal generation unit, the reference plane-side tracking servo signal generation unit, and the tracking driving unit and to perform tracking servo control based on the position guider of the reference plane. In other words, the tracking servo loop is formed so as to perform the tacking servo control based on the position guider of the reference surface.

According to the embodiment of the disclosure, as the ATS (Adjacent Track Servo), as a configuration in order to obtain the tracking error signal for performing the tracking servo on the mark line before one rotation, there is further provided the ATS-side tracking error signal generation unit and the ATS control signal generation unit generating the control signal (ATS control signal) for the ATS from the ATS-side tracking error signal generated by the ATS-side tracking error signal generation unit.

According to the embodiment of the disclosure, the signal providing unit provides the ATS control signal to the tracking servo loop in which the tracking servo control is performed based on the position guider of the reference plane. That is, the output of the ATS control system is provided as a target value of the reference plane-side tracking servo control system. In other words, the reference plane-side tracking servo loop is set as a minor loop and the output of the ATS control system is input as the target value to the minor loop.

With such a configuration, it is possible to prevent the peak of the transfer characteristic gain occurring in a single ATS control system according to the related art. Therefore, the transfer characteristic gain of the tracking servo loop can be made so as not to exceed 0 dB in the entire frequency band.

According to the embodiment of the disclosure, it is possible to improve the characteristic in which the transfer characteristic gain is larger than 0 dB near the servo band in a single ATS according to the related art. As a consequence, it is possible to prevent the problem that the tracking error signal is increased over time and is diverged.

Thus, it is possible to stably realize the tracking servo control of preventing the overlapping or intersecting of the recording mark lines compared to the case of the ATS according to the related art.

BRIEF DESCRIPTION OF THE DRAWINGS

FIGS. 7A, 7B and 7C are diagrams illustrating the format of address information;

FIG. 8 is a diagram schematically illustrating movement of the spots of the servo laser beam on the reference plane as the bulk recording medium is rotationally driven and a relationship among the waveforms of a sum signal, a sum differential signal, and a PP (Push-Pull) signal obtained at this time;

FIG. 9 is a diagram illustrating a specific method of detecting a peak position;

FIG. 18 is a diagram illustrating the inner configuration of each phase tracking error signal generation circuit of the recording apparatus according to the embodiment;

FIG. 19 is a diagram illustrating the waveform of each tracking error signal obtained when the spot position is moved in the radial direction;

FIGS. 20A and 20B are diagrams illustrating a state where the radiation spot of the laser beam is traced in a predetermined pit line;

FIGS. 29A to 29C are diagrams for explaining a principle in which position deviation of an information recording position occurs in a tracking direction due to lens shift;

DETAILED DESCRIPTION OF EMBODIMENTS

Hereinafter, a mode for carrying out the disclosure (hereinafter, referred to as an embodiment) will be described.

The description of the embodiment will be made in the following order.

1. Overview of Servo Control Method according to Embodiment
  1.1. Example of Optical Disc Recording Medium to be Recorded
  1-2. Inner Configuration of Recording Apparatus according to Embodiment
  1-3. Servo Control Method
2. Countermeasure for Spot Position Deviation of ½ or More Track Width
  2-1. Problem with Spot Position Deviation
  2-2. Configuration of Reference Plane
  2-3. Address Information
  2-4. Method of Selecting Servo Target Pit Line
  2-5. Problem with Method of Sampling Push-pull Signal and Countermeasure
  2-6. Method of Generating Linear Tracking Error Signal
  2-7. Example of Specific Configuration of Signal Generation Unit
3. Modified Examples

Figure 1:
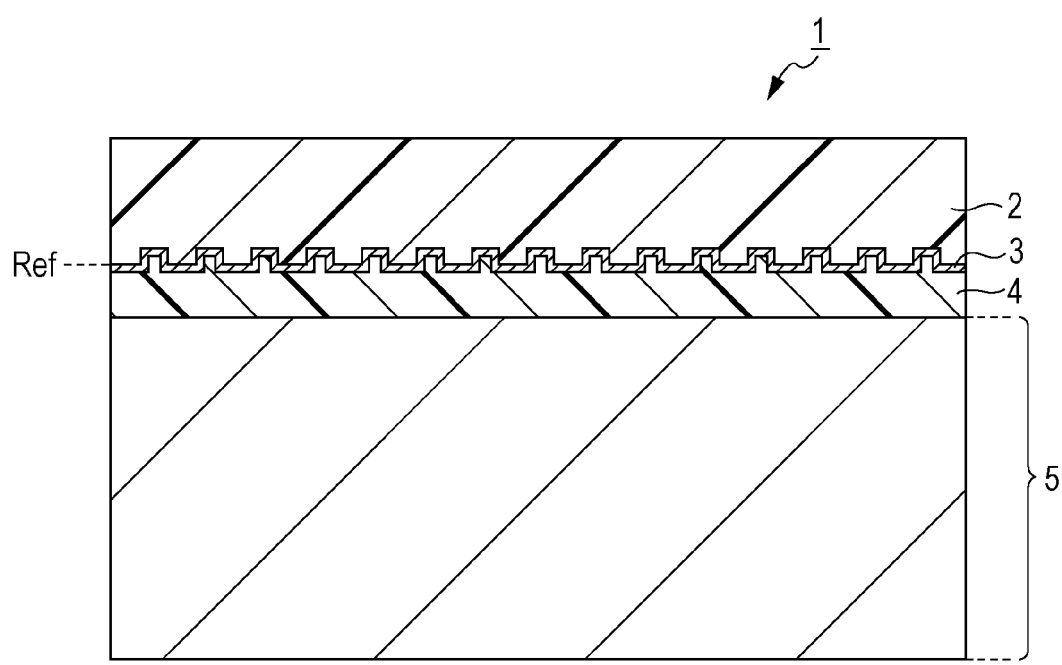
FIG. 1 is a diagram illustrating the cross-sectional configuration of an optical disc to be recorded according to an embodiment.

1. Overview of Servo Control Method According to Embodiment 1.1. Example of Optical Disc Recording Medium to be Recorded FIG. 1 is a diagram illustrating the cross-sectional configuration of an optical disc recording medium to be recorded by a recording apparatus according to an embodiment.

Hereinafter, the optical disc recording medium to be recorded according to the embodiment is assumed to be a bulk recording type optical disc recording medium and is referred to as a bulk recording medium 1.

The bulk recording medium 1 as the optical disc recording medium is radiated with a laser beam to perform mark recording (information recording) in a state where the bulk recording medium 1 is rotationally driven by the recording apparatus.

The optical disc recording medium is a general term of disc-shaped recording media used to record (or reproduce) information by light radiation.

As shown in FIG. 1, the bulk recording medium 1 includes a cover layer 2, a selection reflection film 3, an intermediate layer 4, and a bulk layer 5 in order from the upper layer side.

In the specification, the "upper layer side" refers to an upper layer side when a surface on which a laser beam from the recording apparatus (recording apparatus 10) described below according to the embodiment is incident is assumed to be an upper surface.

In this specification, a "depth direction" is used. The "depth direction" refers to a direction (that is, a direction parallel to an incident direction of the laser beam on the side of the recording apparatus: focus direction identical to upward and downward directions (vertical direction) according to the definition of the "upper layer side."

In the bulk recording medium 1, the cover layer 2 is made of resin such as polycarbonate or acrylic. As shown in the drawing, position guiders for guiding the recording position are formed on the lower surface of the cover layer 2.

In this case, guiding grooves formed by continuous grooves or a pit line are formed as the position guiders and have the cross-sectional concavo-convex shape. In this example, the guiding grooves serving as the position guiders are assumed to be formed in a spiral shape.

The cover layer 2 is generated by injection forming using a stamper in which the guiding grooves (pattern with a concavo-convex shape) are formed.

The selection reflection film 3 is formed on the lower surface of the cover layer 2 in which the guiding grooves are formed.

In the bulk recording method, as described above, the bulk layer 5 serving as a recording layer is radiated with not only a recording beam (recording laser beam) used to record marks but also a servo beam (also referred to as a position control beam or a servo laser beam) used to acquire an error signal of tracking or focus based on the guiding grooves.

In this case, when the servo light reaches the bulk layer 5, there is a concern that the servo light may have a bad influence on the inside of the bulk layer 5. For this reason, it is necessary to form a reflection film which has a selection property of reflecting the servo beam and transmitting the recording beam.

The bulk recording method according to the related art uses the recording beam and the servo beam which have wavelength ranges different from each other. In order to correspond to the use of the beams with the different wavelength ranges, a selection reflection film reflecting a beam with the same wavelength range as that of the servo beam and transmitting beams with other wavelength ranges is used as the selection reflection film 3.

The bulk layer 5 serving as the recording layer is formed (adhered to) on the lower layer of the selection reflection film 3 with the intermediate layer 4, which is made of an adhesive material such as UV cured resin, interposed therebetween.

As the material (recording material) of the bulk layer 5, for example, an optimum material is used depending on a bulk recording method such as the positive type micro-hologram method, the negative type micro-hologram method, or the void recording method described above.

The method of recording the marks in the optical disc recording medium according to the embodiment of the disclosure is not particularly limited. Any method may be used within the scope of the bulk recording method.

Hereinafter, the description will continue in accordance with the void recording method as this example.

In the bulk recording medium 1 with the above-described configuration, the selection reflection film 3 with the pattern with the cross-sectional shape in correspondence to the formation of the above-described guiding grooves is a reflection surface which serves as a reference in the position control of the recording laser beam based on the serve laser beam, as described below.

Thus, the surface in which the selection reflection film 3 is formed is referred below to as a reference plane Ref.

Figure 27:
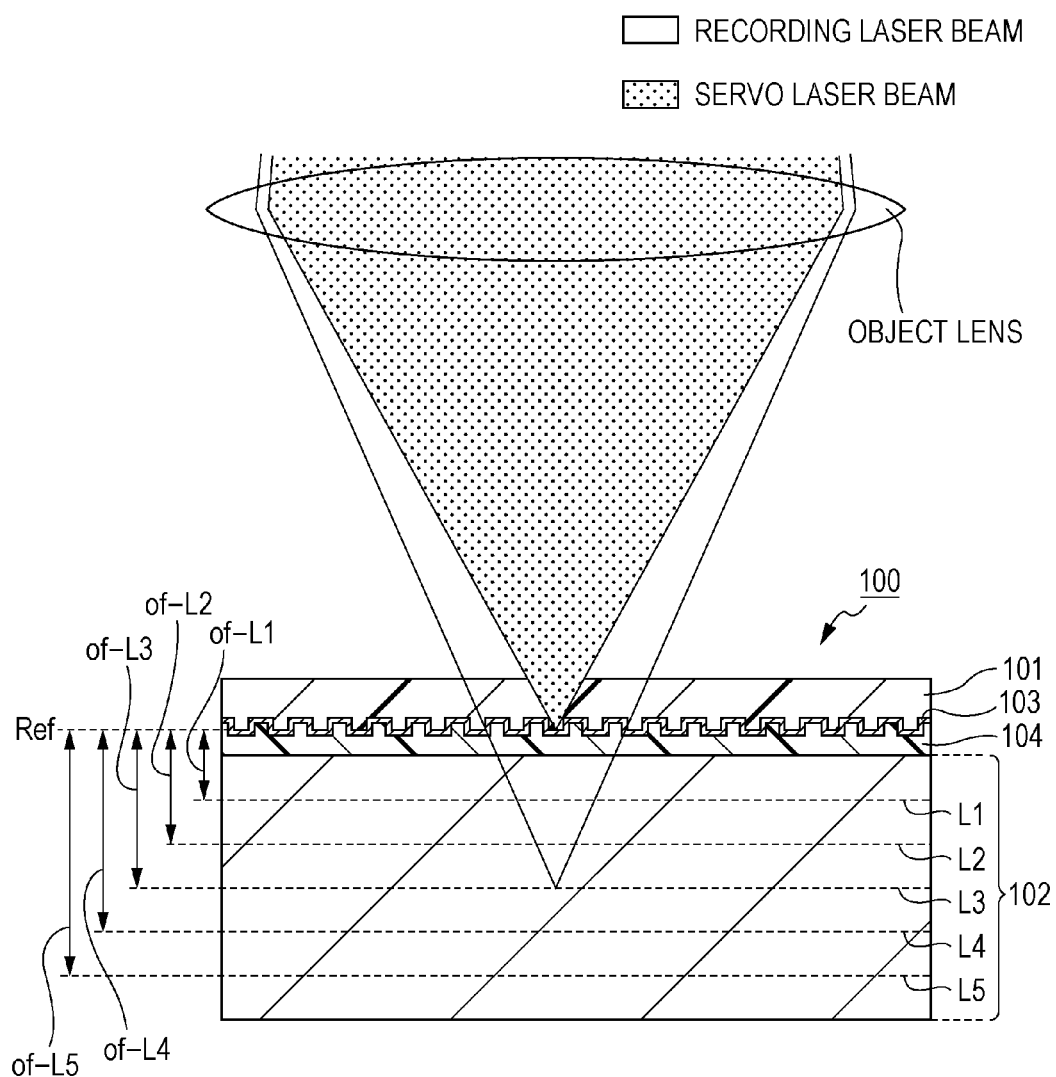
FIG. 27 is a diagram illustrating a process of recording marks in the bulk recording medium.
Figure 28:
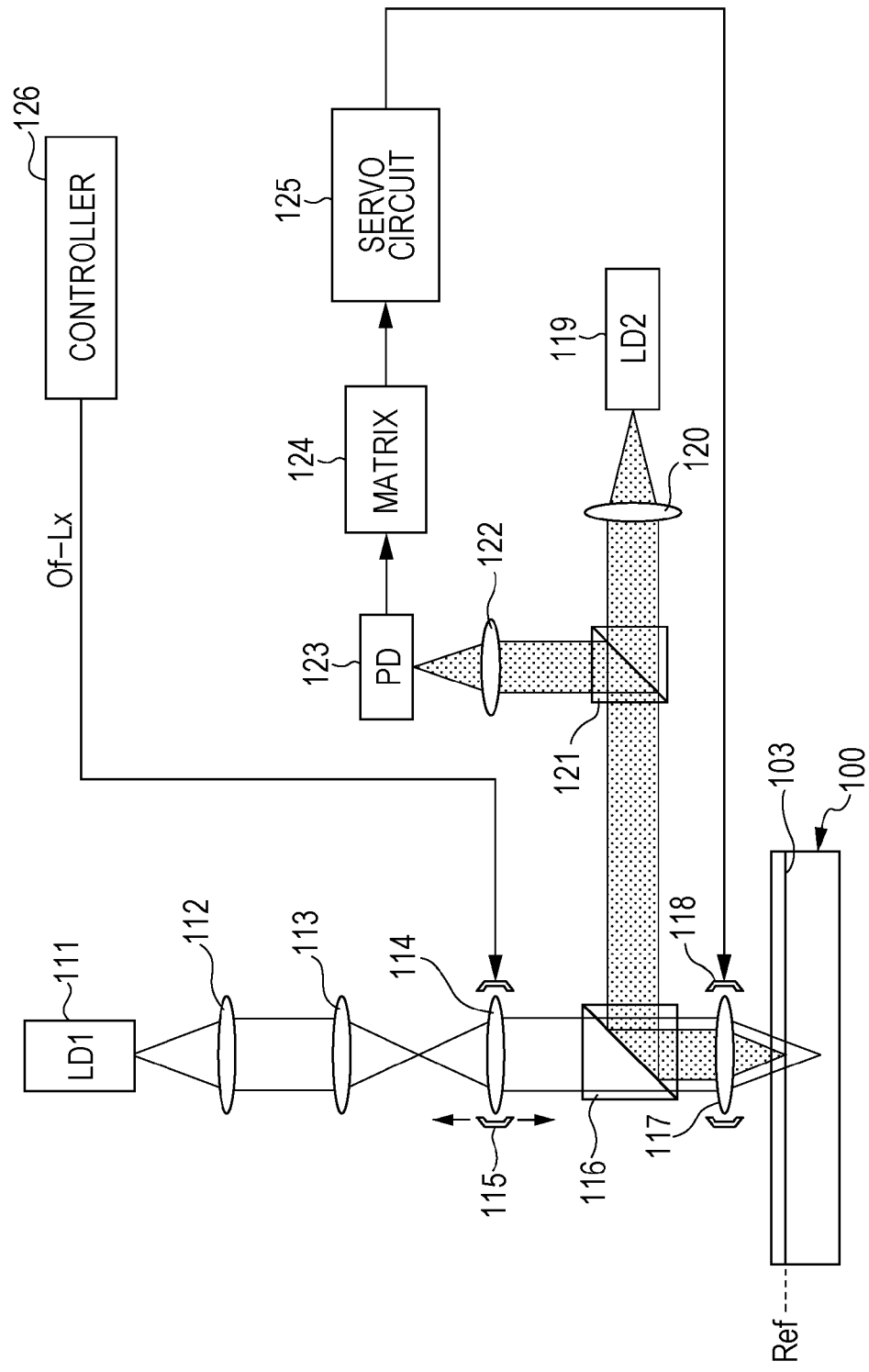
FIG. 28 is a diagram illustrating the inner configuration of a recording apparatus performing recording on the bulk recording medium according to the related art.

As described above with reference to FIG. 27, respective layer positions (information recording layer positions L) which are to be subjected to information recording in advance are set to perform multi-layer recording in the bulk-shaped recording layer of the bulk optical recording medium. In the information recording layer positions L of the bulk recording medium 1, as in the case described above with reference to FIG. 27, a first information recording layer portion L1, a second information recording layer position L2, a third information recording layer position L3, a fourth information recording layer position L4, and a fifth information recording layer position L5 are set so as to be distant from the reference plane Ref in the depth direction by a first offset of-L1, a second offset of-L2, a third offset of-L3, a fourth offset of-L4, and a fifth offset of-L5, respectively.

Information regarding the offset of-L by which each recording layer position L is distant from the reference plane Ref is set in advance in the recording apparatus.

The number of information recording layer positions L is not limited to five.

1-2. Inner Configuration of Recording Apparatus According to Embodiment

Figure 2:
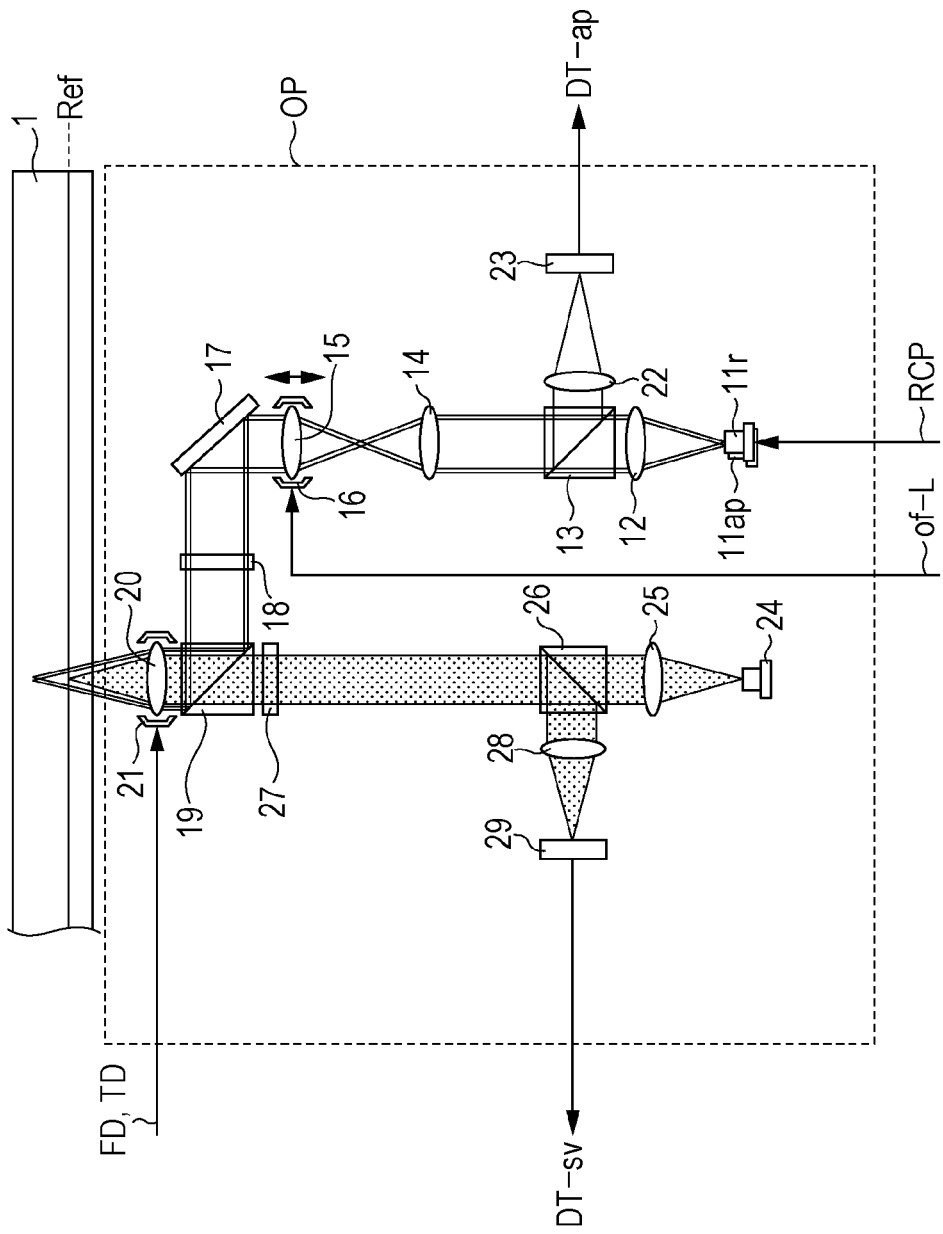
FIG. 2 is a diagram mainly illustrating the configuration of an optical system of a recording apparatus according to the embodiment.

FIG. 2 a diagram mainly illustrating the configuration of an optical system of the recording apparatus performing recording on the bulk recording medium 1 shown in FIG. 1 according to the embodiment. Specifically, the inner configuration of an optical pickup OP included in the recording apparatus is mainly illustrated.

In FIG. 2, the bulk recording medium 1 loaded in the recording apparatus is set so that its center hole is cramped at a predetermined position in the recording apparatus. The bulk recording medium 1 is held in a state where the rotation driving is enabled by a spindle motor (not shown).

Figure 30:
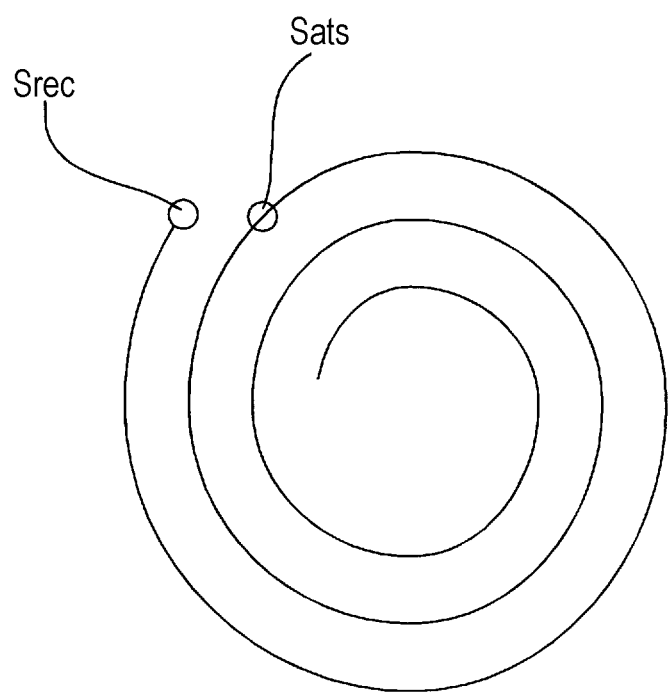
FIG. 30 is a diagram illustrating ATS.
Figure 31:
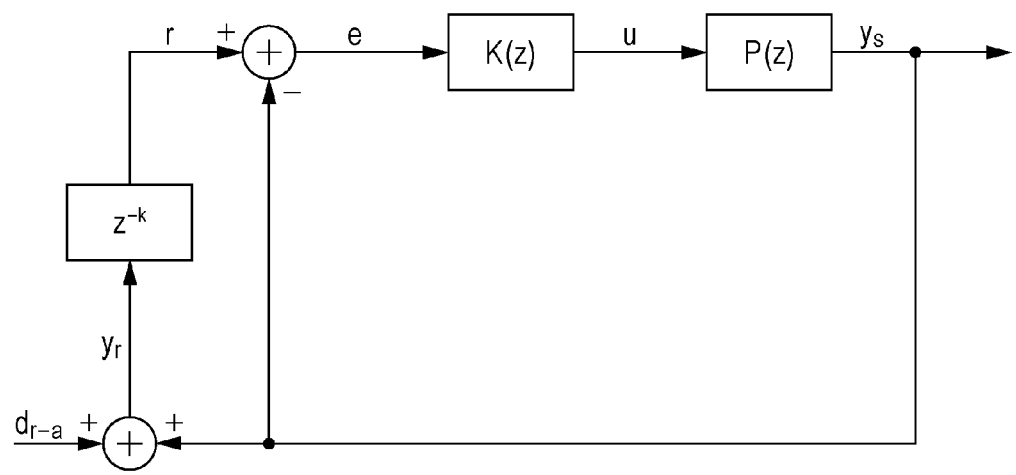
FIG. 31 is a diagram illustrating an ATS control system by a transfer function block according to the related art.

The optical pickup OP is installed to emit a recording laser beam, a servo laser beam, and an ATS beam, which is used to form an adjacent track servo spot Sats (see FIG. 30), toward the bulk recording medium 1 rotationally driven by the spindle motor.

As apparent from the below description, in this case, the ATS beam is used as a reproduction beam used to reproduce a signal recorded with marks at the reproduction time.

The optical pickup OP includes a recording laser 11r which serves as a light source of a laser beam used to record a signal with the marks and a servo laser 24 which serves as a light source of a servo laser beam as a beam used for position control using the position guiders formed on the reference plane Ref. The optical pickup OP further includes an ATS reproduction laser 11ap which serves as a light source used to emit the ATS beam during the recording time and to emit a laser beam for reading a recording signal at the reproduction time.

Here, as described above, the recording laser beam and the servo laser beam use beams with different wavelength ranges. In this case, it is assumed that the wavelength of the recording laser beam is about 405 nm (so-called blue-violet laser beam) and the wavelength of the servo laser beam is about 650 nm (red laser beam).

It is necessary to allow a laser beam (hereinafter, simply referred to as an ATS beam), which functions as the ATS beam or a reproduction beam for reading a signal, from ATS reproduction laser 11ap as the light source to transmit the selection reflection film 3 and reach the inside of the bulk layer 5. Further, since recording and reproduction wavelengths are the same as each other, the wavelength of the ATS beam is the same as that of the recording laser beam.

The optical pickup OP includes an object lens 20 which serves as a common output terminal of the recording laser beam, the servo laser beam, and the ATS beam to the bulk recording medium 1.

The optical pickup OP further includes a first light-receiving unit 23 which receives the reflected beam of the ATS beam from the bulk recording medium 1 and a second light-receiving unit 29 which receive the reflected beam of the servo laser beam from the bulk recording medium 1.

The optical pickup OP includes an optical system which guides the recording laser beam emitted from the recording laser 11r and the ATS beam emitted from the ATS reproduction laser 11ap toward an object lens 20 and guides the reflected beam of the ATS beam incident on the object lens 20 from the bulk recording medium 1 toward the first light-receiving unit 23.

Specifically, both the recording laser beam emitted from the recording laser 11r and the ATS beam emitted from the ATS reproduction laser 11ap are changed to parallel beams via a collimation lens 12, and then are incident on a polarized beam divider 13. The polarized beam divider 13 is configured to transmit the recording laser beam and the ATS beam incident from the light sources.

The recording laser beam and the ATS beam transmitted through the polarized beam divider 13 are incident on an expander which includes a fixed lens 14, a movable lens 15, and a lens driving unit 16. In the expander, the fixed lens 14 is disposed on the side closer to the light source and the movable lens 15 is disposed on the side distant from the light source. The lens driving unit 16 performs independent focus control for the recording laser beam and the ATS beam by driving the movable lens 15 in a direction parallel to the optical axis of the incident beam. The expander corresponds to the recording light focus mechanism described above.

As described below, the lens driving unit 16 in the recording light focus mechanism is driven in accordance with the offset of-L set to correspond to the information recording layer position L to be recorded by a controller 44 shown in FIG. 3.

Each laser beam passing though the fixed lens 14 and the movable lens 15 of the recording light focus mechanism is reflected from a mirror 17, and then is incident on a dichroic prism 19 via a quarter wavelength plate 18, as shown in the drawing.

A selection reflection surface of the dichroic prism 19 is configured to reflect the light with the same wavelength range as that of the recording laser beam and the ATS laser beam and to transmit a beam with other wavelengths. Accordingly, each laser beam incident in this way is reflected from the dichroic prism 19.

The bulk recording medium 1 is radiated with each laser beam reflected from the dichroic prism 19 via the object lens 20, as shown in the drawing.

As the bulk recording medium 1 is radiated with the recording laser beam and the ATS beam via the object lens 20, the recording spot Srec and the adjacent track servo spot Sats described above with reference to FIG. 30 are formed at the information recording layer position L to be recorded in the bulk layer 5.

In this case, the optical system is designed such that the positional relationship between the recording spot Srec and the adjacent track servo spot Sats is fixed as a preset positional relationship.

In this example, it is assumed that a separate distance between the recording spot Srec and the adjacent track servo spot Sats in a radial direction is set to be identical to a pitch (pitch of a spiral) of a track formed in the reference plane Ref.

A biaxial actuator 21 holding the object lens 20 so as to be displaceable in a focus direction (contact and separation directions for the bulk recording medium 1) and a tracking direction (a direction perpendicular to the focus direction: a direction parallel to the radial direction of the bulk recording medium 1) is installed for the object lens 20.

Since the biaxial actuator 21 includes a focus coil and a tracking coil, the biaxial actuator 21 displaces the object lens 20 in the focus direction and the tracking direction, when each of the driving signal (driving signals FD and TD described below) is given.

At the recording time or the reproduction time, the reflected beam of the ATS beam from a mark line in the bulk layer 5 can be obtained through the radiation of the bulk recording medium 1 with the ATS beam, as described above.

The reflected beam of the ATS beam obtained in this way is guided toward the dichroic prism 19 via the object lens 20 and is reflected from the dichroic prism 19.

The reflected beam of the ATS beam reflected from the dichroic prism 19 is incident on the polarized beam divider 13 via the quarter wavelength plate 18→the mirror 17→the recording light focus mechanism (the movable lens 15→the fixed lens 14).

The polarization direction of the reflected beam (backward beam) of the ATS beam incident on the polarized beam divider 13 becomes different by 90 degrees from that of the beam (forward beam) incident on the polarized beam divider 13 from the ATS reproduction laser 11ap by an operation of the quarter wavelength plate 18 and the operation of the bulk recording medium 1 at the reflection time. As a consequence, the reflected beam of the ATS beam incident in this way is reflected from the polarized beam divider 13.

The reflected beam of the ATS beam reflected from the polarized beam divider 13 is condensed to a light-receiving surface of the first light-receiving unit 23 via a condensing lens 22.

Here, although the description is not made with reference to the drawing, the first light-receiving unit 23 includes a plurality of light-receiving elements (for example, four light-receiving elements). Hereinafter, light reception signals obtained from the plurality of light-receiving elements of the first light-receiving unit 23 are collectively referred to as a light reception signal DT-ap.

In addition to the above-described optical system for the recording laser beam and the ATS beam, the optical pickup OP further includes an optical system which guides the servo laser beam emitted from the servo laser 24 toward the object lens 20 and guides the reflected beam of the servo laser beam from the bulk recording medium 1 incident on the object lens 20 toward the second light-receiving unit 29.

As shown in the drawing, the servo laser beam emitted from the servo laser 24 is changed to a parallel beam through the collimation lens 25, and then is incident on the polarized beam divider 26. The polarized beam divider 26 is configured to transmit the servo laser beam (forward beam) incident from the servo laser 24 in this way.

The servo laser beam transmitted through the polarized beam divider 26 is incident on the dichroic prism 19 via the quarter wavelength plate 27.

As described above, the dichroic prism 19 is configured to reflect the beam with the same wavelength range as that of the recording laser beam and the ATS beam and transmit the beams with the other wavelengths. Accordingly, the servo laser beam is transmitted through the dichroic prism 19 and is emitted to the bulk recording medium 1 via the object lens 20.

The reflection beam (reflection beam from the reference plane Ref) of the servo laser beam obtained through the radiation of the bulk recording medium 1 with the servo laser beam is transmitted through the dichroic prism 19 via the object lens 20 and is incident on the polarized beam divider 26 via the quarter wavelength plate 27.

As in the ATS beam described above, the reflected light (backward beam) of the servo laser beam incident from the bulk recording medium 1 becomes different by 90 degrees from that of the forward beam by an operation of the quarter wavelength plate 27 and the operation of the bulk recording medium 1 at the reflection time. As a consequence, the reflected beam of the servo laser beam is reflected as the backward beam from the polarized beam divider 26.

The reflected beam of the servo laser beam reflected from the polarized beam divider 26 is condensed to a light-receiving surface of the second light-receiving unit 29 via a condensing lens 28.

The second light-receiving unit 29 also includes a plurality of light-receiving elements (for example, four light-receiving elements). Hereinafter, light reception signals obtained from the plurality of light-receiving elements of the second light-receiving unit 29 are collectively referred to as a light reception signal DT-sv.

Although not described with reference to the drawing, the recording apparatus actually includes a slide driving unit which slidably drives the above-described entire optical pickup OP in the tracking direction. Therefore, the slide driving unit is configured so as to extensively displace the radiation position of the laser beam by driving the optical pickup OP.

Figure 3:
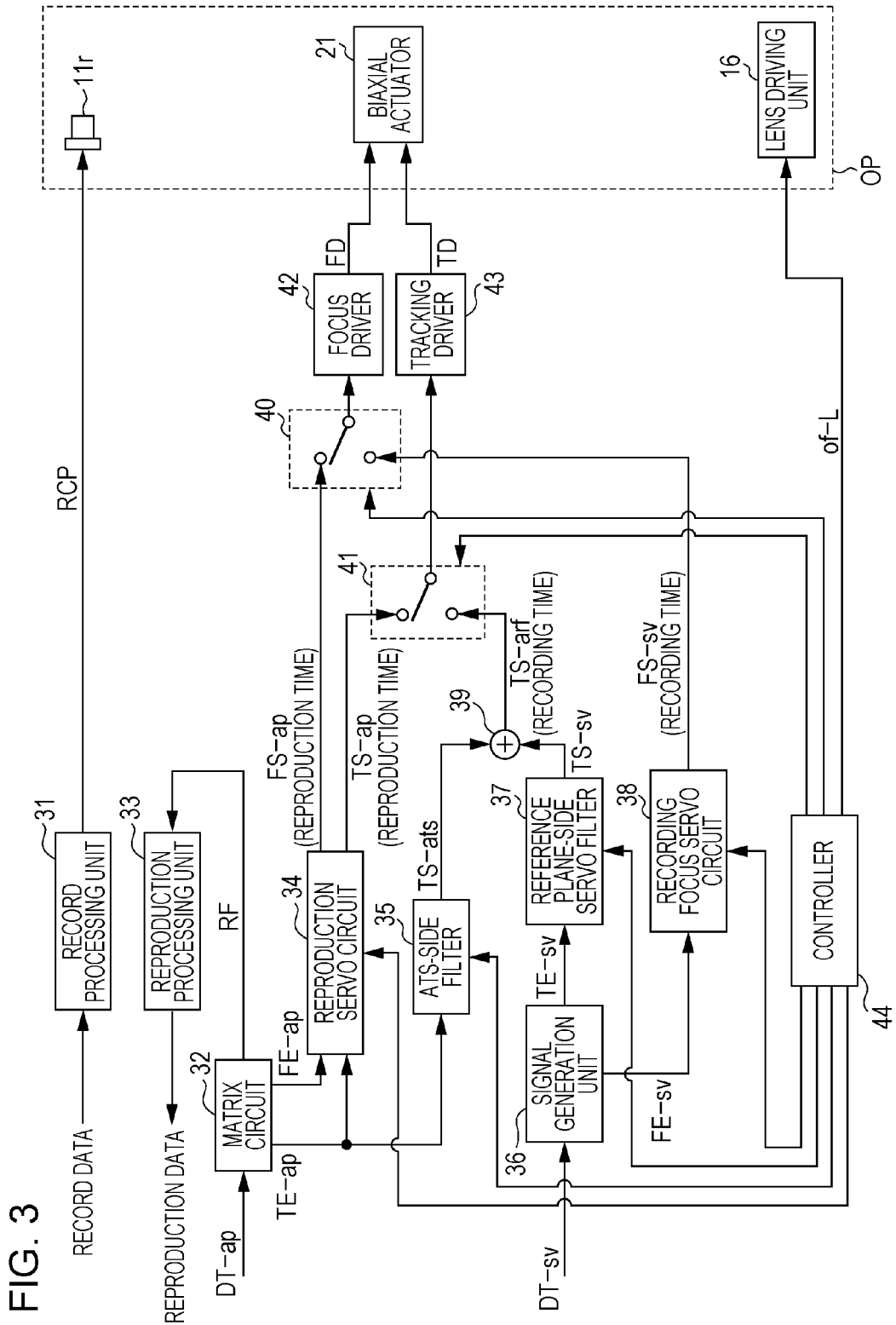
FIG. 3 is a diagram illustrating the entire inner configuration of the recording apparatus according to the embodiment.

FIG. 3 is a diagram illustrating the entire inner configuration of the recording apparatus according to the embodiment.

In FIG. 3, the recording laser 11r, the lens driving unit 16, and the biaxial actuator 21 shown in FIG. 2 are illustrated in the inner configuration of the optical pickup OP.

In FIG. 3, in the recording apparatus, a record processing unit 31, a matrix circuit 32, a reproduction processing unit 33, a reproduction servo circuit 34, and an ATS-side filter 35 are installed as a signal processing system for the recording laser beam and the ATS beam.

Data (recording data) to be recorded on the bulk recording medium 1 is input to the record processing unit 31. The record processing unit 31 obtains a record modulation data line, which, for example, is a binary data line of "0" and "1" actually recorded on the bulk recording medium 1 by performing error correction sign addition, predetermined record modulation encoding, address information addition and the like on the input recording data. The recording laser 11r in the optical pickup OP is driven to emit the beam by the use of a record pulse signal RCP generated based on the record modulation data line.

The light reception signal DT-ap from the above-described first light-receiving unit 23 is input to the matrix circuit 32.

The matrix circuit 32 generates various signals necessary for a matrix calculation process based on the light reception signal DT-ap.

In this example, the ATS beam is assumed to be used as a reproduction laser beam at the reproduction time (reproduction time of user data) of the signals recorded with the mark line in the bulk layer 5. Further, at the reproduction time, the focus servo control and the tracking servo control are performed on the previously recorded mark line by the use of the reflected beam of the ATS beam.

On the other hand, the matrix circuit 32 is configured to generate a high-frequency wave signal (sum signal: hereinafter, referred to as reproduction signal RF) corresponding to a reproduction signal of the above-described record modulation data line, a focus error signal FE-ap (which is a signal indicating a focus error of the mark line) used for the focus servo control, and a tracking error signal TE-ap (which is a signal indicating a position error in the radial direction for the previously recorded mark line of the adjacent track servo spot Sats) used for the tracking servo control based on the light reception signal DT-ap.

The reproduction signal RF generated by the matrix circuit 32 is supplied to the reproduction processing unit 34.

The focus error signal FE-ap is supplied to the reproduction servo circuit 34.

The tracking error signal TE-ap is supplied to the reproduction servo circuit 34 and the ATS-side filter 35 so as to be used for the position control during the recording time described below.

The reproduction processing unit 33 performs a reproduction process such as a digitalization process or a decoding error correction process for the record modulation encoding on the reproduction signal RF to restore the above-described recording data and obtains reproduction data obtained through reproduction of the recording data.

The reproduction processing unit 33 also detects address information embedded in the data recorded with the mark line. Although not illustrated in the drawing, the detected address information is supplied to the controller 44.

The reproduction servo circuit 34 generates the focus servo signal FS-ap and the tracking servo signal TS-ap based on the focus error signal FE-ap and the tracking error signal TE-ap, respectively, under an instruction from the controller 44. Here, the focus servo signal FS-ap is a signal for tracking (cancelling a focus error) the focusing position of the ATS beam to the information recording layer position (mark-formed layer position) L to be recorded. The tracking servo signal TS-ap is a signal for tracking (cancelling a tracking error) the spot position of the ATS beam to the mark line.

The focus servo signal FS-ap and the tracking error signal TS-ap are used at the reproduction time.

As shown in the drawing, the focus servo signal FS-ap is supplied to the selector 40 and the tracking error signal TS-ap is supplied to the selector 41.

The ATS-side filter 35 generates a tracking servo signal TS-ats based on the tracking error signal TE-ap under an instruction from the controller 44.

Specifically, the ATS-side filter 35 performs filter processing for tracking servo such as phase compensation on the tracking error signal TE-ap to generate the tracking servo signal TS-ats for cancelling the tracking error shown in the tracking error signal TE-ap.

At this time, the ATS-side filter 35 is configured so as not to cause a peak in a loop of the ATS such as whole integration or first-order LPF (lowpass filter).

As shown in the drawing, the tracking servo signal TE-ats is supplied to an addition unit 39.

The recording apparatus further includes a signal generation unit 36, a reference plane-side servo filter 37, and a recording focus servos circuit 38 as a signal processing system for the reflected beam of the servo laser beam.

The signal generation unit 36 generates a necessary signal based on light reception signals DT-sv from the plurality of light-receiving elements of the second light-receiving unit 29 shown in FIG. 2.

Specifically, the signal generation unit 36 generates a tracking error signal TE-sv indicating a position error of a radiation spot position of the servo laser beam for the position guiders (track) formed on the reference plane Ref in the radial direction based on the light reception signal DT-sv.

The signal generation unit 36 generates a focus error signal FE-sv indicating a focus error of the servo laser beam for the reference plane Ref (selection reflection film 3) as a signal for the focus servo control during the recording time.

Figure 16:
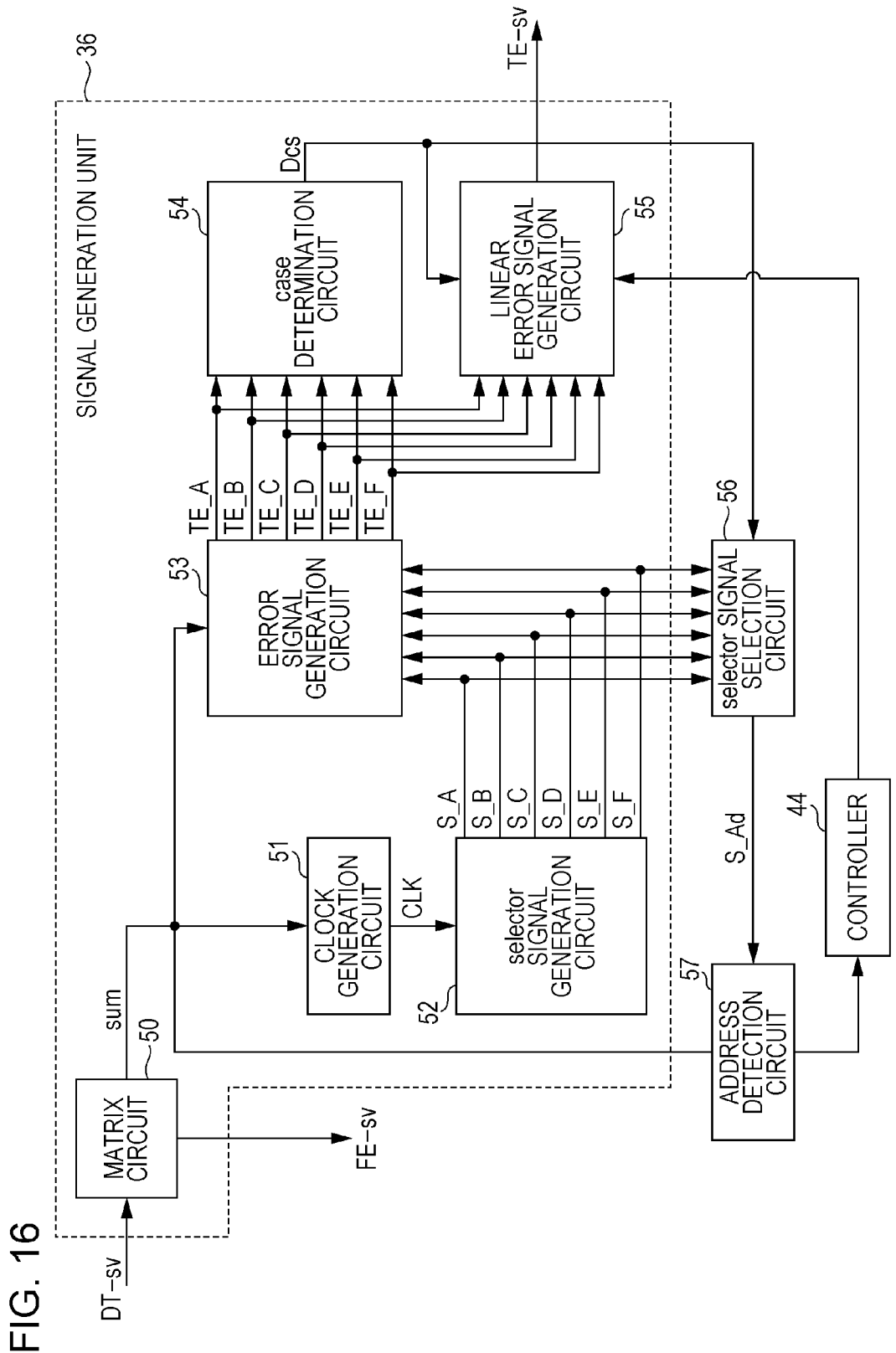
FIG. 16 is a diagram mainly illustrating the inner configuration of a signal generation unit (reference plane-side tracking error signal generation unit) of the recording apparatus according to the embodiment.

In this example, as apparent from the following description, the recording apparatus has a configuration (a selector signal selection circuit 56 and an address detection circuit 57 in FIG. 16) for detecting the position information recorded on the reference plane Ref. In such a configuration, the signal generation unit 36 also generates a signal for detecting the position information.

The configuration for detecting the position information of the reference plane Ref is not illustrated to facilitate the description in FIG. 3. However, the specific description will be amended below.

The focus error signal FE-sv generated by the signal generation unit 36 is supplied to the recording focus servo circuit 38.

The recording focus servo circuit 38 generates a focus servo signal FS-sv based on the focus error signal FE-sv under an instruction from the controller 44 and outputs the focus servo signal FS-sv to the above-described selector 40.

Here, the selector 40 is configured to select the focus servo signal FS-sv (that is, a servo control signal for tracking the focal position of the servo laser beam to the reference plane Ref) from the recording focus servo circuit 38 during the recording time and to select the focus servo signal FS-ap (that is, a servo control signal for tracking the focal position of the ATS beam to the information recording layer position L to be reproduced) from the reproduction servo circuit 35 at the reproduction time under an instruction from the controller 44.

The focus servo signal FS selected by the selector 40 is supplied to a focus driver 42.

The focus driver 42 drives the focus coil of the biaxial actuator 21 based on a focus driving signal FD generated based on the supplied focus servo signal FS.

Thus, during the recording time, the object lens 20 is driven so as to track the focal position of the servo laser beam to the reference plane Ref. At the reproduction time, the object lens 20 is driven so as to track the focal position of the ATS beam to the information recording layer position L to be reproduced.

As described below, the focus control (the focus control for focusing on the information recording layer position L to be recorded) for the ATS beam (and the recording laser beam) during the recording time is realized by the control of the lens driving unit 16.

The tracking error signal TE-sv generated by the signal generation unit 36 is also supplied to the reference plane-side servo filter 37.

The reference plane-side servo filter 37 generates the tracking servo signal TS-sv for tracking (cancelling the tracking error) the spot position of the servo laser beam to the position guiders on the reference plane Ref based on the tracking error signal TE-sv under an instruction from the controller 44.

The reference plane-side servo filter 37 generates the tracking servo signal TS-sv by performing the filter processing for the tracking servo such as phase compensation on the tracking error signal TE-sv.

The tracking servo signal TS-sv generated by the reference plane-side servo filter 37 is supplied to the addition unit 39.

The addition unit 39 adds the tracking servo signal TS-sv and the tracking servo signal TS-ats supplied from the ATS filter 35, as described above, and outputs the result as a tracking servo signal TS-arf to the selector 41.

The selector 41 selects the tracking servo signal TS-arf from the addition unit 39 during the recording time and selects the tracking servo signal TS-ap from the reproduction servo circuit 35 at the reproduction time under an instruction from the controller 44.

The tracking servo signal TS selected by the selector 41 is supplied to a tracking driver 43.

The tracking driver 43 drives the tracking coil of the biaxial actuator 21 based on a tracking driving signal TD generated based on the supplied tracking servo signal TS.

Thus, at the reproduction time, the object lens 20 is driven so as to track the spot position of the ATS beam to the mark line based on the tracking servo signal TS-ap.

Further, during the recording time, the object lens 20 is driven based on a servo control signal, on which both a tracking error component of the ATS beam and a tracking error component of the servo laser beam are reflected, as the tracking servo signal TS-arf.

The controller 44 is configured by a microcomputer which includes a CPU (Central Processing Unit) and a memory (storage device) such as a ROM (Read Only Memory) or a RAM (Random Access Memory). For example, the entire recording apparatus is controlled by performing a control process in accordance with a program stored in the ROM or the like.

For example, the controller 44 controls (sets) the focusing positions of the recording laser beam and the ATS beam during the recording time based on the value of the offset of-L set in advance in correspondence to each of the information recording layer positions L, as described above. Specifically, the recording position and the focusing position of the ATS beam in the depth direction are selected by driving the lens driving unit 16 of the optical pickup OP based on the value of the offset of-L set in correspondence to the information recording layer position L to be recorded.

The controller 44 performs control for the focus servo and the tracking servo of the methods corresponding to the recording time and the reproduction time.

Specifically, on the focus servo side, the recording focus servo circuit 38 is allowed to generate the focus servo signal FS-sv and the selector 40 is allowed to select the focus servo signal FS-sv so that the focus servo control of the objet lens 20 is performed based on the reflected beam of the servo laser beam during the recording time.

Further, at the reproduction time, the reproduction servo circuit 34 is allowed to generate the focus servo signal FS-ap and the selector 40 is allowed to select the focus servo signal FS-ap so that the focus servo control of the object lens 20 is performed based on the reflected beam of the ATS beam from the mark line.

In regard to the tracking servo, during the recording time, the reference plane-side servo filter 37 and the ATS-side filter 35 are allowed to generate the tracking servo signal TS-sv and the tracking servo signal TS-ats, respectively, and the selector 41 is allowed to select the tracking error TS-arf as a synthesized component so that tracking servo control of the object lens 20 is performed based on the reflected beam of the servo laser beam and the reflected beam of the ATS beam.

Further, at the reproduction time, the reproduction servo circuit 34 is allowed to generate the tracking servo signal TS-ap and the selector 41 is allowed to select the tracking servo signal TS-ap so that the tracking servo control of the object lens 20 is performed based on the reflected beam of the ATS beam.

1-3. Servo Control Method

Here, the recording apparatus described according to the embodiment has a servo control system (reference plane-side servo control system) which includes the signal generation unit 36, the reference plane-side servo filter 37, and the tracking driver 43 and which performs the tracking servo control of the object lens 20 based on the position guiders formed on the reference plane Ref. That is, there is formed a tracking servo loop in which the tracking servo control is performed based on the position guiders of the reference plane Ref.

In this embodiment, the reference plane-side servo control system and a servo control system by the ATS are configured as the tracking servo control system during the recording time. Specifically, the matrix circuit 32, which generates the tracking error signal TE-ap indicating the tracking error for the mark line of the ATS beam based on the reflected beam of the ATS beam, and the ATS-side filter 35, which generates the tracking servo signal TS-ats from the tracking error signal TE-ap are set. The tracking servo signal TS-ats generated by the ATS-side filter 35 is configured to be provided to the reference plane-side tracking servo loop by the addition unit 39.

That is, the tracking servo signal TS-ats is configured to be provided as a target value (control target value) of the reference plane-side servo control system. In other words, the tracking servo loop of the reference plane-side servo control system serves a minor loop and the tracking servo signal TS-ats is input as a target value of the minor loop.

With such a configuration, the tracking error of the ATS control system occurs due to a spot position deviation (in this case, a spot position deviation between the servo laser beam and the ATS beam), which is described above with reference to FIGS. 29A to 29C, mainly caused by the lens shift or the like of the object lens 20.

When ATS-side tracking error information is supplied as a control target value of the reference plane-side servo control system, the object lens 20 is driven so that the spot position of the ATS tracks the mark line.

As understood from this description, it is possible to prevent the problem of the recording mark line overlapping or intersecting the adjacent mark line, as in a single ATS, according to the tracking servo control method of this embodiment.

As understood from the above description, the reference plane-side servo control system including the reference plane-side servo filter 37 undertakes a function of mainly tracking a normal disturbance component (that is, a disturbance component with a frequency higher than a disc eccentricity component or the like which is a cause of the spot position deviation involved with the above-described lens shift).

Thus, the control frequency band of the reference plane-side servo control system is set as the same control frequency band as that of a general servo control system. Specifically, in this example, the control band of the reference plane-side servo control system is set to about 10 kHz.

On the other hand, since the ATS control system including the ATS-side filter 35 has to be configured so as not to track the above normal disturbance component, the control frequency band is set to at least a frequency band lower than the control frequency band of the reference plane-side servo control system. Specifically, in this example, about 1 kHz is set as the control frequency band (cutoff frequency of the ATS-side filter 35) of the ATS control system.

Figure 32A:
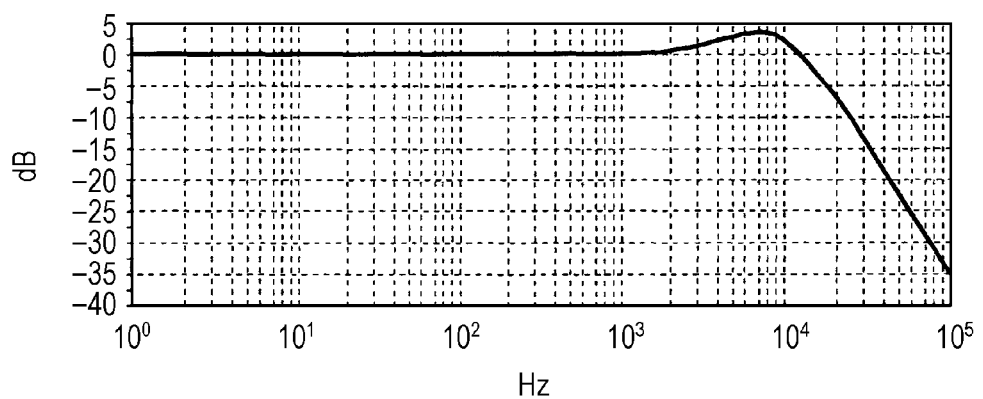
FIGS. 32A and 32B are diagrams illustrating a transfer characteristic of the ATS control system according to the related art.
Figure 32B:
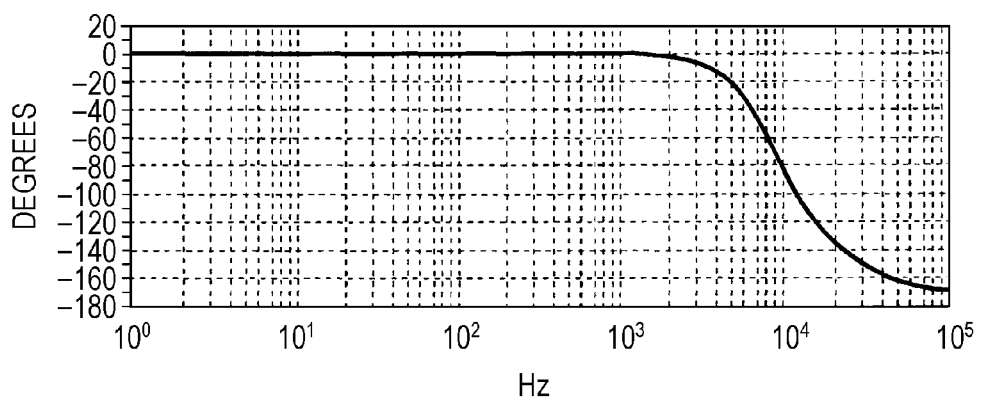
Figure 33:
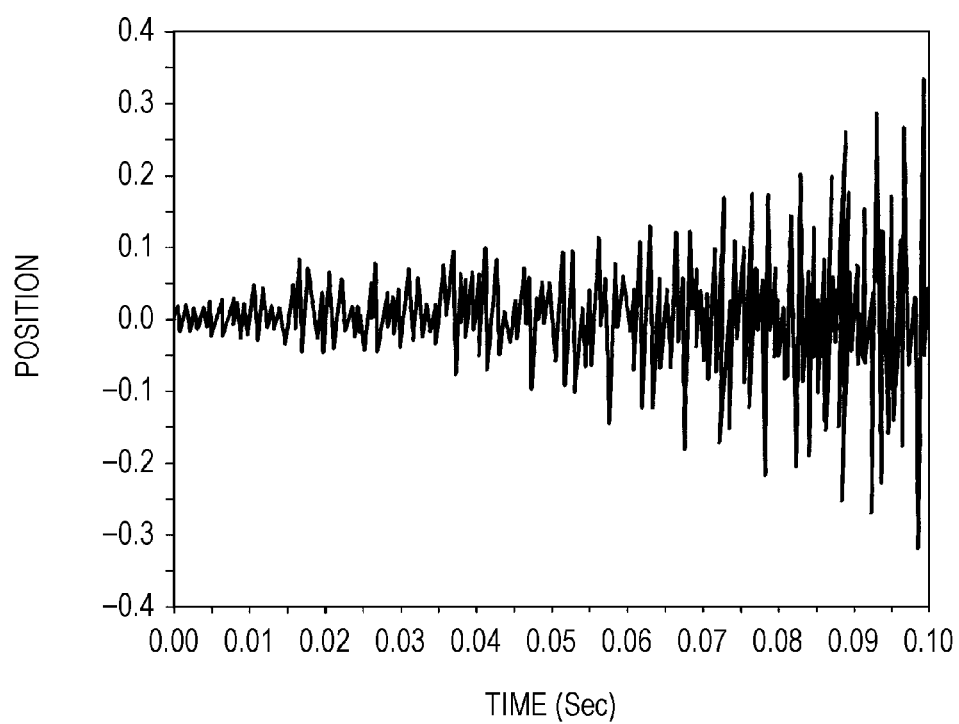
FIG. 33 is a diagram illustrating an output characteristic over time in the ATS control system according to the related art.

In the tracking servo control system according to the embodiment in which the tracking servo signal TS-ats is provided as the control signal of the ATS control system to the tracking servo loop (minor loop) of the reference plane-side servo control system, it is possible to prevent the peak of the transfer characteristic gain, which is described above with reference to FIG. 32, occurring in the single ATS control system according to the related art.

Figure 4A:
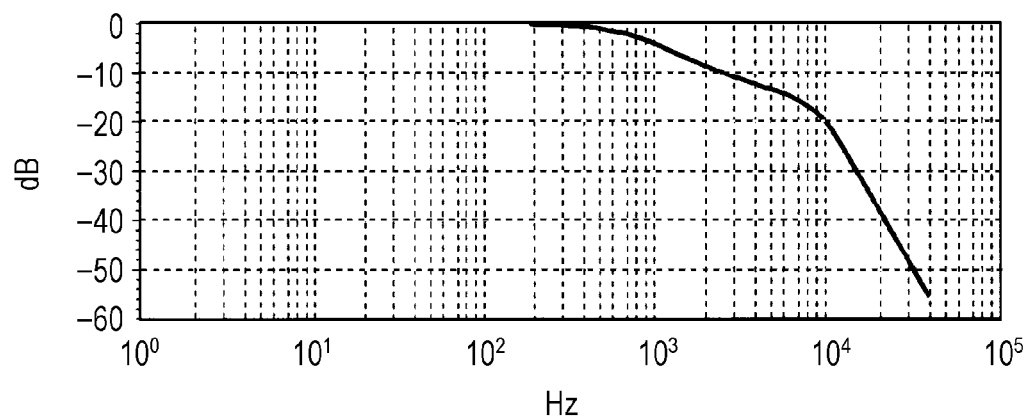
FIGS. 4A and 4B are diagrams illustrating a transfer characteristic of a tracking servo control system according to the embodiment.
Figure 4B:
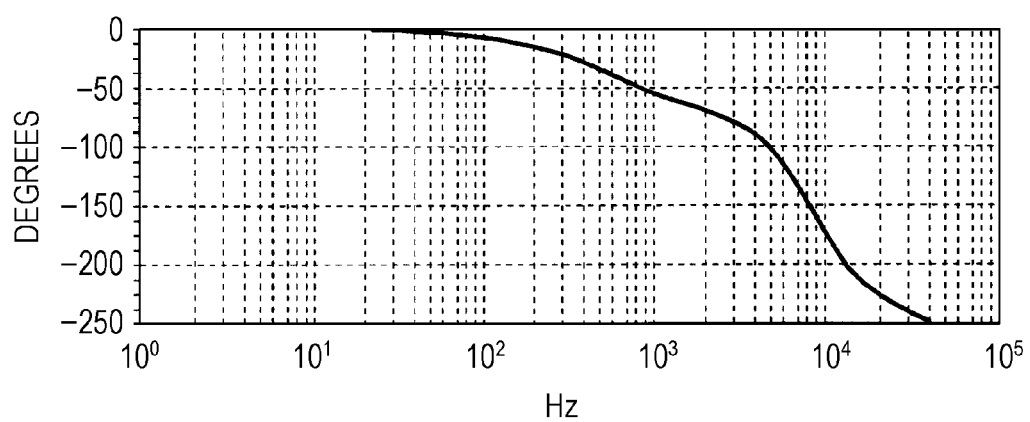

FIGS. 4A and 4B are diagrams illustrating a simulation result of the transfer characteristic of the tracking servo control system according to the embodiment. FIG. 4A shows a frequency-amplitude characteristics and FIG. 4B shows a frequency-phase characteristic.

As understood from FIGS. 4A and 4B, in the tracking servo control system according to the embodiment, the transfer characteristic gain is suppressed so as not exceed 0 dB in the entire control frequency band. Thus, it is possible to prevent the peak of the transfer characteristic gain from occurring in the single ATS control system according to the related art.

Since it is possible to prevent the peak of the transfer characteristic gain from occurring, it is possible to prevent the problem that the tracking error signal is increased and diverged over time. As a consequence, the tracking servo control of preventing the overlapping or intersecting of the recording mark lines from occurring can be realized stably compared to the case of the single ATS according to the related art.

2. Countermeasure for Spot Position Deviation of ½ or More Track Width

2-1. Problem with Spot Position Deviation

As described above, the tracking servo control system according to this embodiment is configured so that the spot position of the ATS beam tracks the mark line by providing the ATS-side tracking error information as the control target value of the reference plane-side servo control system.

That is, in other words, the spot position of the servo laser beam on the reference plane Ref may be offset from the servo target track only to the degree corresponding to the above-described spot position deviation as the ATS-side tracking error information in some cases.

In this case, there is a possibility that the spot position deviation reaches an amount corresponding to the width of a plurality of tracks. That is, for example, when the manufacturing precision of the bulk recording medium 1 is relatively low and the eccentricity of the disc or the tilt of the disc is relatively large, the spot position deviation becomes correspondingly large. Therefore, there is a possibility that the spot position deviation corresponding to the width of one or more tracks occurs.

When the spot position deviation is large, the error signal also becomes large in the reference plane-side servo control system. Accordingly, there is a possibility that the tracking servo may be deviated. For example, this is because when the spot position is separated from a target track by ½ or more tracks in a normal tracking error signal such as a push-pull signal, a return occurs in the waveform and thus the tracking servo control may not be appropriately performed.

In this embodiment, accordingly, even when the spot position is deviated by the ½ or more tracks in the track width on the reference plane Ref, the countermeasure has to be performed in order to maintain the tracking servo control state. Specifically, a linear tracking error signal for making the return of the waveform and expressing the error amount linearly is generated even when the tracking error occurs by the ½ or more tracks in the tracking error signal TE-sv.

2-2. Configuration of Reference Plane

First, pit lines described below are formed as the position guiders formed on the reference plane Ref in the generation of the linear tracking error signal.

A method of forming the pit lines on the reference plane Ref of the bulk recording medium 1 in this example will be described with reference to FIGS. 5 and 6.

Figure 5:
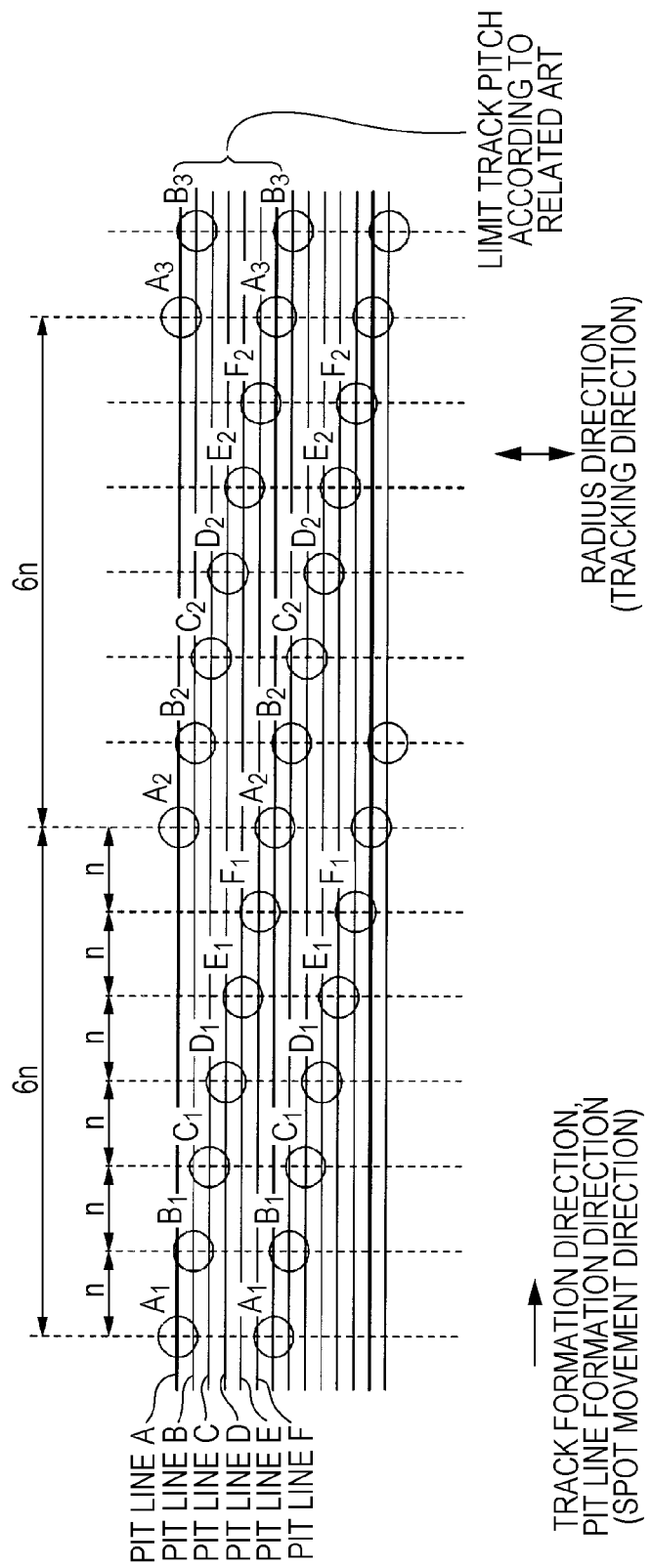
FIG. 5 is a partially expanded plan view illustrating the surface of the reference plane of the bulk recording medium according to the embodiment.

FIG. 5 is a partially expanded plan view illustrating the surface of the reference plane Ref (selection reflection film 3) of the bulk recording medium 1.

In FIG. 5, a direction oriented from the left side to the right side of the drawing is referred to as a pit line formation direction and eventually as a track formation direction (line direction). In this case, the spot radiated with the servo laser beam is moved from the left side to the right side of the drawing, as the bulk recording medium 1 is rotatably driven.

A direction (vertical direction in the drawing) perpendicular to the pit line formation direction is a radial direction of the bulk recording medium 1.

In FIG. 5, A to F indicated by white circles denote a pit formable position. That is, pits on the reference plane Ref is formed only at the pit formable position and is not formed at other positions other than the pit formable position.

The signs of A to F in the drawing are used to distinguish the pit lines (distinguish the pit lines arranged in the radial direction). The numerals annexed to the signs of A to F are used to distinguish the pit formable positions in the pit lines.

An interval indicated by a black thick line in the drawing represents the minimum track pitch (limit track pitch of the related art) realizable in the bulk recording medium 1 according to the related art. As understood from this description, a total of six pit lines A to F are formed in one limit track width of the related art in the bulk recording medium 1 according to this embodiment. That is, the pit lines are arranged at a pitch which exceeds the optical limit in the radial direction.

However, when the plurality of pit lines is simply arranged within one limit track width according the related art, there is a concern that the pit formation positions may overlap each other in the pit formation direction. Eventually, there is a concern that an interval of the pits in the pit line formation direction exceeds an optical limit.

Accordingly, in this example, the following conditions are determined so that the interval between the pits in the pit line formation direction does not exceed the optical limit between the plurality of pit lines A to F arranged within one limit track width of the related art.

That is, the following conditions are as follows.

1) In the pit lines A to F, the interval of the pit formable positions is restricted to a predetermined first interval.

2) The pit lines A to F in which the interval of the pit formable positions is restricted are arranged so that the pit formable positions are deviated by a predetermined second interval in the pit line formation direction (that is, the phases of the pit lines are deviated at the second interval).

An interval (the second interval) n is set in the pit line formation direction at the respective pit formable positions in the pit lines A to F arranged in the radial direction. At this time, by arranging the pit lines A to F so as to satisfy the condition 2), the intervals between the pit formable positions of the pit lines A-B, the pit lines B-C, the pit lines C-D, the pit lines D-E, the pit lines E-F, and the pit lines F-A all become n.

The interval (the first interval) between the pit formable positions in the pit lines A to F becomes 6 n since the phases of the total of six pit lines A to F are realized.

In this example, the information reproduction and the servo control are performed by the servo laser beam on the reference plane Ref under the condition that the wavelength λ is equal to about 650 nm and an aperture number NA is equal to about 0.65, as in a DVD (Digital Versatile Disc). In this example, the section length of each pit formable position is set to a section length of 3 T (where T is a channel bit) like the shortest mark in the DVD. An interval between the edges of the pit formable positions of A to F in the pit line formation direction is set to a length corresponding to the same 3 T. That is, n is thus equal to 6 T.

As a consequence, the conditions 1) and 2) are satisfied.

A specific method of forming the pit lines will be described with reference to FIG. 6 to understand the method of forming the pits in the entire reference plane Ref.

Figure 6:
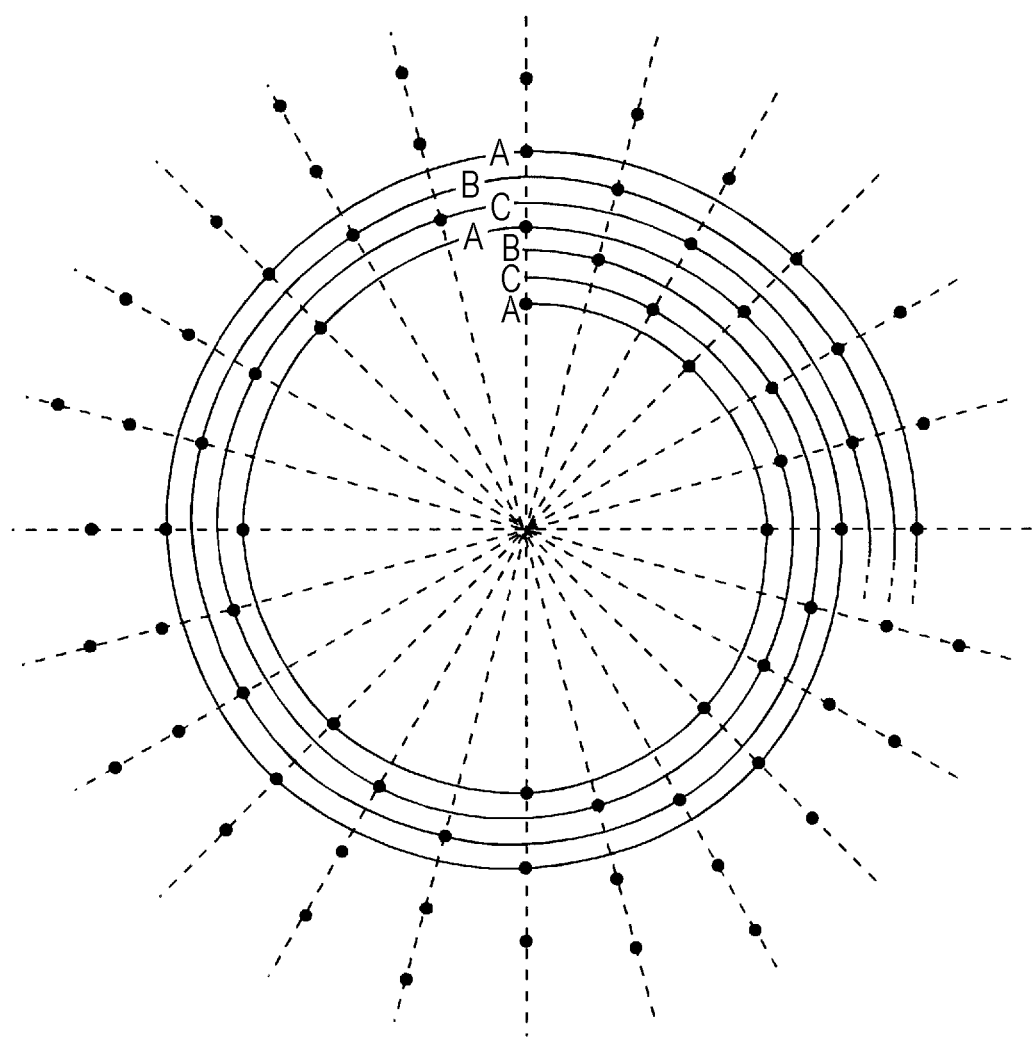
FIG. 6 is a diagram illustrating a method of forming pits on the entire reference plane.

In FIG. 6, only three types A to C (phases) of pit lines are exemplified to facilitate the illustration.

In the drawing, a black circle indicates the pit formable position.

As understood with reference to FIG. 6, a plurality of types of pit lines (in FIG. 6, three types A to C of pit lines are illustrated, but six types A to F of pit lines are actually used) with different phases are used as one set on the reference plane Ref of the bulk recording medium 1. One set of the plural types of pit lines is formed in a spiral shape.

Thus, the spot positions are drawn in the spiral shape by continuously performing the tacking servo on one type of pit line necessary among the plural types of pit lines.

The pits are formed on the reference plane Ref by a CAV (Constant Angular Velocity) method. Thus, as shown in the drawing, the plurality types of pit lines are uniform at the angle positions at which the pit formation positions (pit formable positions) are the same as each other in the radial direction.

The reason for recording the pits on the reference plane Ref in accordance with the CAV method is to maintain the phase relationship between the pit lines A to F in any region on the disc, as shown in FIG. 5.

2-3. Address Information

Next, an example of the format of the address information recorded on the reference plane Ref will be described with reference to FIGS. 7A to 7C.

The following description up to FIG. 10 will be made under the assumption that a signal based on the push-pull signal is generated as the tracking error signal (individual tracking error signal) for convenience. As apparent from the following description, a signal based on the sum signal is generated as the tracking error signal in the actual configuration.

FIG. 7A is a diagram schematically illustrating a relationship of the pit formable positions of the pit lines (A to F) configured to have pit line phases different from each other. In FIG. 7A, a "*" mark indicates the pit formable position.

In the embodiment, as described below, one pit line is selected among the pit lines A to F and the tracking servo is performed on the selected one pit line.

However, there is a problem in that the pit line A to F are each arranged at the pitch exceeding the optical limit in the radial direction. That is, since a signal to which all of the pit lines A to F are reflected is used as the tracking error signal (push-pull signal) obtained by moving (scanning) the radiation spot of the servo laser beam on the track in this case, the selected pit line may not be tracked even when the tracking servo is performed based on the track error signal.

For this reason, a basic concept in the embodiment is that the tracking error signal is sampled at a timing of the pit formable position in the selected pit line and the tracking servo is performed (intermittently) using the value of the sampled tracking error signal.

Likewise, even when the address information is read, the sum signal is sampled at the timing of the pit formable position of the selected pit line so that only information recorded in the selected pit line is selectively read and a method of detecting the address information based on the value is adopted.

In this example, in order to correspond to the method of detecting the address information, a format which expresses "0" and "1" of channel bits (recording signs) is used depending on whether the pits are formed at the pit formable positions. That is, one pit formable position has information corresponding to one channel bit.

Further, it is assumed that one bit of data bit is expressed by a data pattern of "0" and "1" by the use of the plurality of channel bits.

Specifically, in this example, as shown in FIG. 7B, for example, a pattern "1011" of four channel bits expresses a data bit "0" and a pattern "1101" of four channel bits expresses a data bit "1", when "0" and "1" of the data bits are expressed with four channel bits.

At this time, the important point is that "0" does not continue. That is, this is because the fact that the channel bit "0" continues means that a period in which an error signal may not be obtained continues on the basis of the above-described basic concept that the tracking servo is performed intermittently using the sampled tracking error signal, and thus it is very difficult to ensure the precision of the tracking servo.

For this reason, in this example, for example, the condition that the channel bit "0" does not continue by the above definition of the data bit is set to be satisfied. That is, the precision of the tracking servo is suppressed so as to be as small as possible by the above definition of the data bit.

FIG. 7C is a diagram illustrating an example of a sync pattern.

For example, the sync pattern is expressed by twelve channel bits, as shown in the drawing. The former eight bits of the sync pattern is configured to a channel bit pattern "11111111", which is not suitable for the definition of the data bit, and a pattern of the latter four channel bits is configured to indicate a type (kind) of sync. Specifically, when the pattern of the four channel bits subsequent to the former eight bits is "1011", the pattern of the four channel bits is configured as Sync1. When the pattern of the four channel bits is "1101", the pattern of the four channel bits is configured as Sync2.

In the bulk recording medium 1, the address information is assumed to be recorded after the above sync.

As described above, absolute position information (radius position information and rotation angle information) on the disc is recorded as the address information.

In this example, as described above, the plurality of pit lines A to F is arranged within one limit track width of the related art. However, the address information is recorded so that individual information is assigned to each pit line in order to individually indicate the radius position of the respective pit lines (identify the respective pit lines from each other). That is, the same address information is not recorded in each of the pit lines A to F arranged in one limit track width of the related art.

As understood from the description of FIGS. 7A to 7C, the pits are subjected to position recording on the reference plane Ref of the bulk recording medium 1. The position recording refers to a recording method of recording a pit (or mark) formation portion with the channel data "1" and other portions with the channel data "0."

2-4. Method of Selecting Servo Target Pit Line

As a method of performing the tracking servo on any target pit line among the pit lines arranged within one limit track width of the related art, specifically, a method described below is used as a basic method.

FIG. 8 is a diagram schematically illustrating movement of the spots of the servo laser beam on the reference plane Ref as the bulk recording medium 1 is rotationally driven and a relationship among the waveforms of a sum signal, a sum differential signal, and a push-pull signal PP (also referred to as a PP signal) obtained at this time.

The sum signal is the sum signal of the light reception signal DT-sv from the plurality of light-receiving elements serving as the second light-receiving unit 29 shown in FIG. 2. The sum differential signal is a signal obtained by differentiating the sum signal.

Here, to facilitate the description, it is assumed that the pits are formed at all of the pit formable positions in the drawing.

As shown in the drawing, as the beam spot of the servo laser beam is moved with the rotation of the bulk recording medium 1, the sum signal has its peak of the signal level at a period corresponding to the arrangement interval of the pits A to F in the pit line formation direction. That is, the sum signal is expressed at the interval (formation period) in the pit line formation direction of the pits A to F.

In the example of the drawing, since the spot of the servo laser beam is moved along the pit line A, the sum signal has a tendency in which its peak value becomes the maximum (absolute value) when the sum signal passes the formation position of the pit A in the pit line formation direction and its peak values are gradually decreased along the formation positions of the pits B to D. Thereafter, the tendency changes such that the peak value is increased sequentially at the formation position of a pit E→the formed position of a pit F and the peak value becomes the maximum again at the formation position of the pit A. That is, since the pits in the pit lines E and F adjacent to the outer circumference have an influence on the formation positions of the pits E and F in the pit line formation direction, the peak value of the sum signal increases sequentially at the pits E and F.

Further, the waveforms of the sum differential signal generated by differentiating the sum signal and the PP signal serving as the tracking error signal can be obtained, as shown in the drawing.

The sum differential signal is used to generate a clock CLK corresponding to an interval between the pit formation positions (precisely, the pit formable position) of the respective pit lines A to F in the pit line formation direction.

Specifically, at the clock CLK, a signal formed by using a position (timing) corresponding to the center position (peak position) of each pit as the initial start position (timing) is generated using the sum differential signal.

As the method of generating the clock CLK, as shown in FIG. 9, a signal formed by slicing the sum signal with a predetermined threshold value Th1 is first generated and a signal formed by slicing the sum differential signal with a predetermined threshold value Th2 is generated. Then, a timing signal with a rise timing corresponding to the peak position is generated by taking AND of the generated signals.

The clock CLK is generated by performing a PLL (Phase Locked Loop) process by using the generated timing signal as an input signal (reference signal).

Figure 10:
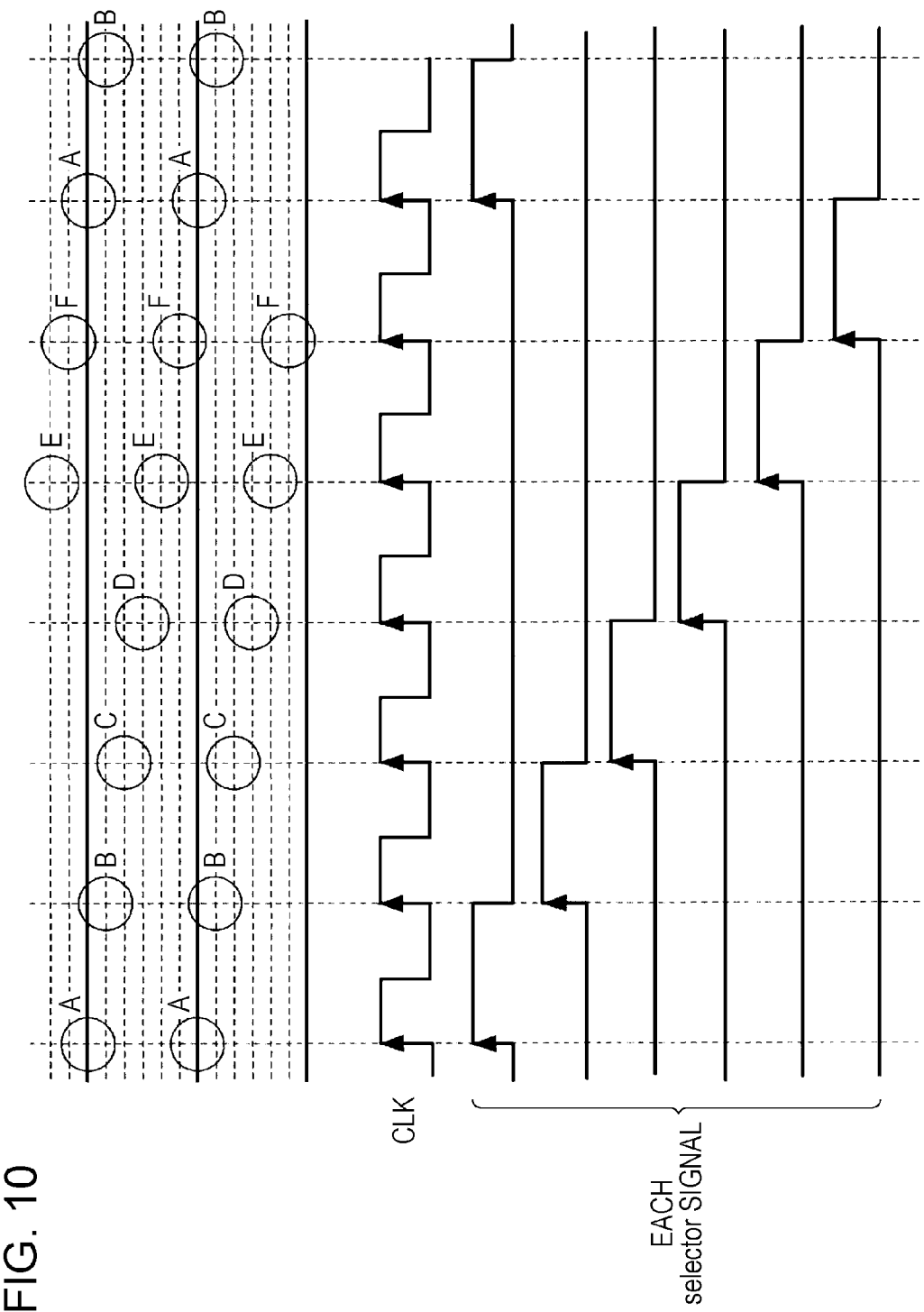
FIG. 10 is a diagram schematically illustrating a relationship among a clock generated from a timing signal indicating a peak timing, the waveform of each selector signal generated based on the clock, and respective pit lines (parts of respective pit lines) formed on the reference plane.

FIG. 10 is a diagram schematically illustrating a relationship among the clock CLK generated in the above-described order, the waveforms of respective selector signals generated based on the clock CLK, and the respective pit lines (parts of the pit lines) formed on the reference surface Ref.

As apparent from the drawing, the clock CLK serves as a signal which has a period corresponding to the formation interval of the pits A to F. Specifically, the clock CLK serves as a signal which has the rise timing at the peak positions of the pits A to F.

Six types of selector signals indicating the timings of the pit formable positions of the pits A to F, respectively, are generated from the clock CLK.

Specifically, these selector signals are generated by dividing the clock CLK into six, and thus the phases of the selector signals are each shifted by a ⅙ period. In other words, these selector signals are generated by dividing the clock CLK into six at respective timings so that the rise timings are each shifted by the ⅙ period.

The selector signals are signals which indicate the timings of the pit formable positions of the pit lines corresponding to A to F. Accordingly, the tracking error signal for tracking one pit line among the pit lines A to F can be obtained by generating these selector signals, selecting any selector signal, and performing a sample and hold process on the tracking error signal (push-pull signal) at the timing indicated by the selected selector signal. That is, the spot of the servo laser beam can be traced on any pit line (that is, track) among the pit lines A to F by performing the tracking servo control on the object lens 20 based on the generated tracking error signal.

2-5. Problem with Method of Sampling Push-pull Signal and Countermeasure

In the above description, when any pit line is selected as the servo target, the push-pull signal as the tracking error signal is subjected to the sample and hold process. However, when the push-pull signal is used, there is a concern that the exact tracking error information may not be obtained due to so-called tilt (skew) or the lens shift of the object lens 20.

Figure 11A:
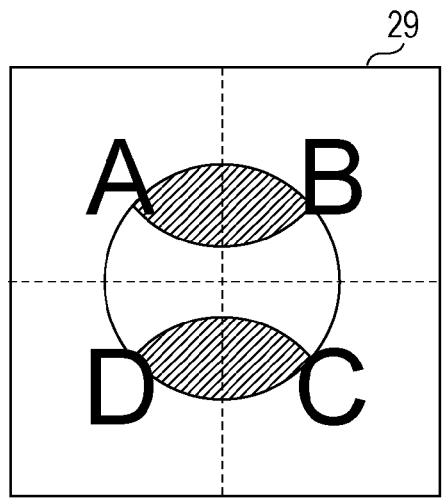
FIGS. 11A and 11B are diagrams illustrating a light reception spot position deviation of a reflected beam involved with tilt or lens shift.
Figure 11B:
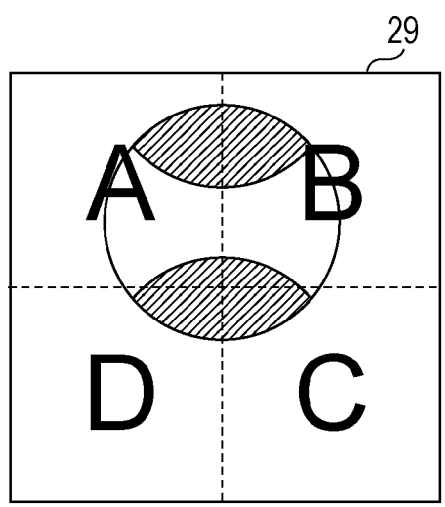

FIGS. 11A and 11B are diagrams illustrating light reception spot position deviation of the reflected beam caused due to the tilt or the lens shift. FIG. 11A shows a reflected beam spot (light reception spot) on the second light-receiving unit 29 in an ideal state when the tilt or the lens shift does not occur. FIG. 11B shows a reflected beam spot on the second light-receiving unit 29 in a state where the tilt or the lens shift occurs. Diagonal lines shown in the reflected beam spots in FIGS. 11A and 11B indicate an overlapping region (push-pull signal component overlapping region) of a diffracted light component from the pit formed on the disc.

As an assumption, a pair of light-receiving elements A and B and a pair of light-receiving elements C and D in the drawings are pairs adjacent in the direction corresponding to the radial direction of the disc, the push-pull signal (PP) is calculated by the following expression.

$$PP=(Ai+Bi)-(Ci+Di) \quad \text{[Expression 1]}$$

In Expression 1, $Ai$, $Bi$, $Ci$, and $Di$ are light reception signals of the light-receiving elements A, B, C, and D, respectively.

Here, it is assumed that the radiation spot of the servo laser beam is traced exactly on the target pit line. In this case, the value of the push-pull signal PP calculated by Expression 1 becomes "0" in the ideal state where the tilt or the lens shift does not occur in FIG. 11A.

However, when the reflected beam spot position deviation involved with the tilt or the lens shift occurs as in FIG. 11B, the value of the push-pull signal PP calculated by Expression 1 becomes a value different from "0", which is the originally obtained value. Therefore, an error may occur.

As understood from this fact, an offset caused due to the tilt or the lens shift occurs in the push-pull signal PP.

When an offset component caused due to the tilt or the lens shift occurs can be ignored, the method of generating the tracking error signal described above is effective. However, in order to improve the reliability of the tracking servo control, the above offset component does not preferably overlap in the tracking error signal.

In order to avoid the influence of the offset caused due to the tilt or the lens shift, a so-called 3-spot method according to the related art is known as the method of detecting the tracking error. However, in the 3-spot method, an optical component such as a grating is additionally necessary, thereby increasing the component cost or adjustment cost.

In order to avoid the influence of the offset, a DPP (Differential Push Pull) method is also known as the method of detecting the tracking error. However, even in the DPP method, an optical component such as a grating is additionally necessary, thereby increasing the component cost or adjustment cost.

In order to resolve the problem of the method of detecting the tracking error according to the related art and avoid the influence of the offset component caused due to the tilt or the lens shift, there is provided a method of generating the tracking error signal in according with the method of using the sum signal in this example, as described below.

Figure 12:
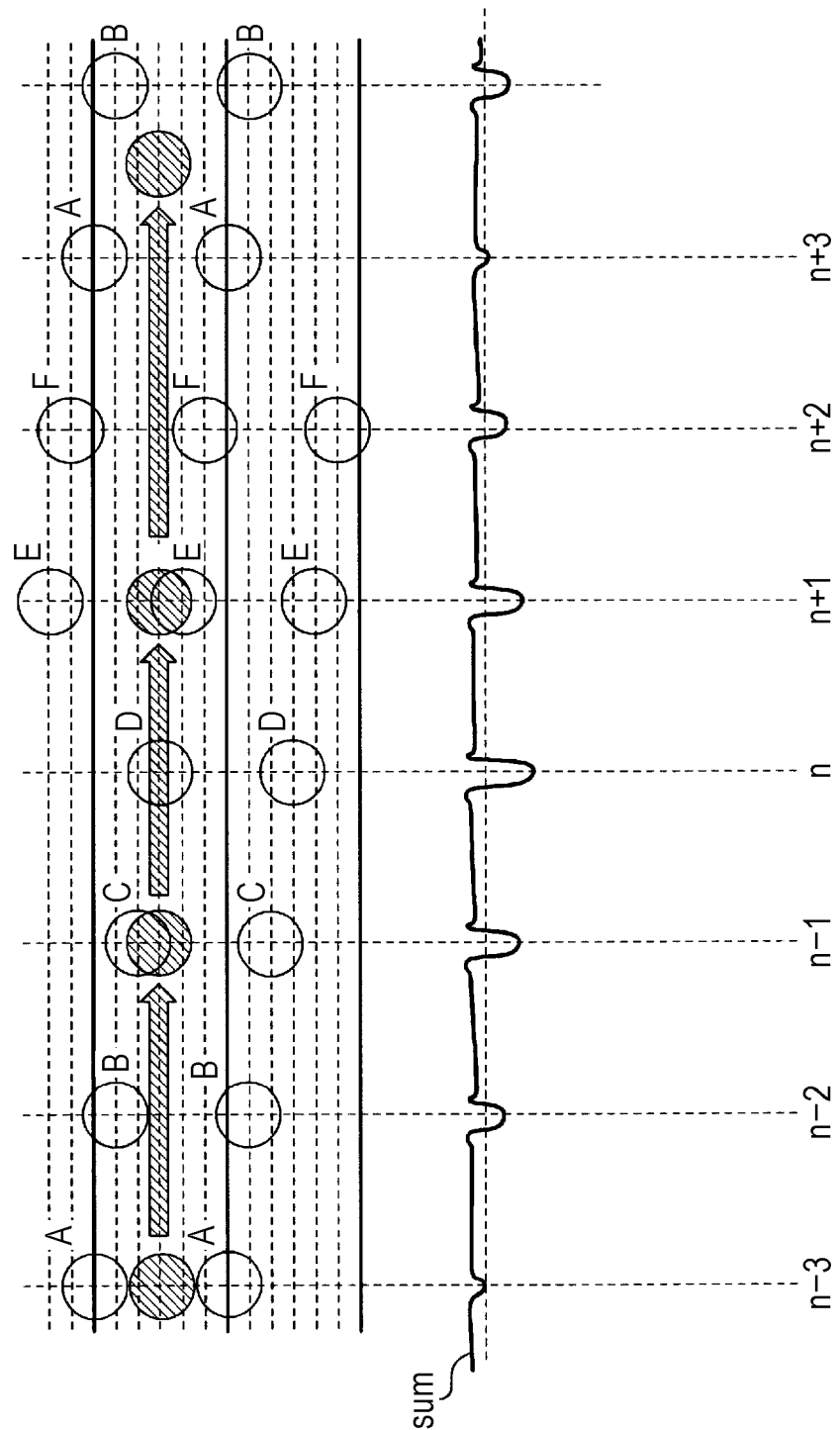
FIG. 12 is a diagram illustrating a method of generating each tracking error signal.

FIG. 12 is a diagram illustrating a method of generating each tracking error signal in each pit line.

FIG. 12 shows the pit lines A to F formed on the reference plane Ref, a movement trajectory (diagonal portion) of the spot position of the servo laser beam in the state where the tracking servo is performed so as to trace the pit line D, and the waveform of the sum signal obtained with the movement of the servo laser beam.

For example, when the spot of the servo laser beam exactly traces the pit line D, as shown in FIG. 12, the minimum value at the timing (n in the drawing) identical to the pit formation position on the pit line D is used as the value of the sum signal, the value tends to become large gradually at the pit formation position by the pit line in which a phase difference is large for the pit line D.

At this time, as the value of the sum signal, the same value is taken at timings (n−1 and n+1 in the drawing) identical to the pit formation positions of the pit lines C and E adjacent to (that is, having the same phase difference) the pit line D, and the same value is also taken at timings (n−2 and n+2 in the drawing) identical to the pit formation positions of the pit lines B and F distant from (that is, having the same phase difference) the pit line D by the same distance (distance in the radial direction).

Here, unlike the state shown in the drawing, when the spot of the servo laser beam traces the position deviated in the radial direction on the pit line D, it can be understood that a deviation occurs in the value of the sum signal at the pit formation positions of the pair of pit lines with the same phase difference with respect to the pit line D.

As understood from this fact, the value of the sum signal at the pit formation positions of the pair of pit lines with the same phase difference with respect to the pit line to be subjected to the tracking servo reflects the error for the pit line to be subjected to the tracking servo in the tracking direction. Specifically, the tracking error information can be obtained by calculating a difference between the values of the sum signals at the pit formation positions of the pair of pit lines with the same phase difference.

In this example, specifically, the tracking error signal is generated based on the sum signal in the following way in consideration of this fact.

That is, two pit lines with the same phase difference with respect to the pit line in which the tracking error is desired to be detected are first selected. Specifically, the pit lines adjacent to the target pit line are selected in this example.

Further, the values of the sum signal are sampled at the timings (n−1 and n+1 in FIG. 12) corresponding to the pit formable positions of the selected pit lines and a difference between the sampled values of the sum signal is calculated. The calculation result is the tracking error signal for the pit line in which the tracking error is desired to be detected.

2-6. Method of Generating Linear Tracking Error Signal

The tracking error signal of each of the pit lines A to F can be generated in accordance with the above-described method.

In this example, since the pit lines A to F are formed within one track width of the related art, the tracking error signals can be simultaneously generated in parallel for the pit lines of the respective phase as the pit lines A to F. That is, the tracking error signals can be simultaneously generated in parallel in the pit lines A to F by providing a tracking error signal generation unit which generates the tracking error signals for the pit lines A to F in accordance with the above method.

Hereinafter, the tracking error signals simultaneously obtained in parallel for the pit lines A, B, C, D, E, and F are referred to as tracking error signals TE_A, TE_B, TE_C, TE_D, TE_E, and TE_F, respectively.

In this embodiment, the linear tracking error signal is obtained by simultaneously obtaining the tracking error signals TE_A to TE_F in parallel, and then sequentially connecting the waveforms of the tracking error signals TE_A to TE_F near zero cross points when the spot position of the servo laser beam is displaced in the radial direction due to the above-described spot position deviation.

Figure 13:
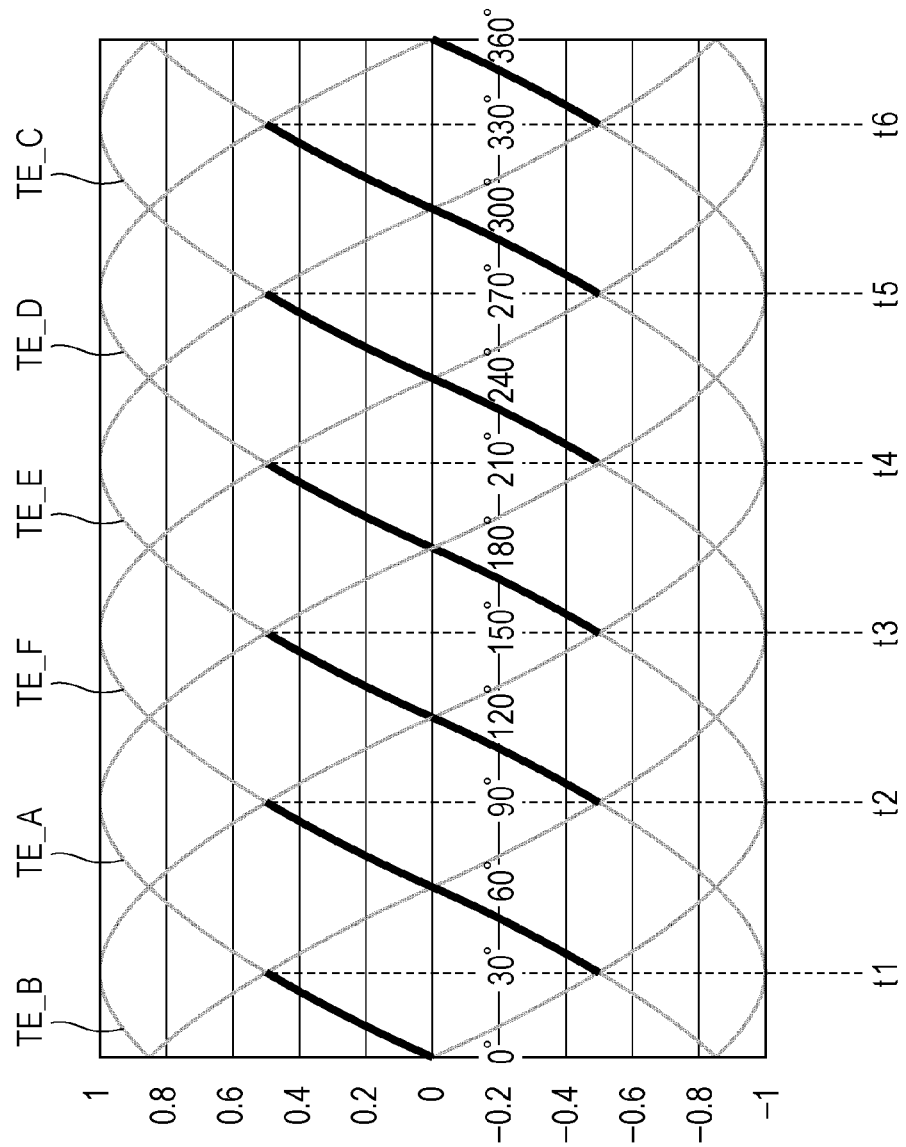
FIG. 13 is a diagram illustrating the waveform of each tracking error signal obtained when the spot position is displaced in the radial direction.

FIG. 13 is a diagram illustrating the waveforms of the tracking error signals TE_A to TE_F obtained when the spot position of the servo laser beam is displaced in the radial direction.

As understood with reference to FIG. 13, the waveforms of the tracking error signals TE_A to TE_F are changed into sine waves to displace the spot position of the servo laser beam in the radial direction due to the above-described spot position deviation. In this case, since six pit lines are arranged within one track width, the phases of the tracking error signals TE_A to TE_F are shifted by 60°, as shown in the drawing.

When the tracking servo is performed on the pit line A, it can be expressed that the spot position exists at the zero cross point of negative→positive on the tracking error signal TE_A shown in the drawing.

When the spot position is gradually displaced from this state in the radial direction due to a change in a control target value involved with the above-described spot position deviation, the amplitude of the tracking error signal TE_A gradually rises.

At this time, at a time point t1 at which the spot position is moved by a ½ track(30°) from the pit line A, it can be understood that the amplitude value (absolute value) of the tracking error signal TE_B indicating the tracking error of the pit line B adjacent to the pit line A is identical to the amplitude value (absolute value) of the tracking error signal TE_A. That is, the time point t1 is a time point at which the spot position arrives at the intermediate point between the pit lines A and B in the radial direction. Likewise, a time point t2 is a time point at which the spot position arrives at the intermediate point between the pit lines B and C. A time point t3 is a time point at which the spot position arrives at the intermediate point between the pit lines C and D. A time point t4 is a time point at which the spot position arrives at the intermediate point between the pit lines D and E. A time point t5 is a time point at which the spot position arrives at the intermediate point between the pit lines E and F. A time point t6 is a time point at which the spot position arrives at the intermediate point between the pit lines F and A.

As understood from this fact, the spot position passes through straight line sections (sections near the zero cross points) of the tracking error signals TE_A to TE_F, as indicated by black thick lines, when the spot position is being displaced in the radial direction.

Figure 14:
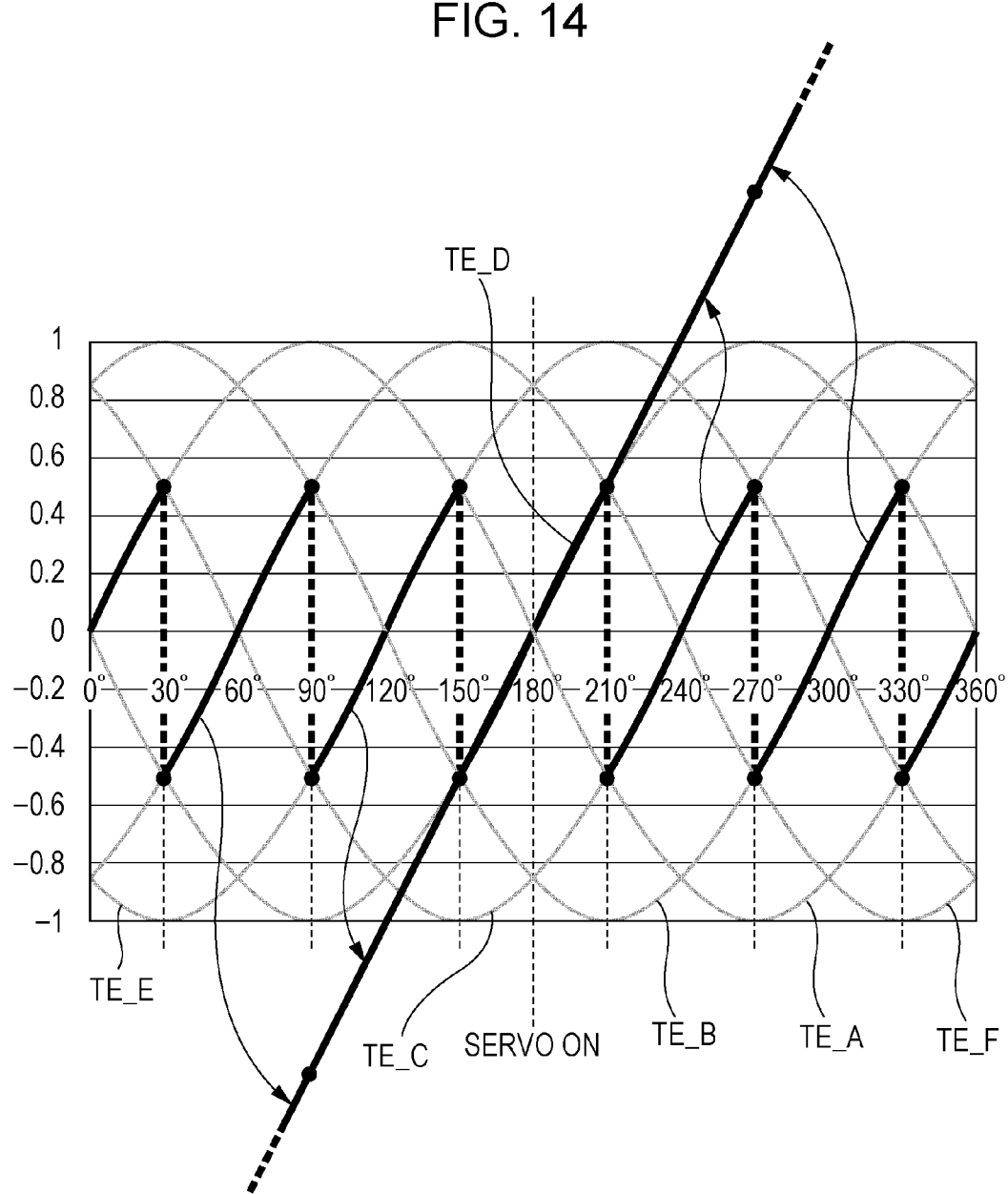
FIG. 14 is a diagram illustrating a generation image of a linear tracking error signal.

In terms of this fact, in this embodiment, the linear error signal linearly expressing the tracking error of ½ or more track widths is generated by connecting the waveforms of the tracking error signals TE_A to TE_F near the zero cross points to each other when the spot position is moved in the radial direction, as shown in FIG. 14.

FIG. 14 shows a generation image of the linear tracking error signal when the pit line (that is, the pit line to be subjected to the servo) initially subjected to servo ON switching is assumed to be the pit line D.

Figure 15:
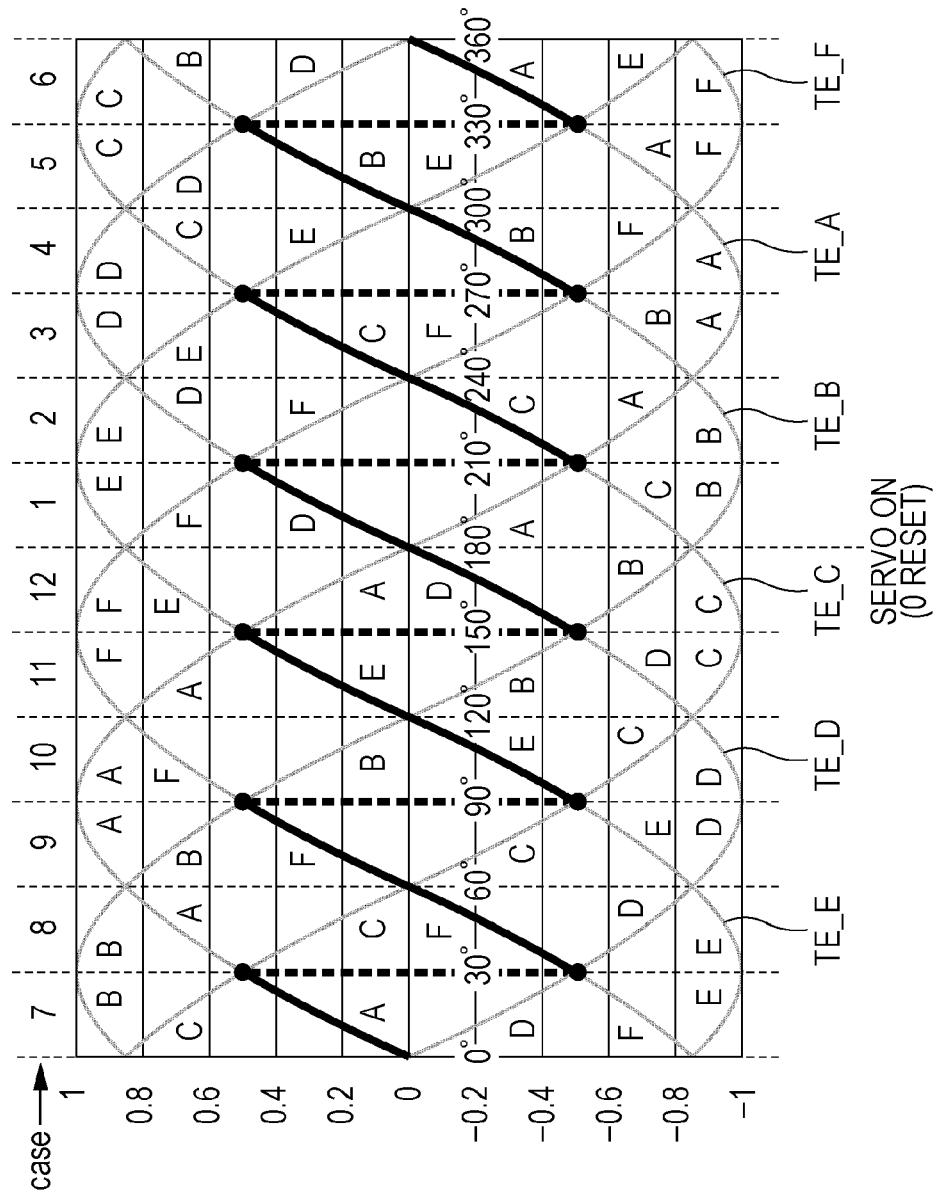
FIG. 15 is a diagram illustrating a specific method of generating the linear tracking error signal.

FIG. 15 is a diagram illustrating a specific method of generating the linear tracking error signal (hereinafter, also referred to as a linear error signal) shown in FIG. 14.

FIG. 15 shows the waveforms of the tracking error signals TE_A to TE_F obtained when the spot position of the servo laser beam is moved in the radial direction.

First, as understood with reference to FIG. 15, the magnitude relationship of the amplitudes of the tracking error signals TE_A to TE_F is changed over time as the spot position is moved in the radial direction.

In the generation of the linear error signal, the magnitude of the amplitudes of the tracking error signals TE_A to TE_F is divided by case. Specifically, in this example, the case is divided into case 1 to case 12 to correspond to six types of the phases of the pit lines.

On the assumption that the amplitudes of the tracking error signals TE_A to TE_F are referred to as A to F, the definition of the case 1 to the case 12 is as follows.

case 1: E<F<D<A<C<B
case 2: E<D<F<C<A<B
case 3: D<E<C<F<B<A
case 4: D<C<E<B<F<A
case 5: C<D<B<E<A<F
case 6: C<B<D<A<E<F
case 7: B<C<A<D<F<E
case 8: B<A<C<F<D<E
case 9: A<B<F<C<E<D
case 10: A<F<B<E<C<D
case 11: F<A<E<B<D<C
case 12: F<E<A<D<B<C In this example, the amplitudes of the tracking error signals TE_A to TE_F are sequentially monitored and the cases defined above are determined. The linear error signal is generated for each of the cases determined in this way by performing calculation described below.

In a calculation example described below, it is assumed that the pit line initially subjected to servo ON switching is the pit line D, as shown in FIG. 15. In other words, it is assumed that the spot position located on the pit line D is the zero point of the linear error signal.

In the calculation example described below, P(n) denotes an output value of the linear error signal at each time and A to F denote the amplitude values of the tracking error signals TE_A to TE_F, respectively.

$P_{prev}$ denotes the amplitude value of the tracking error signal TE (one of the tracking error signals TE_A to TE_F) selected in the immediately previous case at a substitution timing from the immediately previous case.

Further, HPK denotes the amplitude value of the tracking error signal TE (one of the tracking error signals TE_A to TE_F) newly selected in response to the substitution of the case at the substitution timing of the case.

case 1 ... $P(n)=P_{prev}+D$
case 2 ... $P(n)=P_{prev}-HPK+C$
case 3 ... $P(n)=P_{prev}+C$
case 4 ... $P(n)=P_{prev}-HPK+B$
case 5 ... $P(n)=P_{prev}+B$
case 6 ... $P(n)=P_{prev}-HPK+A$
case 7 ... $P(n)=P_{prev}+A$
case 8 ... $P(n)=P_{prev}-HPK+F$
case 9 ... $P(n)=P_{prev}+F$
case 10 ... $P(n)=P_{prev}-HPK+E$
case 11 ... $P(n)=P_{prev}+E$
case 12 ... $P(n)=P_{prev}-HPK+D$ As understood from this calculation example, in this embodiment, the linear error signals are generated by sequentially connecting the tracking error signals TE for the pit lines adjacent to each other in the movement direction of the spot position at every predetermined timing of the change in the magnitude relationship of the amplitudes of the tracking error signals TE_A to TE_F of the respective phases when the spot position is moved in the radial direction.

Specifically, in this example, the predetermined timing is a substitution timing of case 1 and case 2, a substitution timing of case 3 and case 4, a substitution timing of case 5 and case 6, a substitution timing of case 7 and case 8, a substitution timing of case 9 and case 10, and a substitution timing of case 11 case 12. The tracking error signals TE for the pit lines adjacent to each other in the movement direction of the spot position are sequentially selected at every predetermined timing. Further, at the above predetermined timing, a value obtained by subtracting the value (HPK) at the predetermined timing of the newly selected tracking error signal TE from the value ($P_{prev}$) output as the linear error signal at the time point is a reference value ($P_{prev}$–HPK). The values (P(n)) obtained by adding the values of the newly selected tracking error signal to the reference value are output sequentially as the value of the linear error signal.

In accordance with the method, the linear error signal can be generated by connecting the waveforms of the tracking error signals TE of the respective phases near the zero cross points, which are described above with reference to FIG. 14 when the spot position is moved in the radial direction (both of an outer circumference direction and an inner circumference direction). In other words, even when a tracking error amount from the pit line (track) subjected to the servo ON switching is an error amount by which the return of the tracking error signal TE occurs, it is possible to generate the tracking error signal expressing the tracking error amount in a substantially linear form.

It is possible to prevent the tracking servo from being deviated by performing the tracking servo control based on the linear error signal (the tracking error signal TE-sv), even when the above-described spot position deviation occurs by a ½ or more track width.

2-7. Example of Specific Configuration of Signal Generation Unit

FIG. 16 is a diagram mainly illustrating the inner configuration of the signal generation unit 36 of the recording apparatus according to the embodiment.

FIG. 16 shows the configuration of the recording apparatus including the selector signal selection circuit 56 and the address detection circuit 57 in order to detect the above-described position information (address information). Further, the controller 44 shown in FIG. 3 is also shown.

As shown in the drawing, the signal generation unit 36 includes a matrix circuit 50, a clock generation circuit 51, a selector signal generation circuit 52, an error signal generation circuit 53, a case determination circuit 54, and a linear error signal generation circuit 55.

The matrix circuit 50 generates the focus error signal and the sum signal described above based on the light reception signals DT-sv from the plurality of light-receiving elements of the second light-receiving unit 29 shown in FIG. 2.

As described above, the focus error signal FE-sv is supplied to the recording focus servo circuit 38.

As shown in the drawing, the sum signal is supplied to the clock generation circuit 51, the error signal generation circuit 53, and the address detection circuit 57.

The clock generation circuit 51 generates the clock CLK in the above-described order.

Figure 17:
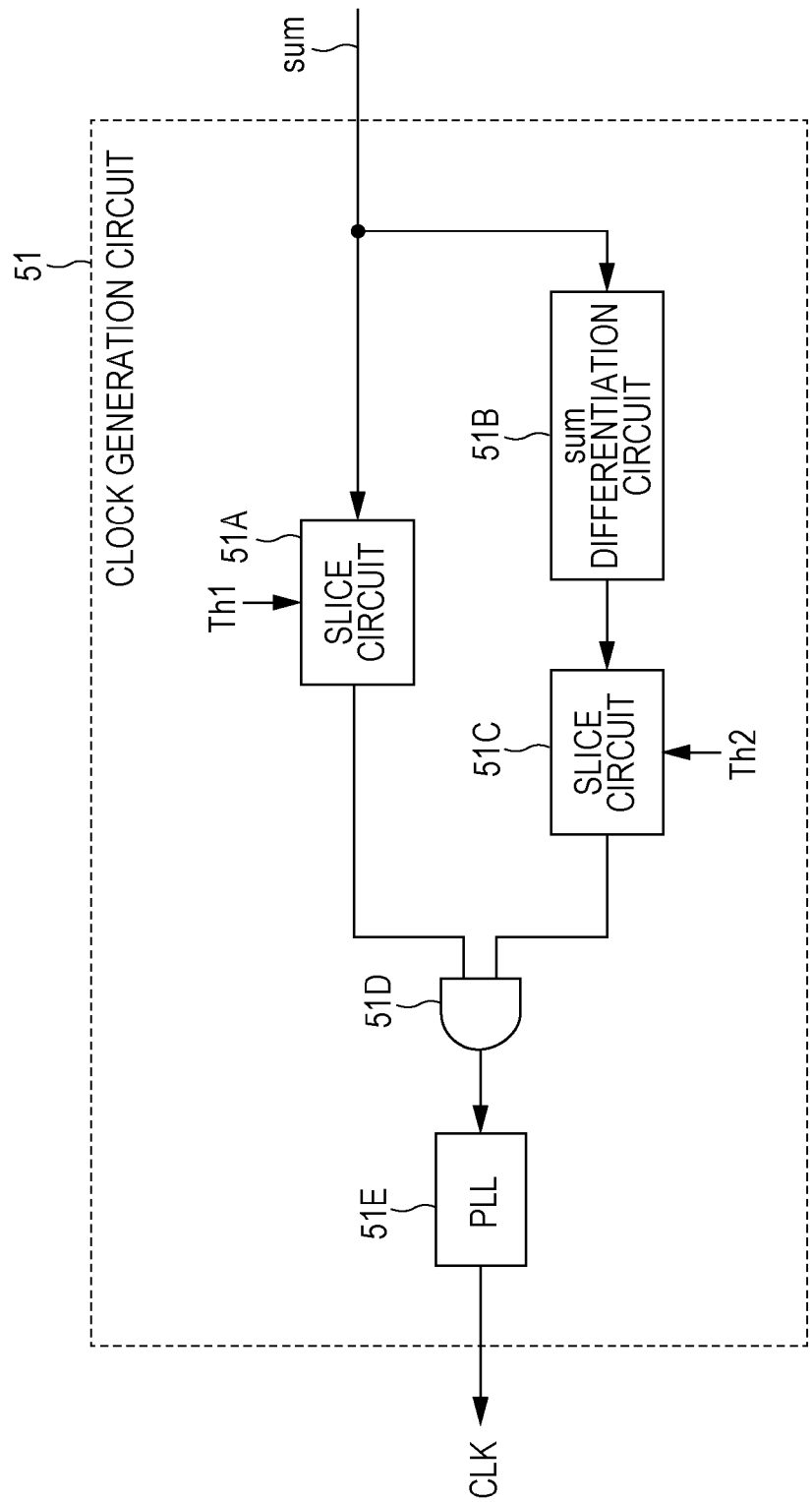
FIG. 17 is a diagram illustrating the inner configuration of a clock generation circuit.

FIG. 17 is a diagram illustrating the inner configuration of the clock generation circuit 51.

In FIG. 17, the clock generation circuit 51 includes a slice circuit 51A, a sum differential circuit 51B, a slice circuit 51C, an AND gate circuit 51D, and a PLL circuit 51E.

As shown in the drawing, the sum signal is input to the slice circuit 51A and the sum differential circuit 51B. The slice circuit 51A slices the sum signal based on a set threshold value Th1 and outputs the result to the AND gate circuit 51D.

The sum differential circuit 51B differentiates the sum signal to generate the above-described sum differential signal. The slice circuit 51C slices the sum differential signal generated by the sum differential circuit 51B based on a set threshold value Th2 and outputs the result to the AND gate circuit 51D.

The AND gate circuit 51D performs AND of the output from the slice circuit 51A and the output from the slice circuit 51C to generate the above-described timing signal.

The PLL circuit 51E generates the clock CLK by performing PLL processing on the timing signal obtained by the AND gate circuit 51D as an input signal.

Referring back to FIG. 16, the clock CLK generated by the clock generation circuit 51 is supplied to the selector signal generation circuit 52.

The selector signal generation circuit 52 generates the six types of selector signals indicating the timings of the pit formable positions of the pit lines A to F based on the clock CLK. Specifically, the selector signal generation circuit 52 obtains the six types of selector signals by generating the signals, each of which the phase is shifted by a ⅙ period, as the signals obtained by dividing the clock CLK into six. Hereinafter, these six types of selector signals are referred to as selector signals S_A, S_B, S_C, S_D, S_E, and S_F, respectively.

The selector signals S_A to S_F are supplied to the error signal generation circuit 53 and are also supplied to the selector signal selection circuit 56.

The error signal generation circuit 53 generates the tracking error signals TE (TE_A to TE_F) for the pit lines A to F based on the selector signals S_A to S_F and the sum signal.

FIG. 18 is a diagram illustrating the inner configuration of the error signal generation circuit 53.

In the error signal generation circuit 53, as shown in FIG. 18, six error signal generation units including two sample and hold circuits and a subtraction unit are arranged in parallel with respect to the sum signal to generate six types of error signals TE as the tracking error signals TE_A to TE_F.

Specifically, the error signal generation unit including a sample and hold circuit SH-A1, a sample and hold circuit SH-A2, and a subtraction unit 53A is installed to generate the tracking error signal TE_A. The error signal generation unit including a sample and hold circuit SH-B1, a sample and hold circuit SH-B2, and a subtraction unit 53B is installed to generate the tracking error signal TE_B. The error signal generation unit including a sample and hold circuit SH-C1, a sample and hold circuit SH-C2, and a subtraction unit 53C is installed to generate the tracking error signal TE_C. The error signal generation unit including a sample and hold circuit SH-D1, a sample and hold circuit SH-D2, and a subtraction unit 53D is installed to generate the tracking error signal TE_D. The error signal generation unit including a sample and hold circuit SH-E1, a sample and hold circuit SH-E2, and a subtraction unit 53E is installed to generate the tracking error signal TE_E. The error signal generation unit including a sample and hold circuit SH-F1, a sample and hold circuit SH-F2, and a subtraction unit 53F is installed to generate the tracking error signal TE_F.

The sample and hold circuit SH-A1 samples and holds the sum signal at a timing indicated by the selector signal S_F, the sample and hold circuit SH-A2 samples and holds the sum signal at a timing indicated by the selector signal S_B, and the subtraction unit 53A subtracts the output of the sample and hold circuit SH-A2 from the output of the sample and hold circuit SH-A1, so that the tracking error signal TE_A is generated.

The sample and hold circuit SH-B1 samples and holds the sum signal at a timing indicated by the selector signal S_A, the sample and hold circuit SH-B2 samples and holds the sum signal at a timing indicated by the selector signal S_C, and the subtraction unit 53B subtracts the output of the sample and hold circuit SH-B2 from the output of the sample and hold circuit SH-B1, so that the tracking error signal TE_B is generated.

The sample and hold circuit SH-C1 samples and holds the sum signal at a timing indicated by the selector signal S_B, the sample and hold circuit SH-C2 samples and holds the sum signal at a timing indicated by the selector signal S_D, and the subtraction unit 53C subtracts the output of the sample and hold circuit SH-C2 from the output of the sample and hold circuit SH-C1, so that the tracking error signal TE_C is generated.

The sample and hold circuit SH-D1 samples and holds the sum signal at a timing indicated by the selector signal S_C, the sample and hold circuit SH-D2 samples and holds the sum signal at a timing indicated by the selector signal S_E, and the subtraction unit 53D subtracts the output of the sample and hold circuit SH-D2 from the output of the sample and hold circuit SH-D1, so that the tracking error signal TE_D is generated.

The sample and hold circuit SH-E1 samples and holds the sum signal at a timing indicated by the selector signal S_D, the sample and hold circuit SH-E2 samples and holds the sum signal at a timing indicated by the selector signal S_F, and the subtraction unit 53E subtracts the output of the sample and hold circuit SH-E2 from the output of the sample and hold circuit SH-E1, so that the tracking error signal TE_E is generated.

The sample and hold circuit SH-F1 samples and holds the sum signal at a timing indicated by the selector signal S_E, the sample and hold circuit SH-F2 samples and holds the sum signal at a timing indicated by the selector signal S_A, and the subtraction unit 53F subtracts the output of the sample and hold circuit SH-F2 from the output of the sample and hold circuit SH-F1, so that the tracking error signal TE_F is generated.

Referring back to FIG. 16, the description will be made.

The tracking error signals TE_A to TE_F generate by the error signal generation circuit 53 are supplied to the case determination circuit 54 and are also supplied to the linear error signal generation circuit 55.

The case determination circuit 54 determines each of case 1 to case 12 described above based on the tracking error signals TE_A to TE_F and supplies a determination signal Dcs indicating the determination result to the linear error signal generation circuit 55 and the selector signal selection circuit 56.

Specifically, in this case, the case determination circuit 54 determines the substitution timing of each case. The case determination circuit 54 generates and outputs the substitution timing of the case and a signal distinguishing the cases from each other as the determination signal Dcs.

The linear error signal generation circuit 55 generates the above-described linear error signals based on the tracking error signals TE_A to TE_F and the determination signal Dcs. Specifically, the linear error signal generation circuit 55 generates the tracking error signal TE-sv as the linear error signal by performing calculations by a calculation expression corresponding to the case indicated by the determination signal Dcs among calculation expressions of the respective cases indicated as the above-described calculation examples.

The controller 44 provides the linear error signal generation circuit 55 with a reset signal at a timing at which the tracking servo of the reference plane-side servo control system is ON. The linear error signal generation circuit 55 resets the value of the tracking error signal TE-sv as the linear error signal to 0 in response to the reset signal.

The tracking error signal TE-sv generated by the linear error signal generation circuit 55 is supplied to the reference plane-side servo filter 37, shown in FIG. 3.

The selector signal selection circuit 56 selects, as a selector signal S_Ad, one selector signal based on the determination signal Dcs among the selector signals S_A to S_F supplied from the selector signal generation circuit 52 and outputs the selector signal S_Ad to the address detection circuit 57.

Specifically, the selector signal selection circuit 56 changes the selector signal S output as the selector signal S_Ad into the selector signal S (the selector signal S corresponding to the pit line adjacent to the pit line, in which the selector signal S output up to that time indicates the timing of the pit formable position, in the spot movement direction) adjacent to the selector signal S output up to that time at a predetermined timing among the substitution timings for the case 1 to the case 12 indicated by the determination signal Dcs. In this example, the selector signal selection circuit 56 changes the selector signal S output as the selector signal S_Ad into the selector signal S adjacent to the selector signal S output up to that time at the substitution timing of case 1 and case 2, the substitution timing of case 3 and case 4, the substitution timing of case 5 and case 6, the substitution timing of case 7 and case 8, the substitution timing of case 9 and case 10, and the substitution timing of case 11 and case 12.

The address detection circuit 57 detects the address information recorded on the reference plane Ref based on the result obtained by sampling the value of the sum signal at a timing (in this case, a section of an H level of the selector signal S_Ad) of the pit formable position indicated by the selector signal S_Ad.

In this example, as described above with reference to FIGS. 7A to 7C, the address information of each pit line indicating whether the pit is formed at the pit formable position in the pit line is recorded as information regarding one channel bit. Accordingly, the address detection circuit 57 identifies the data of "0" and "1" of one channel bit by identifying the value of the sum signal at the rise timing of the selector signal S_Ad and detects (reproduces) the recorded address information by performing an address decoding process in accordance with the format described above with reference to FIGS. 7A to 7C based on the result.

The address information detected by the address detection circuit 57 is supplied to the controller 44.

The selector signal S for the pit line near the spot position is selected as the selector signal S_Ad through the operation of the selector signal selection circuit 56.

Accordingly, the address detection circuit 57 can appropriately detect the address information recorded in the pit line near the spot position.

The controller 44 performs the following process so as to correspond to the configuration of the signal processing unit 36.

That is, the controller 44 instructs the linear error signal generation circuit 55 to select and output the tracking error signal TE for the pit line to be subjected to servo among the tracking error signals TE_A to TE_F, when one of the pit lines A to F to be subjected to servo is selected (that is, the pit line subjected to servo ON switching is selected) in regard to the tracking servo for the servo laser beam.

As described above, the controller 44 instructs the linear error signal generation circuit 55 to reset the amplitude of the linear error signal (TE-sv) to 0 in response to the servo ON switching at a given pit line.

With such a configuration, the tracking servo control is performed based on the linear tracking error signal by the reference plane-side servo control system. Thus, the tracking servo is not deviated even when the position deviation between the servo laser beam and the ATS beam caused due to the above-described lens shift occurs by the ½ or more track width. That is, accordingly, the manufacturing precision of the bulk recording medium 1 can be lessened to suppress the eccentricity or the like. As a consequence, the cost of the bulk recording medium 1 can be reduced.

3. Modified Examples

The embodiment of the disclosure has hitherto been described. However, the disclosure is not limited to the specific example described hitherto.

In the above description, when the pit lines shown in FIG. 5 or 6 are formed on the reference plane Ref, the tracking error signals TE are generated by the difference between the sample and hold values of the sum signal as the countermeasure against the skew or the lens shift of the object lens 20. However, when the influence involved with the skew or the lens shift can be ignored, for example, by providing a unit correcting the spot position deviation caused due to the skew or the lens shift, a signal obtained by the sampling and holding the push-pull signal may be used as the tracking error signal TE.

In the above description, the case has hitherto been described in which the linear error signals are generated and the tracking error signals TE_A to TE_F shown in FIG. 14 are used without any change. However, the following method according to a modified example may be used as the method of generating the linear error signal.

FIGS. 19 to 22 are diagrams illustrating a method of generating the linear error signal according to the modified example.

First, FIG. 19 shows the waveforms of the tracking error signals TE_A to TE_F obtained when the spot position is moved in the radial direction and shows a time point tA, which is a timing at which the spot is located immediately above the pit line A in the waveform chart, and a time point tD which is a timing at which the spot is located immediately above the pit line D.

In FIGS. 20A and 20B, the spot is traced on the pit line A (FIG. 20A) and is traced on the pit line D (FIG. 20B) on the reference plane Ref. As shown in FIGS. 20A and 20B, a timing at which the spot is identical to the pit formable position on the pit line A in the line direction (pit line formation direction) is referred to as ts1. Likewise, timings at which the spot is identical to the pit formable positions on the pit line B, the pit line C, the pit line D, the pit line E, and the pit line F in the line direction are referred to as ts2, ts3, ts4, ts5, and ts6.

First, referring to FIG. 19, it can be understood that the phases of the tracking error signal TE_A for the pit line A and the tracking error signal TE_D for the pit line D are reversed, and in other words, the polarities thereof are reversed. That is, a relationship of "A=−D" can be obtained.

In this modified example, there is provided a method of using a pair of tracking error signals TE having a reverse relationship in the polarities among the tracking error signals TE_A to TE_F.

Here, the state where the spot shown in FIG. 20A is traced on the pit line A corresponds to the spot position at the time point tA in FIG. 19. Likewise, the state where the spot shown in FIG. 20B is traced on the pit line D corresponds to the spot position at the time point tD in FIG. 19.

That is, as understood from this fact, the state of the spot position shown in FIG. 20A is transitioned (or reversely transitioned) to the state of the spot position shown in FIG. 20B, as the spot position is moved in the radial direction.

In consideration of this fact, the tracking error signal TE_A is generated at the time point tA in FIG. 19, that is, in the state of FIG. 20A based on the reflected beam of the spot passing immediately above the target pit A. However, when the spot position is moved in the radial direction and becomes the time point tD, that is, the state of FIG. 20B, the tracking error signal TE_A is generated in a state where the spot is located at the position most distant from the target pit A.

The same is applied to the tracking error signal TE_D. That is, the tracking error signal TE_D can be generated based on the reflected beam of the spot passing immediately above the target pit D at the time point tD (the state of FIG. 20B) in FIG. 19. However, at the time point tA (the state of FIG. 20A), the tracking error signal TE_D is generated in the state where the spot is located at the position most distant from the target pit D.

In this way, the tracking error signal TE is generated based on the reflected beam of the spot distant from the target pit line when the spot position gets distant from the target pit line under to the situation where the spot is displaced in the radial direction. At this time, there is a concern that the reliability of the value is low in the section distant from the target pit line.

When viewed from a relationship between the tracking error signals TE_A and TE_D, the spot position exists immediately above the target pit line D for the tracking error signal TE_D at the time point tD at which the spot position is most distant from the target pit line in regard to the tracking error signal TE_A.

When this fact and the above-described reverse phase relationship (A=−D) between the tracking error signals TE_A and TE_D are taken into consideration, the tracking error signal TE_A is used without any change in the state where the spot position exists near the target pit line A in regard to the tracking error signal TE_A. In the state where the spot position is distant from the pit line A, a signal obtained by the same waveform as that of the tracking error signal TE_A can typically be obtained by a signal generated in the state where the spot position exists near the target pit line consequently when the reverse value of the tracking error signal TE_D is used.

The same is applied to the tracking error signals TE_C and TE_E. That is, in regard to the tracking error signal TE_C, in the state where the spot position exists near the target pit line C, the tracking error signal TE_C is output without any change as a pair of the tracking error signal TE_F having the reverse phase relationship with the tracking error signal TE_C. In the state where the spot position is distant from the pit line C, the reverse value of the tracking error signal TE_F is output. In regard to the tracking error signal TE_E, in the state where the spot position exists near the target pit line E, the tracking error signal TE_E is output without any change as a pair of the tracking error signal TE_B having the reverse phase relationship with the tracking error signal TE_E. In the state where the spot position is distant from the pit line E, the reverse value of the tracking error signal TE_B is output.

Here, the tracking error signals TE generated using the pair of tracking error signals TE_A and TE_D, the pair of tracking error signals TE_E and TE_B, and the pair of tracking error signals TE_C and TE_F are referred to as tracking error signals TE_p, TE_q, and TE_r, respectively.

Figure 21:
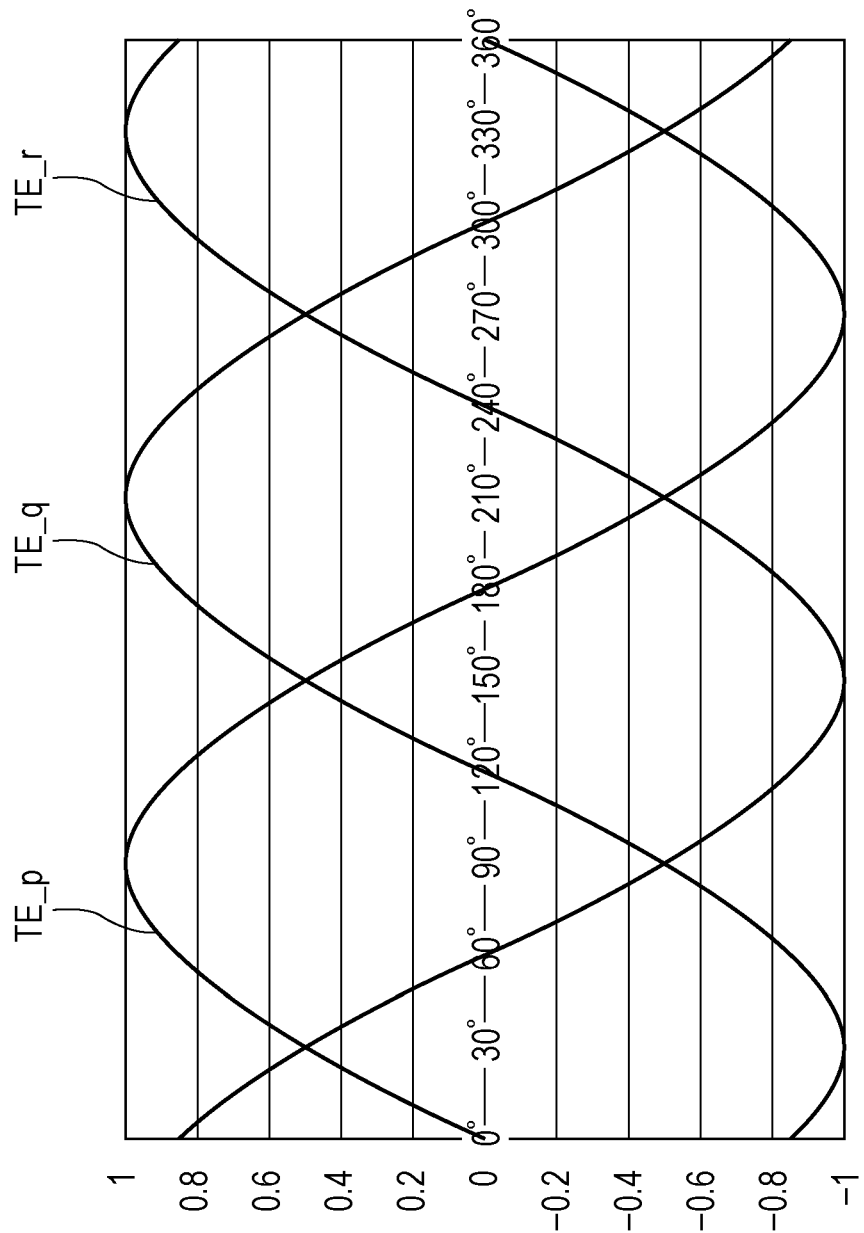
FIG. 21 is a diagram illustrating the waveform of each tracking error signal generated in a method of generating the linear tracking error signal according to a modified example.

The waveforms of the tracking error signals TE_p, TE_q, and TE_r are shown in FIG. 21.

A specific method of generating the tracking error signals TE_p, TE_q, and TE_r will be described below.

In the following calculation expressions, s1 to s6 denote the amplitude value of the sum signal at the timings ts1 to ts6 shown in FIGS. 20A and 20B.

Further, A denotes the amplitude value of the tracking error signal TE_A and D denotes the amplitude value of the tracking error signal TE_D. Likewise, E, B, C, and F denote the amplitude values of the tracking error signals TE_E, TE_B, TE_C, and TE_F.

s1<s4→TE_p=A
s1≥s4→TE_p=−D
s5<s2→TE_q=E
s5≥s2→TE_q=−B
s3<s6→TE_r=C
s3≥s6→TE_r=−F

The method of generating the tracking error signals TE_p, TE_q, and TE_r is not limited to the above-described method. For example, the following method may be used.

s6+s2<s3+s5→TE_p=A
s6+s2≥s3+s5→TE_p=−D

Figure 22:
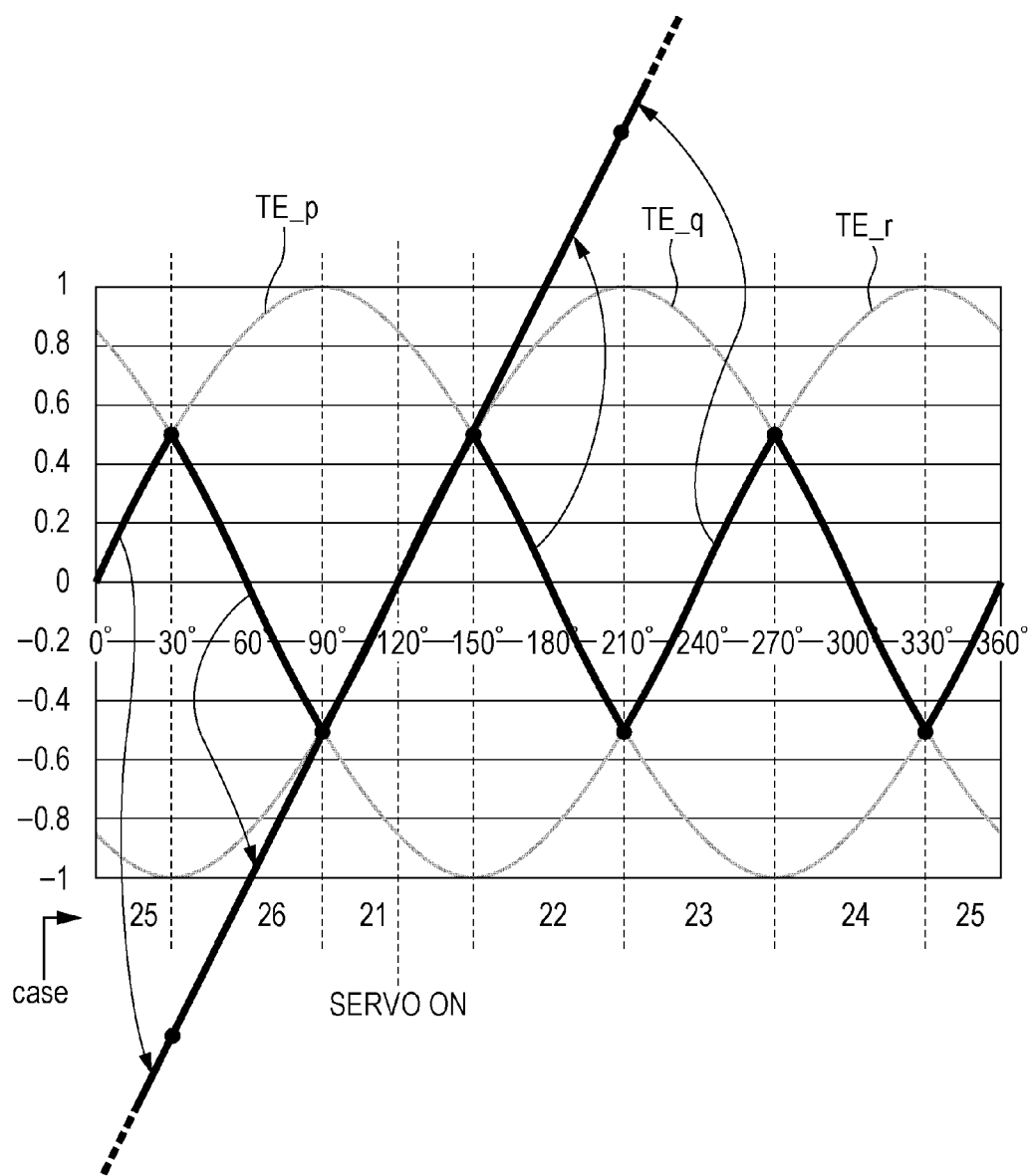
FIG. 22 is a diagram illustrating the method of generating the linear tracking error signal according to the modified example.

FIG. 22 is a diagram illustrating a specific method of generating the linear error signals using the tracking error signals TE_p, TE_q, and TE_r according to a modified example.

First, in this example, the magnitude of the amplitudes of the tracking error signals TE is also divided by case. Specifically, in this example, the case is divided into six cases of case 21 to case 26 to correspond to three types of phases of the tracking error signals TE to be used.

On the assumption that the amplitudes of the tracking error signals TE_p, TE_q, and TE_r are referred to as p, q, and r, the definition of case 21 to case 26 is as follows.

case 21: p<q<r
case 22: q<p<r
case 23: q<r<p
case 24: r<q<p
case 25: r<p<q
case 26: p<r<q In this modified example, the amplitudes of the tracking error signals TE_p, TE_q, and TE_r are sequentially monitored and the cases defined above are determined. The linear error signal is generated for each of the cases determined in this way by performing calculation described below.

In a calculation example described below, it is assumed that the pit line initially subjected to servo ON switching is the pit line E and the spot position located on the pit line E is the zero point of the linear error signal.

In the calculation example described below, the definition of P(n)P$_{prev}$, and HPK is the same as that of the embodiment.

case 21 ... P(n)=P$_{prev}$+q
case 22 ... P(n)=P$_{prev}$−HPK−p
case 23 ... P(n)=P$_{prev}$−HPK+r
case 24 ... P(n)=P$_{prev}$−HPK−q
case 25 ... P(n)=P$_{prev}$−HPK+p
case 26 ... P(n)=P$_{prev}$−HPK−r The method of generating the linear error signals according to the modified example is the method of generating the linear error signals by sequentially connecting the tracking error signals TE for the pit lines adjacent to each other in the movement direction of the spot position at every predetermined timing of the change in the magnitude relationship of the amplitudes of the tracking error signals TE of the respective phases when the spot position is moved in the radial direction.

Specifically, according to the modified example, whenever the magnitude relationship of the amplitudes of the tracking error signals TE of the respective phases is changed at the movement time of the spot position in the radial direction, the tracking error signals TE (the tracking error signal TE_q is the signal for pit line E, the tracking error signal TE_r is the signal for the pit line C, and the tracking error signal TE_p is the signal for the pit line A) for the pit lines adjacent to each other in the movement direction of the spot position are sequentially selected. Further, at each timing (the above predetermined timing) at which the magnitude relationship of the amplitudes of the tracking error signals TE is changed, a value obtained by subtracting the value (HPK) at the predetermined timing of the newly selected tracking error signal TE from the value ($P_{prev}$) output as the linear error signal at the time point is a reference value ($P_{prev}$–HPK). The values (P(n)) obtained by adding the values of the newly selected tracking error signal TE to the reference value are output sequentially as the value of the linear error signal.

In the method of generating the linear error signal according to the modified example, when FIG. 22 is compared to FIG. 14 described above, the tracking error signal TE-q selected in case 21 corresponds to the tracking error signal TE_E and the tracking error signal TE_q selected in case 24 corresponds to the tracking error signal TE_B. Further, the tracking error signal TE_p selected in case 22 corresponds to the tracking error signal TE_D and the tracking error signal TE_p selected in case 25 corresponds to the tracking error signal TE_A. Furthermore, the tracking error signal TE_r selected in case 23 corresponds to the tracking error signal TE_C and the tracking error signal TE_r selected in case 26 corresponds to the tracking error signal TE_F.

As understood from this fact, the method of generating the linear error signals according to the modified example corresponds to the method of connecting the waveforms of the tracking error signals TE_A to TE_F near the zero cross points corresponding to the pit lines A to F of the respective phases formed on the reference surface Ref.

In the method of generating the error signals according the above-described modified example, when the signals obtained by sampling and holding the push-pull signal are used as the tracking error signals TE, the signals subjected to the sampling and holding can be used as the tracking error signals TE in the state where the spot is located at the position closer to the target pit line. Therefore, even when a portion with no pit is generated by the address modulation, the tracking error signals TE with higher reliability can be obtained.

In the description, the example has hitherto been described in which the spot position is moved in the spiral shape by continuously performing the tracking servo on a given pit line in accordance with the formation of the pit lines in the spiral shape at the pitch of one track width of the related art on the reference plane Ref. However, the spot position can be moved in the spiral shape at any pitch in accordance with, for example, a method described below.

That is, the spot position is gradually displaced in the radial direction by providing an offset signal with a predetermined slope to the tracking servo loop of the reference plane-side servo control system. At this time, a spiral pitch can be arbitrarily set by setting the slope of the offset signal.

Even when the pit lines may be formed in a concentric shape on the reference plane Ref instead of the spiral shape, the mark lines in the bulk layer 5 can be recorded in the spiral shape.

In the above description, the total of six pit lines A to F are set as the plurality of pit lines with the different pit line phases and the pit lines are repeatedly formed in the radial direction by the six patterns (pit line phases). The number of the plurality of pit lines is not limited to six, but a greater number or lesser number of pit lines may be used.

The example has hitherto been described in which the section length of each pit formable position in the pit line is set the section length corresponding to 3 T and the interval between the pit formable positions in the pit line formation direction is set to the same length corresponding to 3 T (that is, n=6 T), but the lengths are just examples. The section length of each pit formable position and the interval between the edges of the pit formable position in the pit line formation direction may be set so as to satisfy the conditions 1) and 2) described above.

In the above description, the plurality of pit lines with the different pit line phases is arranged so that the pit line phases are advanced by the outer circumference and the pit line phases are advanced by the inner circumference. However, various patterns can be set under the condition in which the pattern arrangement of the plurality of pit lines does not exceed the optical limit. For example, the pit lines may be conversely arranged so that the pit line phases are advanced by the inner circumference and the pit line phases are delayed by the outer circumference.

Although not hitherto described, in this example, the pit lines are recorded on the reference plane Ref in accordance with the CAV method, and accordingly, the bulk recording medium 1 is rotatably driven at a constant rotational speed. For this reason, the recording density becomes lower toward the outer circumference side in the recording layer. In order to resolve this problem, there may be additionally provided a configuration for making the recording density constant (state where the recording density can be regarded to be constant), for example, by continuously changing a reference clock frequency in accordance with the radial position.

In the above description, in order to make the focusing position of the recording laser beam and the ATS beam identical to the information recording layer position L (that is, the recorded mark line) to be recorded during the recording time, the lens driving unit 16 is driven based on the offset of-L while controlling the position of the object lens 20 so that the servo laser beam is focused on the reference plane Ref. The focusing position control (focus control) of the recording laser beam and the ATS beam during the recording time is performed by driving the lens driving unit 16 based on the reflected beam of the ATS beam from the mark line. That is, the reflected beam of the ATS beam from the recorded mark line can be obtained when the ATS is performed during the recording time. Therefore, the focus servo control of focusing the recording laser beam and the ATS beam on the information recording layer position L to be recorded can be performed by driving and controlling the lens driving unit 16 based on the focus servo signal FS-ap generated by receiving the reflected beam.

In the above description, the example has hitherto been described in which the optical recording medium to be recorded in the embodiment of the disclosure is considered to be the bulk optical recording medium. In the embodiment of the disclosure, instead of the bulk layer 5, for example, an optical recording medium (also referred to as a multi-layer recording medium 60) may be used which has a recording layer with a multi-layer configuration in which a plurality of recording layers shown in FIG. 23 is formed.

Figure 23:
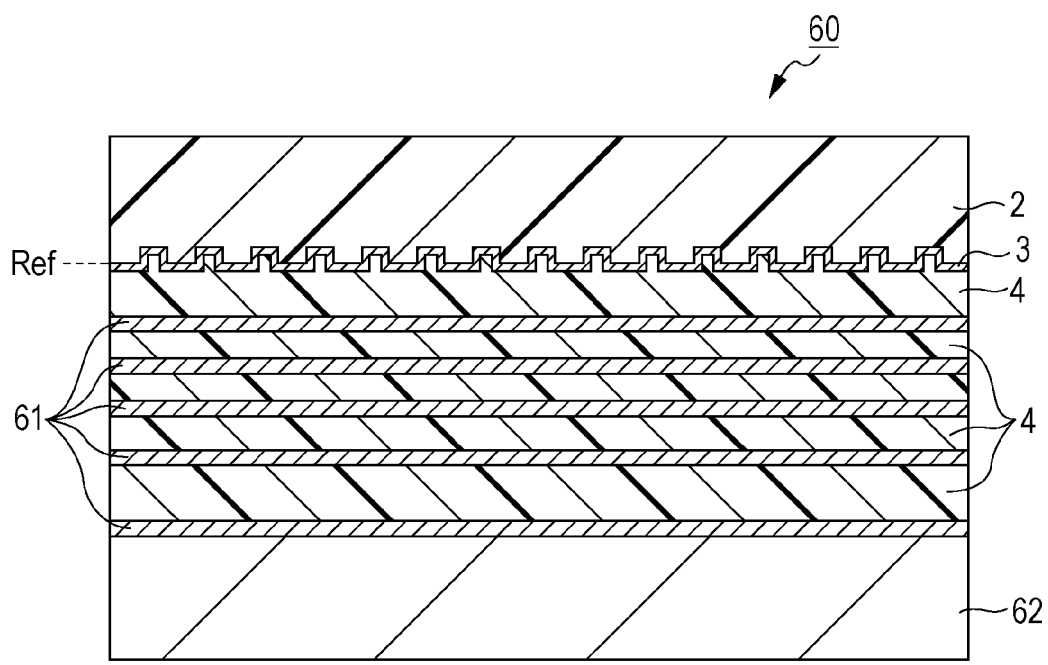
FIG. 23 is a diagram illustrating the cross-sectional configuration of an optical recording medium according to a modified example.

In FIG. 23, the multi-layer recording medium 60 has the same configuration as that of the bulk recording medium 1 shown in FIG. 1 in that the cover layer 2, the selection reflection film 3, and the intermediate layer 4 are formed in this order from the upper layer side. In this case, instead of the bulk layer 5, a recording layer is laminated which has a layer configuration in which semi-transparent recording films 61 and intermediate layers 4 are repeatedly laminated by a predetermined number of times. As shown in the drawing, the semi-transparent recording film 61 formed in the lowermost layer is laminated on a substrate 62. A full-reflection recording film may be used as the recording film formed in the lowermost layer.

Here, attention has to be paid in that the position guiders involved with the formation of the pit lines are not formed in the semi-transparent recording film 61. That is, even in the multi-layer recording medium 60, the position guiders with the spiral shape or the concentric shape are formed only in one layer position serving as the reference plane Ref.

Since the semi-transparent recording film 61 functioning as a reflection film is formed in the recording layer of the multi-layer medium 60, the reflected beam can be obtained even when the marks are in the non-recording state.

Figure 24:
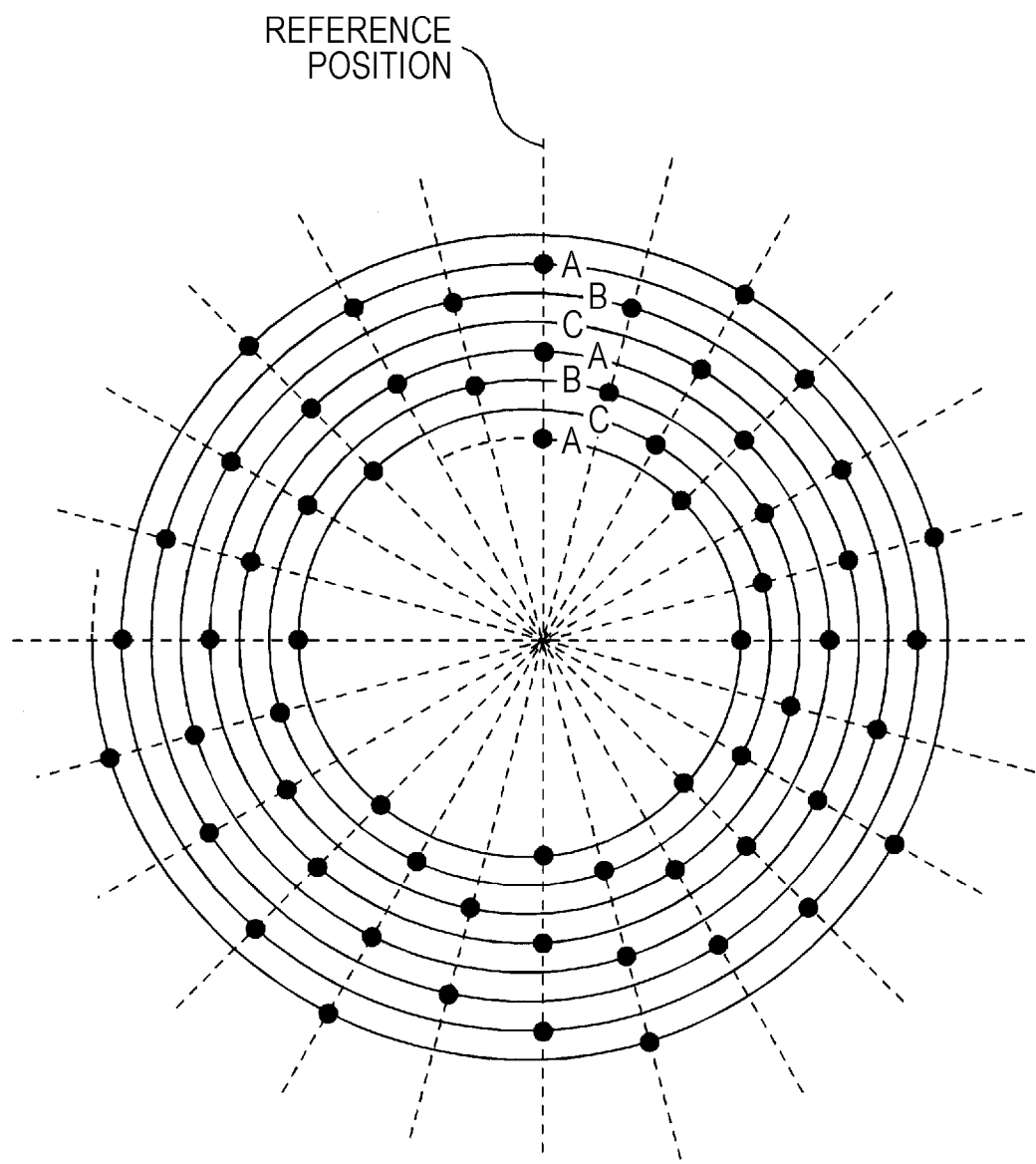
FIG. 24 is a diagram illustrating the configuration of the reference plane according to a modified example.
Figure 25:
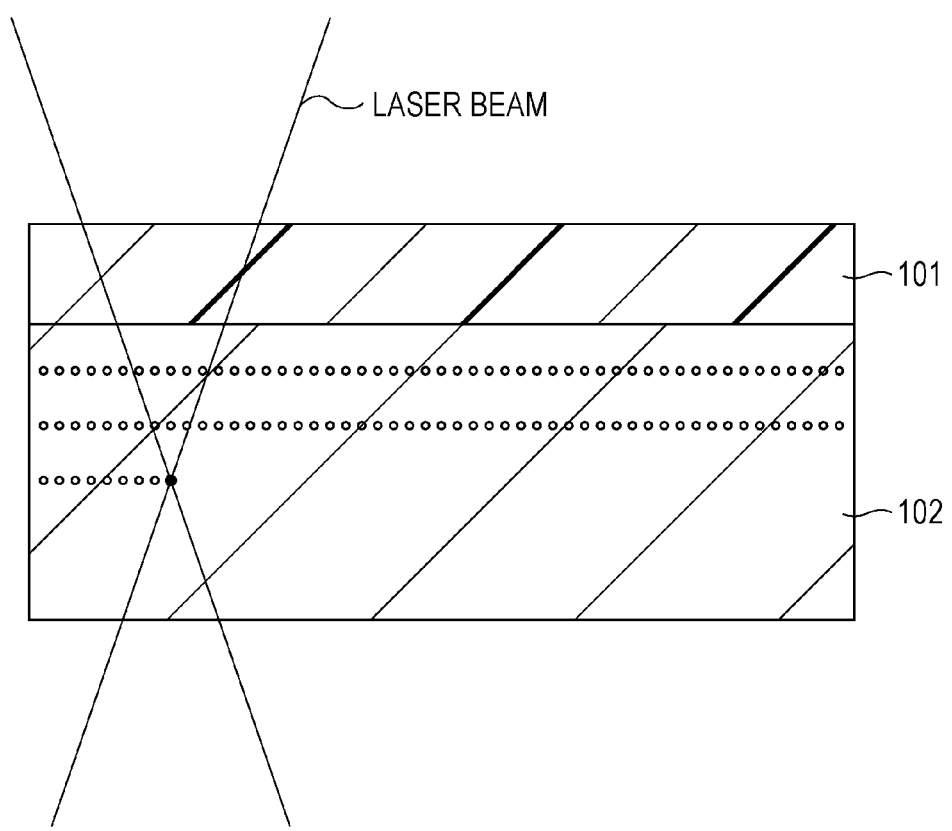
FIG. 25 is a diagram illustrating a bulk recording method.
Figure 26:
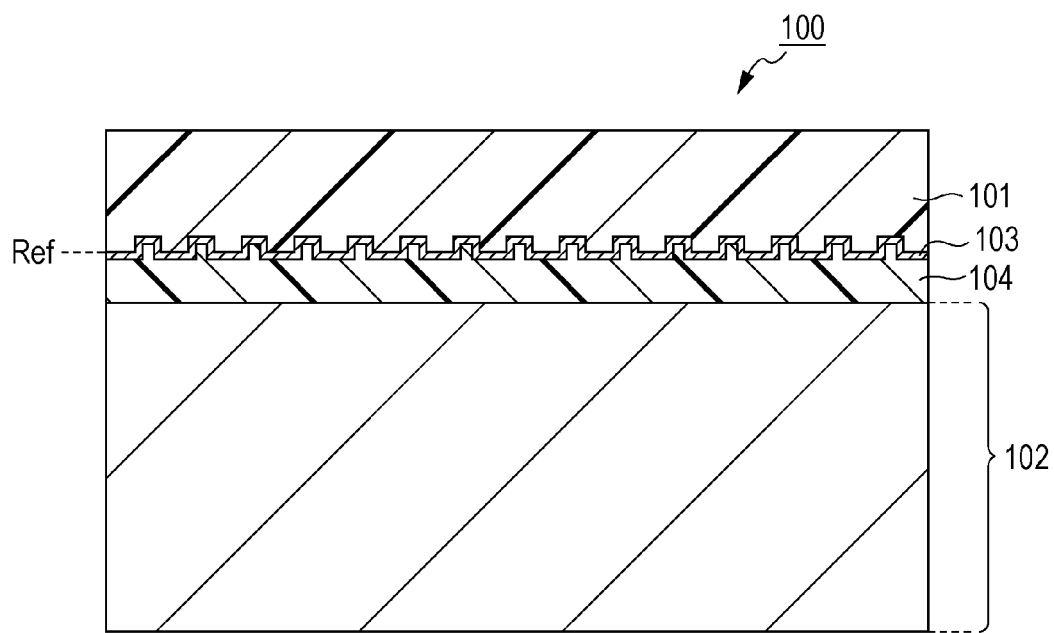
FIG. 26 is a diagram illustrating an example of the cross-sectional configuration of an actual bulk recording medium with a reference plane.

In the above description, as the example in which the pit lines are formed in the spiral shape, the example (multiple spiral configuration) has hitherto been described in which the pit lines A to F of the respective phases shown in FIG. 6 are independently formed in the spiral shape. However, as shown in FIG. 24, the pit lines may be formed with a single spiral shape (single spiral configuration). Further, to facilitate the illustration, only three types of phases of the pit lines A to C are illustrated in FIG. 24.

As shown in the drawing, a given rotation angle position on the disc is determined as a reference position and the phases of the pit lines are sequentially changed at every rotation determined by the reference position. For example, in the format in which the pit lines A→B→C→ . . . are arranged from the outer circumference to the inner circumference (that is, the pit line phases are advanced along the outer circumference) in FIG. 5, the pits are formed so that the phases of the pit lines are advanced gradually every rotation in the state of the phase of the pit line A at the n-th rotation, the phase of the pit line C at the n+1 rotation, the phase of the pit line B at the n+2 rotation, . . . , as shown in the drawing.

As understood in comparison to FIG. 6 described above, the phase relationship of the pit lines arranged in the radial direction is the same as that shown in FIG. 6 in the single spiral configuration.

When the disc is manufactured with the multiple spiral configuration shown in FIG. 6, a method of individually cutting the pit lines A to F in the same disc can be adopted. However, in this case, since the individual pit lines are sequentially cut while slightly shifting the start position of the cutting of the pit lines in the radial direction, there is a concern that difficulty is involved in terms of precision.

On the other hand, in the single spiral configuration shown in FIG. 24, the technical difficulty can be considerably eased as long as the cutting number is one and the formation timing of the pits may be exactly controlled.

When the single spiral configuration shown in FIG. 24 is used, it is not easy to continuously perform the tracking servo on a given pit line at one or more rotation. Accordingly, in this case, the recording layer is recorded in the spiral shape of a predetermined pitch by providing the offset signal with the predetermined slope to the tracking servo loop.

In the above description, the reference plane on which the pit lines are formed is formed on the upper layer side of the recording layer. However, the reference plane may be formed on the lower layer side of the recording layer.

In the above description, the embodiment of the disclosure is applied to the recording reproduction apparatus which performs both recording and reproduction on the optical disc recording medium (recording layer). However, the embodiment of the disclosure is applicable to a dedicated recording apparatus (recording apparatus) which can perform only recording on the optical disc recording medium (recording layer).

The present disclosure contains subject matter related to that disclosed in Japanese Priority Patent Application JP 2010-251573 filed in the Japan Patent Office on Nov. 10, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A recording apparatus comprising:
a light-emitting/receiving unit configured to emit, toward an optical disc recording medium having a reference plane with a position guider and a recording layer formed at a depth position different from that of the reference plane, a recording beam for performing mark recording in the recording layer, an ATS beam for adjacent track servo, and a position control beam for performing position control based at least in part on the position guider formed in the reference surface via a common object lens, and which is individually configured to receive a reflected beam of the ATS beam from the recording layer and a reflected beam of the position control beam from the reference plane;
a tracking mechanism configured to drive the common object lens in a tracking direction parallel to a radial direction of the optical disc recording medium;
a reference plane-side tracking error signal generation unit configured to generate a reference plane-side tracking error signal indicating an error of a radiation spot position of the position control beam with respect to the position guider formed on the reference plane based at least in part on a light reception signal for the position control beam obtained by the light-emitting/receiving unit;
a reference plane-side tracking servo signal generation unit configured to generate a reference plane-side tracking servo signal to cancel out a tracking error indicated by the reference plane-side tracking error signal by performing filter processing for tracking servo on the reference plane-side tracking error signal;
a tracking driving unit configured to drive the tracking mechanism based at least in part on the reference plane-side tracking servo signal;
an ATS-side tracking error signal generation unit configured to generate an ATS-side tracking error signal indicating an error of a radiation spot position of the ATS beam with respect to a mark line recorded in the recording layer based at least in part on a light reception signal for the ATS beam obtained by the light-emitting/receiving unit;
an ATS control signal generation unit configured to generate an ATS control signal to cancel out a tracking error indicated by the ATS-side tracking error signal by performing the filter processing for tracking servo on the ATS-side tracking error signal; and a signal providing unit configured to provide the ATS control signal to a tracking servo loop including the reference plane-side tracking servo signal unit.

2. The recording apparatus according to claim 1, wherein a control frequency band of a reference plane-side servo control system performing tracking servo control based at least in part on the reference plane-side tracking error signal is set to be higher than a control frequency band of an ATS control system performing tracking servo control based at least in part on the ATS tracking error signal.

3. The recording apparatus according to claim 2,
wherein the reference plane of the optical disc recording medium has a plurality of pit line phases in such a manner that pit lines where an interval between pit formable positions in one rotation is restricted to a first interval are formed in a spiral shape or a concentric circle shape, and intervals between the pit formable positions in a pit line formation direction are set at positions deviated by a predetermined second interval in the pit lines arranged in a radial direction,
wherein the reference plane-side tracking error signal generation unit includes:
a clock generation circuit configured to generate a clock corresponding to the interval between the pit formable positions based at least in part on a light reception signal for the position control beam,
a timing selection signal generation circuit configured to generate a plurality of timing selection signals, which each indicate a timing of the pit formable position for each phase pit line formed on the reference plane based at least in part on the clock generated by the clock generation circuit,
a phase tracking error signal generation circuit configured to generate a plurality of tracking error signals which each indicate a tracking error of the pit line of each phase formed on the reference plane based at least in part on the light reception signal for the position control beam and the timing selection signal generated by the timing selection signal generation circuit, and
wherein the reference plane-side tracking error signal generation unit generates a linear tracking error signal, which linearly indicates a tracking error amount, as the reference plane-side tracking error signal by sequentially connecting signals in a section near zero cross points of the plurality of tracking error signals obtained when a radiation spot of the position control beam is moved.

4. The recording apparatus according to claim 3, wherein the reference plane-side tracking error signal generation unit generates the linear tracking error signal by sequentially connecting the tracking error signals for the pit lines adjacent in a movement direction of the radiation spot at each predetermined timing at which a magnitude relationship of amplitudes of the plurality of tracking error signals changes.

5. The recording apparatus according to claim 2, wherein the control frequency band of the reference plane-side control system is about 10 kHz and the control frequency band of the ATS-side control system is about 1 kHz.

6. The recording apparatus according to claim 1, wherein the light-emitting/receiving unit emits the recording beam, the ATS beam, and the position control beam toward the optical disc recording medium having a recording layer of a bulk state as the recording layer.

7. The recording apparatus according to claim 1, wherein the light-emitting/receiving unit emits the recording beam, the ATS beam, and the position control beam toward the optical disc recording medium, which has a recording layer with a multi-layer configuration in which recording films are formed at a plurality of positions in a depth direction, as the recording layer.

* * * * *